United States Patent
Iacovelli

(10) Patent No.: US 12,413,124 B2
(45) Date of Patent: Sep. 9, 2025

(54) INTRINSICALLY ADAPTING VARIABLE GENERATORS AND MOTORS

(71) Applicant: NextPower360 Co., Ashville, NC (US)

(72) Inventor: Benedetto Anthony Iacovelli, Ashville, NC (US)

(73) Assignee: NEXTPOWER360 CO., Ashville, NC (US)

( * ) Notice: Subject to any disclaimer, the term of this patent is extended or adjusted under 35 U.S.C. 154(b) by 220 days.

(21) Appl. No.: 18/232,959

(22) Filed: Aug. 11, 2023

(65) Prior Publication Data

US 2024/0072623 A1 Feb. 29, 2024

Related U.S. Application Data

(60) Provisional application No. 63/467,850, filed on May 19, 2023, provisional application No. 63/467,843, filed on May 19, 2023, provisional application No. 63/373,582, filed on Aug. 26, 2022.

(51) Int. Cl.
| | |
|---|---|
| *H02K 16/04* | (2006.01) |
| *H02K 1/27* | (2022.01) |
| *H02K 7/00* | (2006.01) |
| *H02K 21/28* | (2006.01) |

(52) U.S. Cl.
CPC .................. *H02K 16/04* (2013.01)

(58) Field of Classification Search
CPC .......... H02K 16/04; H02K 21/28; H02K 7/00; H02K 1/27
USPC .............................. 310/114, 156.35
See application file for complete search history.

(56) References Cited

U.S. PATENT DOCUMENTS

2014/0159533 A1 * 6/2014 Kondou .................. H02K 3/12
310/156.53

FOREIGN PATENT DOCUMENTS

| CN | 202719103 U | * | 2/2013 | |
|---|---|---|---|---|
| JP | 2020188676 A | * | 11/2020 | |
| WO | WO-2019066487 A1 | * | 4/2019 | ............... H02K 1/14 |

* cited by examiner

*Primary Examiner* — Jose A Gonzalez Quinones
(74) *Attorney, Agent, or Firm* — Keating & Bennett, LLP

(57) ABSTRACT

A dynamoelectric machine including an inner cylindrical stator, an outer cylindrical stator, and a cylindrical rotor positioned radially between the inner cylindrical stator and the outer cylindrical stator, the cylindrical rotor being rotatable with respect to the inner and outer cylindrical stators. The cylindrical rotor includes at least one rotating conductor which includes a mixture of an electrically conducting material and a ferromagnetic material. The inner and outer cylindrical stators include at least one of (i) gradient magnetic field strength areas that vary in flux density longitudinally down along an axial direction of the dynamoelectric machine, (ii) different radial diameters of overlapping rotor and stator portions provided at different axial positions of the dynamoelectric machine, and (iii) electromagnets which are structured to be selectively energized based on a changing variable.

20 Claims, 41 Drawing Sheets

INTRINSICALLY ADAPTING VARIABLE GENERATORS AND MOTORS

BACKGROUND OF THE INVENTION

1. Field of the Invention

The present invention relates to novel structures and systems for improvements to generators and motors. More specifically, the present invention relates to generators and motors that are able to be made smaller, more powerful, and more efficient and able to function better in variable input and operating conditions, such as gusty and widely varying wind speeds, or in changing load and rpm operating conditions of a motor vehicle. These improvements have profound ramifications for power generation (especially in wind power generation) and electric vehicle industries. In power generation, the preferred embodiments of the present invention are able to harvest more power from a variable input, such as wind, while being smaller, lighter, and more robust. In the electric vehicle industry, the generators and motors of preferred embodiments of the present invention achieve greater efficiency, range, power density, and improved regenerative braking capacity.

2. Description of the Related Art

With the advent of wind power, engineers took the prior art's constant input/constant RPM requiring devices, and put them on top of a tower, adding one of various kinds of turbines to the input shaft. The wind spun the turbine and some electricity was produced, so this was considered a success. However, the input from wind is so highly variable it is the exact opposite of the constant steady input required by the early designs, so they fail to harvest a large portion of the available energy.

In general, a generator faced with the above input would produce little to no power for a significant part of the time that the wind is at lower speeds and would waste most of the available energy when the wind is blowing faster than needed for the ideal RPM. There have been improvements to wind and other generators to improve their function with a variable input. The vast majority are directed to finding ways to waste the energy, sacrificing harvesting efficiency to keep the generator from over-spinning and to match the grid's frequency. A reasonable estimate is that wind generators can waste up to 60 percent of the harvestable energy. Thus, currently available generators can only be feasibly sited in expensive, faraway places with the best wind, such as offshore or on top of a mountain, thus sapping more power due to line loss and limiting feasible sighting options.

There have been efforts to widen the RPM range and tolerance of variable inputs for generators and to improve the range of RPM and load in which motors can function at maximum efficiency, but the improvements have been modest. In the realm of wind power, largely, the alleged improvements simply waste the extra energy of wind that is faster than the generator's ideal speed so it can continue to operate at its lower output.

Active airfoils and responsive braking increase function in variable wind speeds by wasting the extra energy in fast winds. This makes the system much less efficient but keeps the generator operating during fast winds. Likewise, uncoupling the rotor RPM from the rotor field's RPM in the doubly-fed induction generator (DFIG) systems serves mainly to reduce mechanical stress on the generator by, again, wasting the extra lucrative energy in fast wind. In fact, most of the generator improvements dubbed "variable function" do so by wasting harvestable energy.

SUMMARY OF THE INVENTION

To overcome the problems described above, preferred embodiments of the present invention provide new generator systems and structures that instantly and constantly adapt to the variability of the wind. Conceivably, preferred embodiments of the present invention can harvest up to about 2½ times as much power as the conventional designs, depending upon the wind pattern. More importantly to the wind power industry, being so much more efficient, generators according to preferred embodiments of the present invention can be sited in orders of magnitude more places, including closer to where the power is needed.

According to a preferred embodiment of the present invention, a dynamo electric machine includes an inner cylindrical stator, an outer cylindrical stator, and a cylindrical rotor positioned radially between the inner cylindrical stator and the outer cylindrical stator. There are no salient poles and the field strength is uniform in the circumferential axis. The inner and outer cylindrical stators include gradient magnetic field strength areas that vary in flux density longitudinally down along an axial direction. Each of the inner and outer cylindrical stators can include hybrid electro/permanent magnets. The inner cylindrical stator may include permanent magnets and electromagnets that are respectively stronger than permanent magnets and electromagnets of the outer cylindrical stator in proportion to a size difference between the inner and outer cylindrical stators. Any difference in magnetic field caused by a size difference between the inner and outer cylindrical stators can be balanced by the difference in strength between the permanent magnets and electromagnets of the inner and outer cylindrical stators, and differences in the rotor's thicknesses.

According to another preferred embodiment of the present invention, a dynamoelectric machine includes an inner stator, an outer stator, and a rotor positioned concentrically between the inner stator and the outer stator. The inner and outer stators include gradient magnetic field strength areas that vary in flux density longitudinally down along an axial direction. Each of the inner and outer stators may include hybrid electro/permanent magnets. The inner stator may include permanent magnets and electromagnets that are respectively stronger than permanent magnets and electromagnets of the outer stator in proportion to the size difference between the inner and outer stators. Any difference in magnetic field caused by the inner and outer stators' size difference can be balanced by the difference in strength between the permanent magnets and electromagnets of the inner and outer stators, as well as by the wall thickness of the rotor. Both of the inner stator and the outer stator have a shape of one of a conical frustum, a Gabriel's horn, or a series of cylindrical segments with sequentially larger radii, for example.

In a preferred embodiment of the present invention, the rotor cylinder wall is defined by bars which are tapered toward a narrow end in the axial direction, but not so much that diminished ampacity will cause undo heating. Toward a wide end in the axial direction, where the rotor bars can become wide enough to harbor eddy currents, the bars can be longitudinally divided to maintain desired thinness (for example, similar to a tuning fork).

The above and other features, elements, characteristics, steps, and advantages of the present invention will become more apparent from the following detailed description of

DETAILED DESCRIPTION OF PREFERRED EMBODIMENTS

Figure 1:
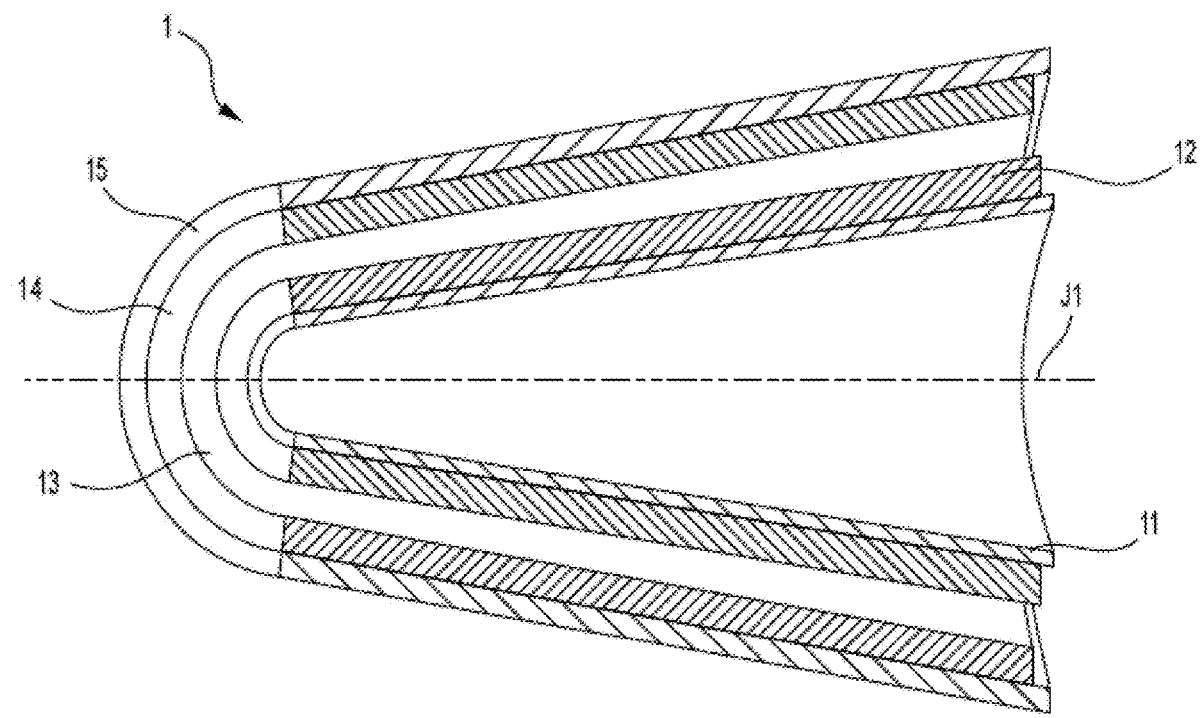
FIG. 1 shows a Stator magnet arrangement according to a preferred embodiment of the present invention.

Preferred embodiments of the present invention will now be described with reference to the Drawings.

Preferred embodiments of the present invention are usable for electric motor applications as well as generator applications. In the electric motor field, motors function at their peak efficiency at a fixed RPM and load value specific to each design. This is ideal when the motors are part of a system such as running a conveyor belt at a specific speed and with a steady load. Design engineers just choose the right kind and size of motor for the application and it will always run efficiently. But if either the load or the RPM of the motor changes, the motor moves out of its highest efficiency range thus reducing range and power.

For example, propelling a car is one of the most variable operating environments an electric motor can face. The vehicle stops, starts, goes backward, accelerates, decelerates, goes up and down hills, and carries a variable amount of passengers and loads. Because the load demands and RPM are constantly changing, the electric motor is often running outside its ideal efficiency zone.

Similarly, in the electrical generator field, generators are typically structured such that they output a peak power at a predetermined rotational frequency. This rotation frequency is typically chosen based on a desired AC power frequency such as, for example, 60 Hz. When an input rotation speed to the generators exceeds that which is required to output the peak power at the predetermined rotational frequency, then the rotating speed of the generator is reduced through braking or other mechanisms. This braking operation results in a large efficiency loss, as the generator is not able to use all of the energy provided by the input rotation speed.

An electric motor that can adjust itself instantly to its constantly changing operating conditions can add considerable range to the vehicle with increased propulsive and regenerative braking efficiency. Similarly, an electric generator which would be able to constantly and dynamically change its power generation parameters would be able to efficiently generate power over a continuous operation band including different environmental parameters.

A more advanced understanding of generators and motors is that they are not the device, nor the sum of their physical parts. The actual generator/motor is only the interaction of electric and magnetic fields. Thus, the only portion of the device that does the work is invisible and untouchable. All the physical components and systems just house the fields. It is erroneous to think of a motor/generator as being a physical device made of assembled parts. It is not a machine, it is an interface between two energies of magnetism and electricity. The physical parts are just a structure to generate and direct the two energies.

Starting with conceptualizations of perfect field interactions and working backward to understand the parts needed to foster and foment those perfect interactions makes it possible to discover and create entire novel lineages of motors and generators according to preferred embodiments of the present disclosure.

First Preferred Embodiments

First preferred embodiments of the present disclosure provide novel improvements which are directed towards increasing the magnetic field strength, organization, and effectiveness, and include a family of generally cylindrical embodiments, which are developed into conical embodiments in the next section. While the preferred embodiments are depicted with generally cylindrical shapes, it is noted that the technical features of these preferred embodiments are also applicable to multi-layer disk and multi-layer drum shaped arrangements or any other homopolar structures. Because the completed device involves a series of innovations that build on the ones before, they will be described sequentially starting with the most simple, basic permutation, and then building on previous permutations. The improvements generally fall into at least one of two categories. The first is improving magnetic field function and strength, the second is improving the generator/motors adaptability to function well with a wide range of variable input forces.

In the family of novel preferred embodiments described herein, the new stator will preferably include a minimum of 2, different diameter, concentrically nested, stator magnet layers (See FIGS. 1, 2, 7, 8, 12, 13, 18, 19, 21-25, and 30-32). In some other preferred embodiments, there will be additional stator layers between the levels of the multi-layer rotors (see, for example FIGS. 8 and 35).

As shown in FIG. 1, a stator assembly 1 according to one preferred embodiment of the present disclosure includes at least an inner yoke 11 with an inner permanent magnet 12 and an outer yoke 15 with an outer permanent magnet 14 which are concentrically positioned and define a hollow cylindrical or frustum air gap 13 (or magnetic flux region) between them in which a rotor assembly rotates. The inner permanent magnet 12 and the outer permanent magnet 14 are generally radially magnetized, usually, with opposite poles facing each other across the space between the concentric layers of the inter magnet air gap 13, i.e., they can be north outside/south inside or they can both be south out, north in.

Figure 4:
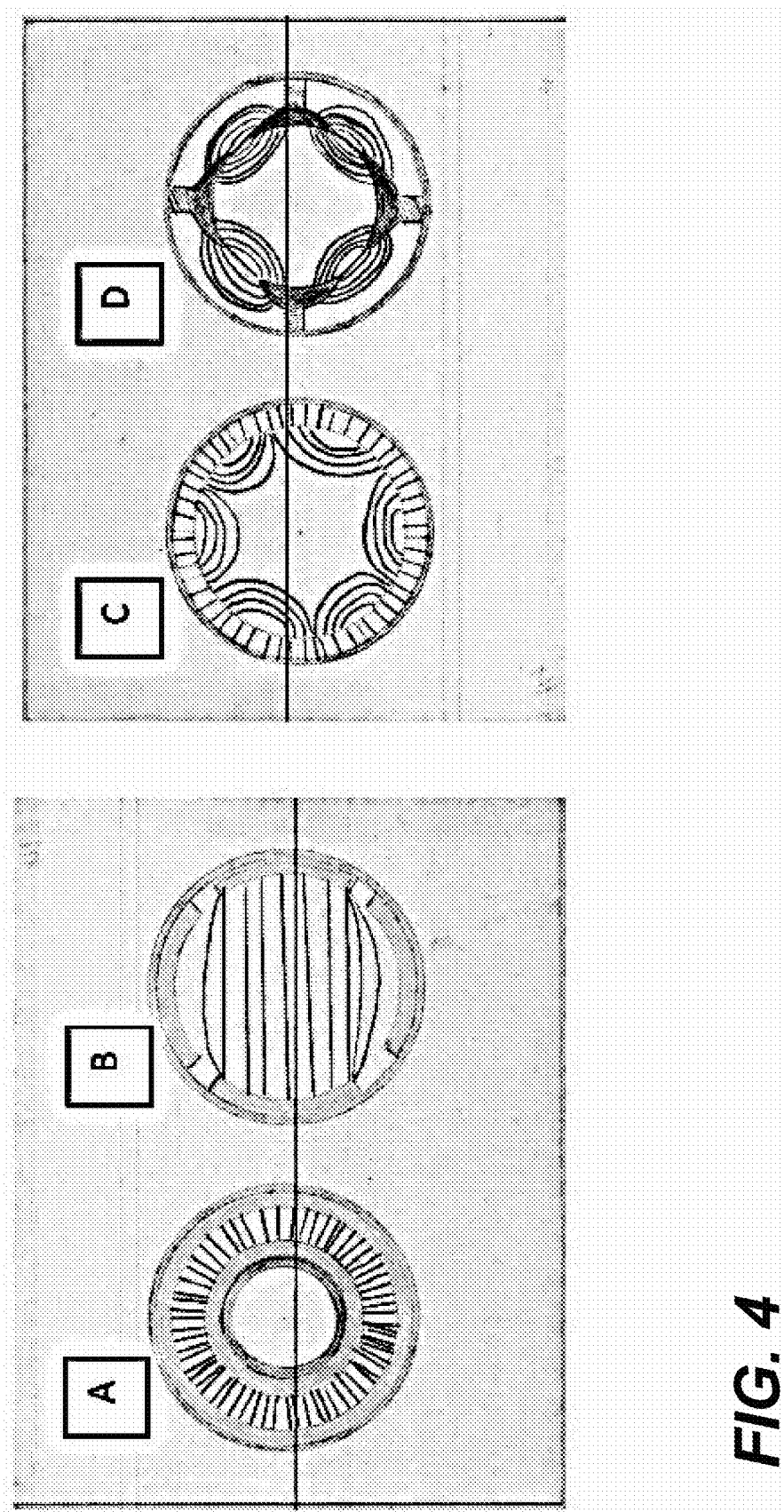
FIG. 4 shows various stator fields including: (A) radial fields and close magnets according to a preferred embodiment of the present invention, (B) permanent magnet and long, longitudinal field of a conventional machine, (C) induction/squirrel cage, DFIG, arcing long field of a conventional machine, (D) 4 arcing fields of a conventional DC machine.
Figure 5:
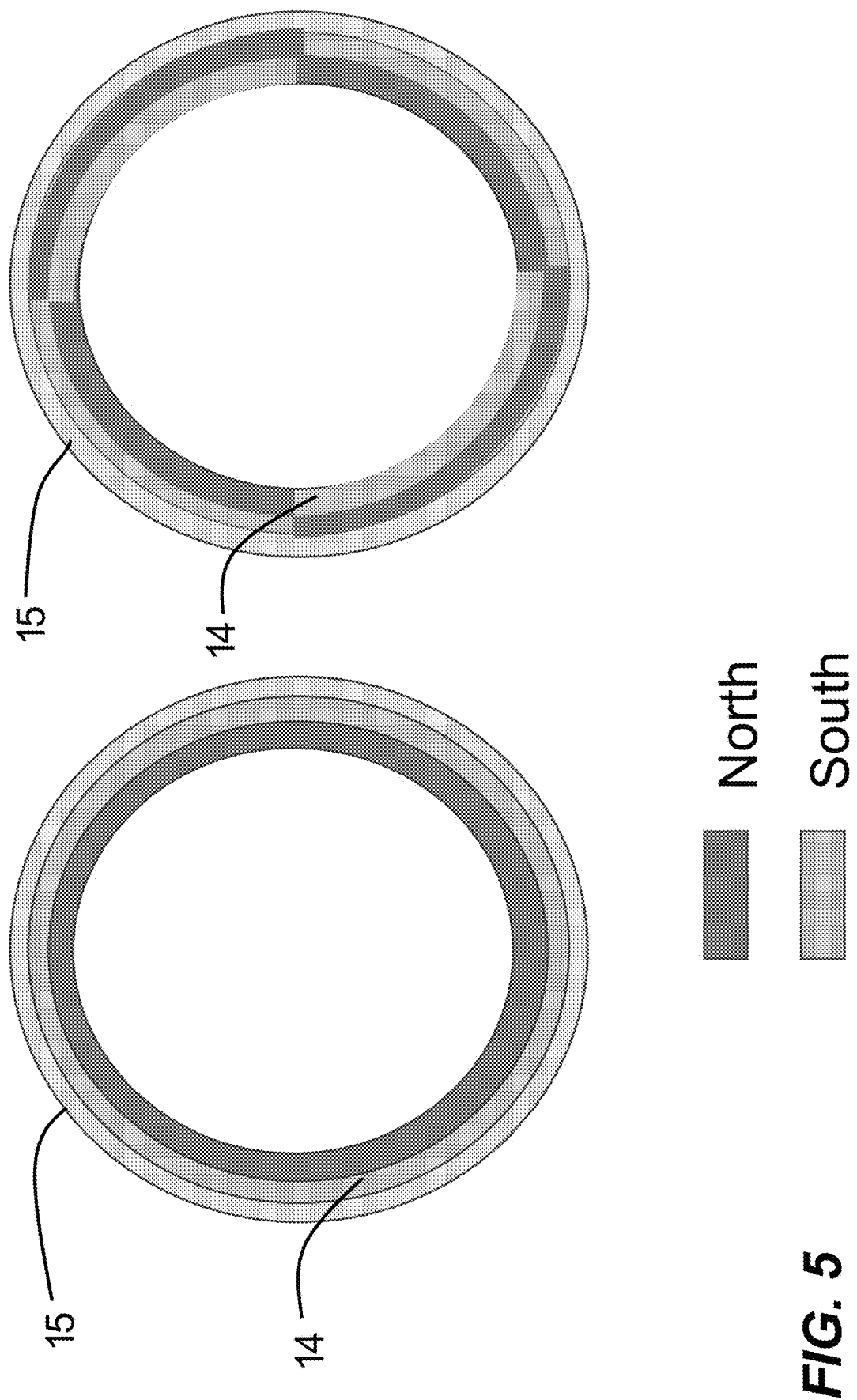
FIG. 5 shows alternating polarity radial fields according to a preferred embodiment of the present invention.

Generally, the air gap 13 contains the powerful inter-magnet radial field(s) as represented by (A) in FIG. 4 throughout the entire length and annular volume. This is in contrast to prior art stators which, as shown in (B), (C), and (D) of FIG. 4 generally either arc across the diameter of the stator or from the stator ring and back to a different spot on the outer ring that is not directly across.

Stationing the magnets (e.g., the inner permanent magnet 12 and the outer permanent magnet 14) in accordance with preferred embodiments of the present disclosure increases field strength due to magnet proximity, preventing field bulging and avoiding cross-fielding as described below.

The inter-magnet airgap(s) 13 in most preferred embodiments of the present disclosure is/are structured just wide enough to hold the body of the rotor 2 (discussed elsewhere in this specification) with a minimal gap on either side to prevent rubbing. But, as described below there are some preferred embodiments wherein the stators (e.g., 11 and 15) and rotor(s) 2 have areas with increased or gradient changes of gap width (see, e.g., FIG. 13).

Figure 2:
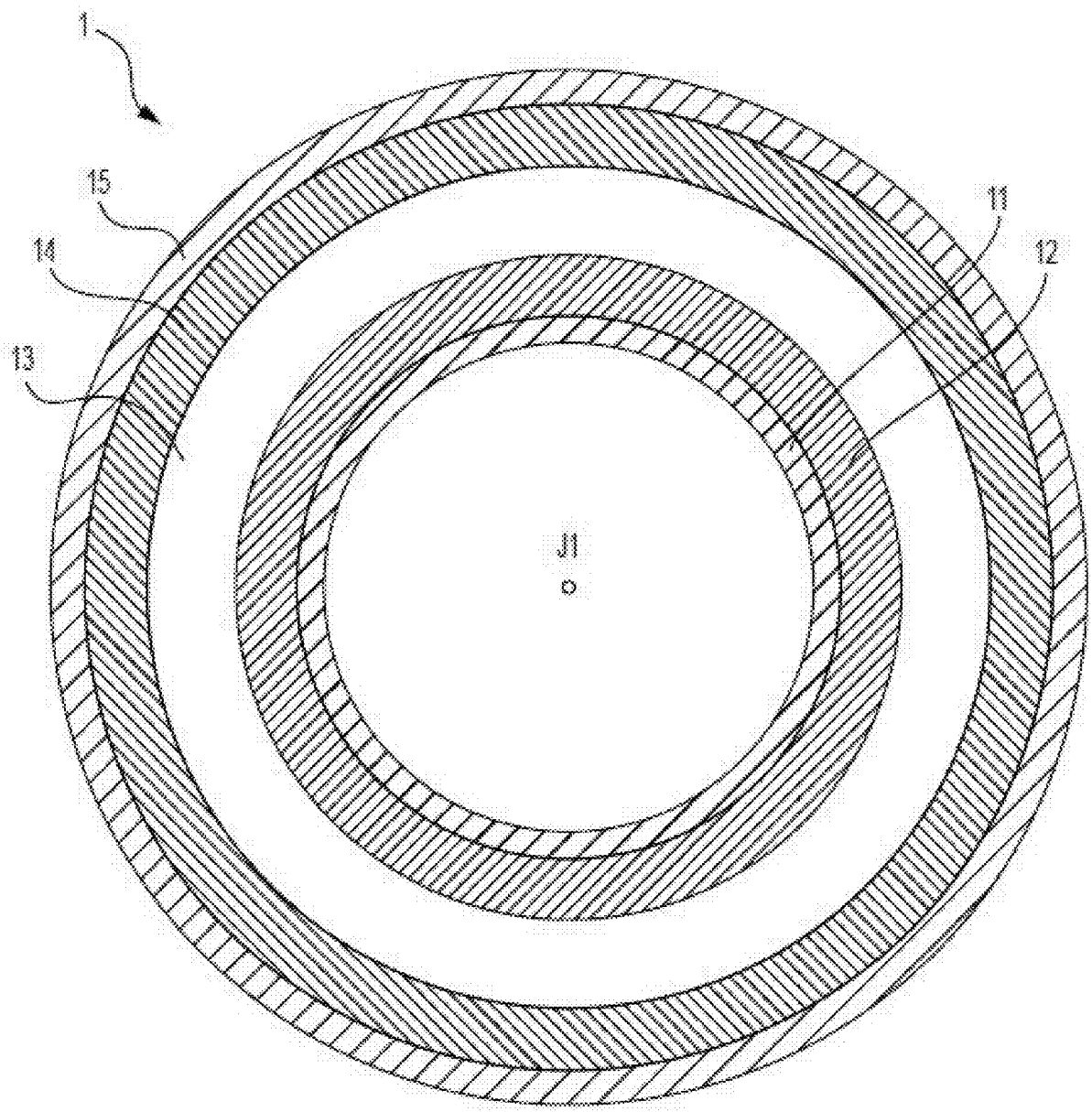
FIG. 2 shows an end view of FIG. 1.
Figure 3:
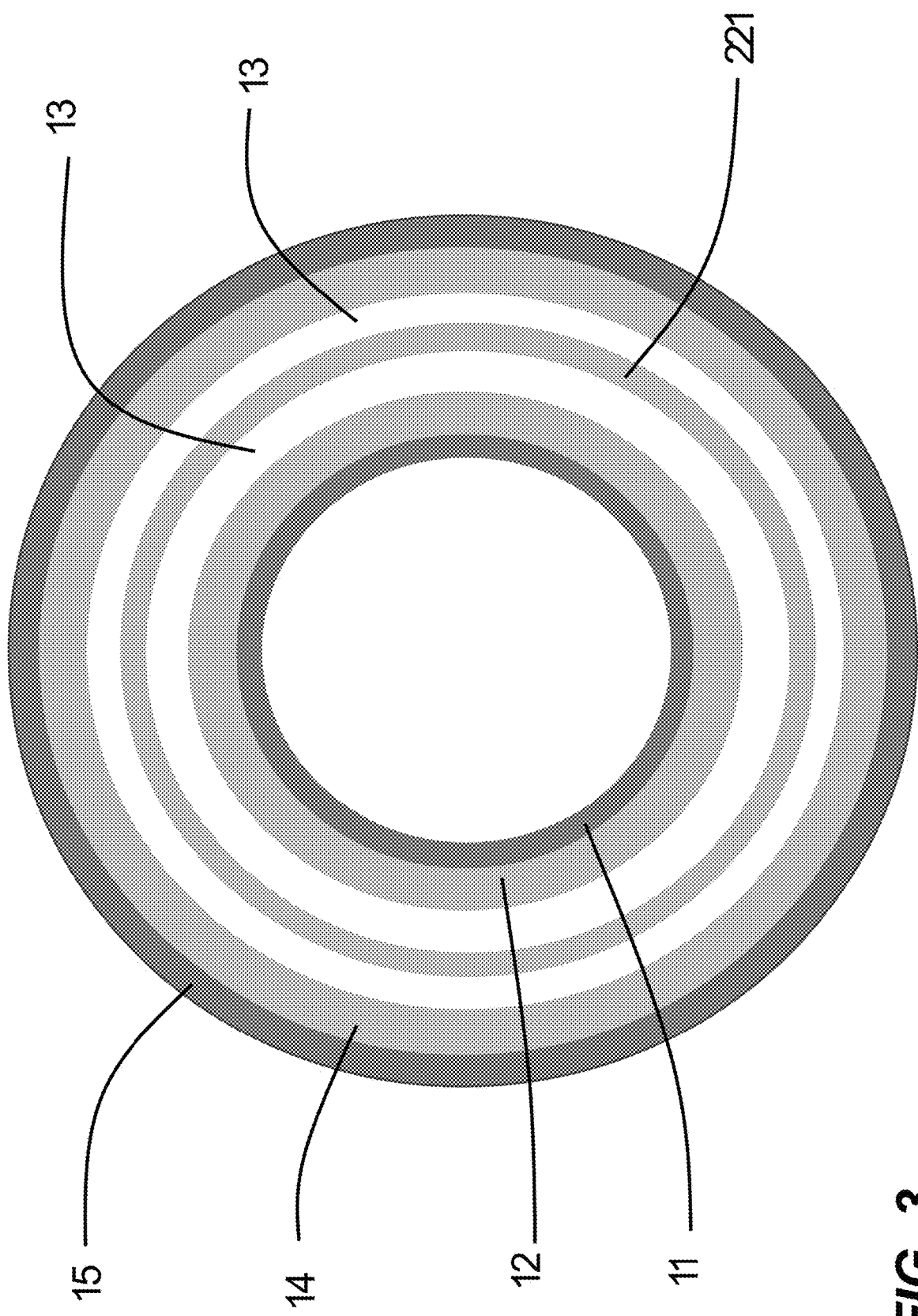
FIG. 3 shows a multi-layer stator according to a preferred embodiment of the present invention.
Figure 7:
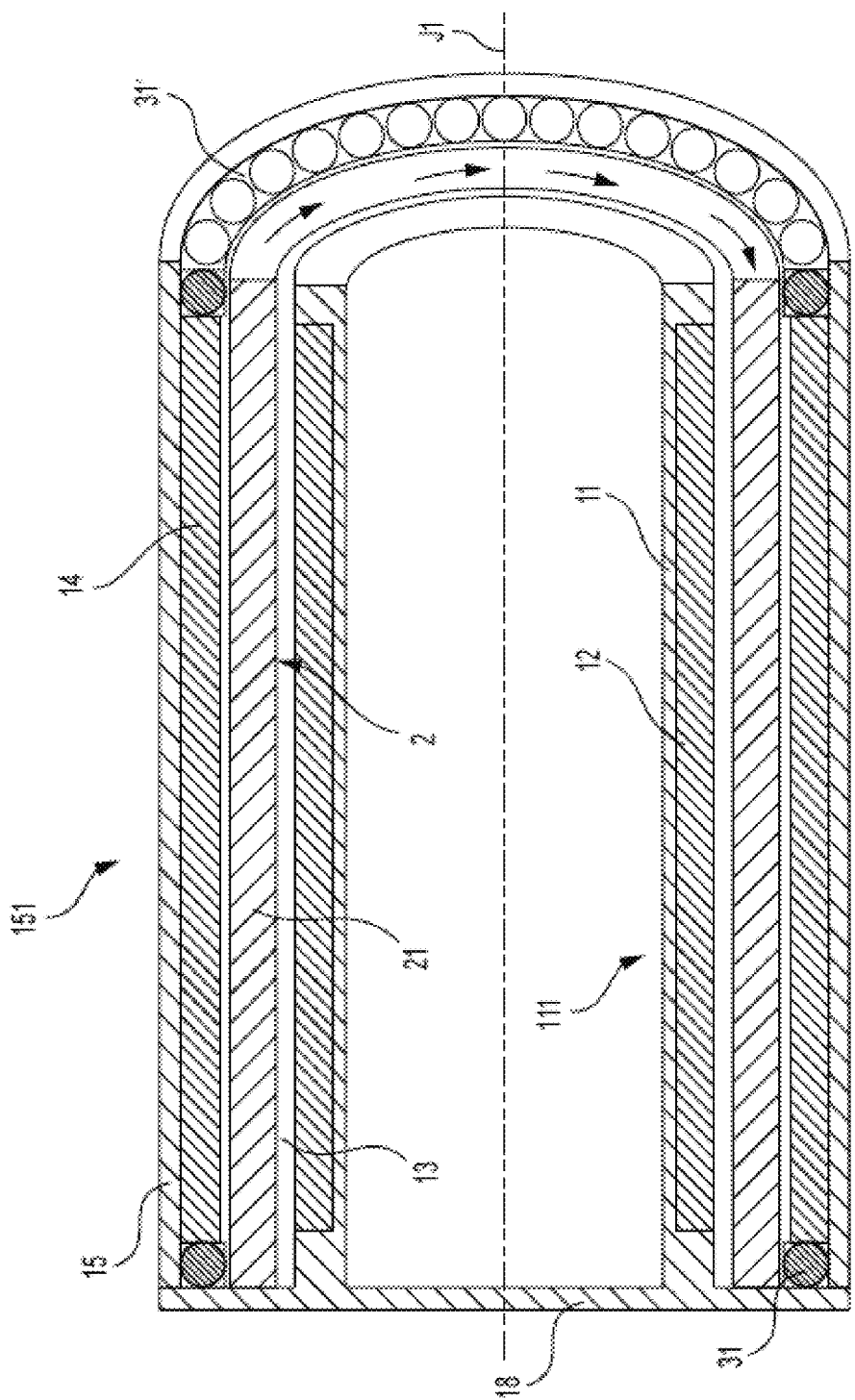
FIG. 7 shows a sectional side view of a dynamoelectric machine according to a preferred embodiment of the present invention.
Figure 8:
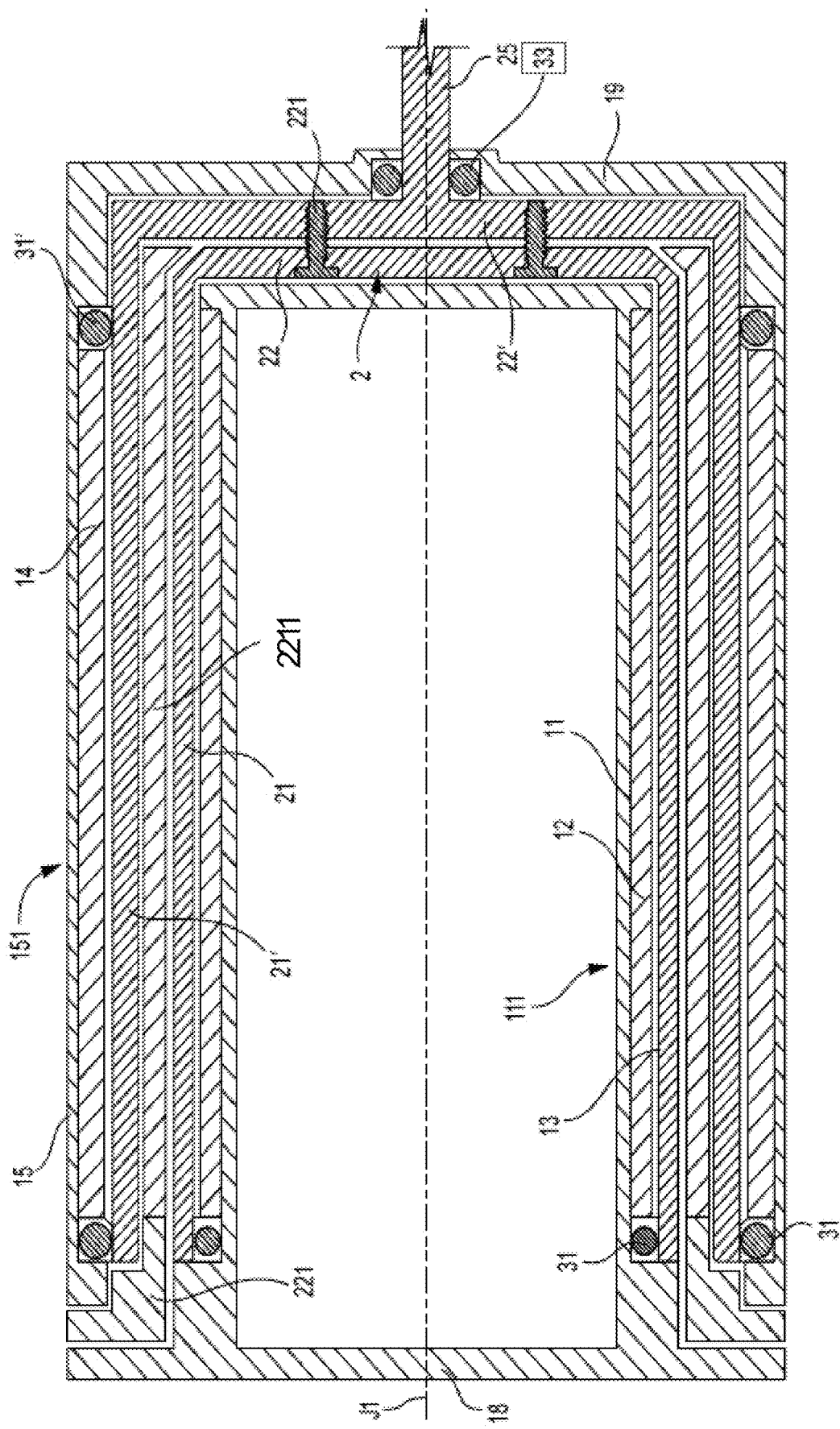
FIG. 8 shows a side cross-section view of a dual rotor/triple layer stator configuration according to a preferred embodiment of the present invention.

FIGS. 1, 2, and 7 show the general components of first preferred embodiments of a dynamoelectric machine of the present invention. The dynamoelectric machine preferably includes a rotor 2 which is opposed to a stator assembly 1 which includes two opposing stator yokes 11 and 15, upon which are, respectively, inner stator magnet 12 and outer stator magnet 14 magnetized in a radial direction with an airgap 13 therebetween. All of the rotor 2 and the stator magnets 12 and 14 and the yokes 11 and 15 preferably have conical or cylindrical shapes. The rotor 2 may include conductors 21 (preferably linear conductors) which are structured to rotate with respect to the stator yokes 11 and 15. The stator yokes 11 and 15 include magnets (preferably permanent magnets 12, 14 and/or electromagnets 16, 220) which generate magnetic fields in the airgap 13 through which the conductors 21 of the rotor 2 rotate.

Figure 26:
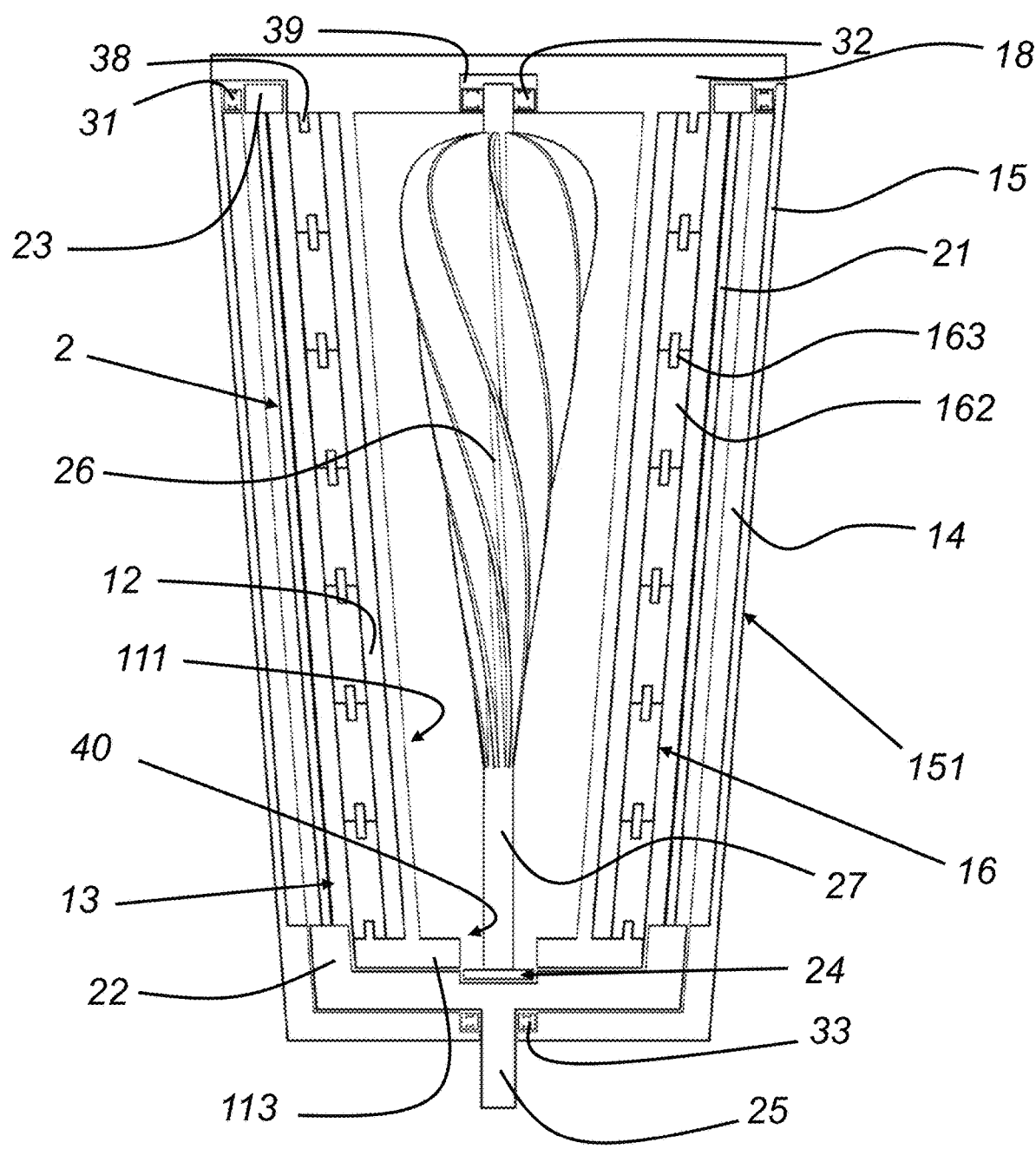
FIG. 26 shows a cross section of a dynamoelectric machine corresponding to a preferred embodiment of the present invention.
Figure 27:
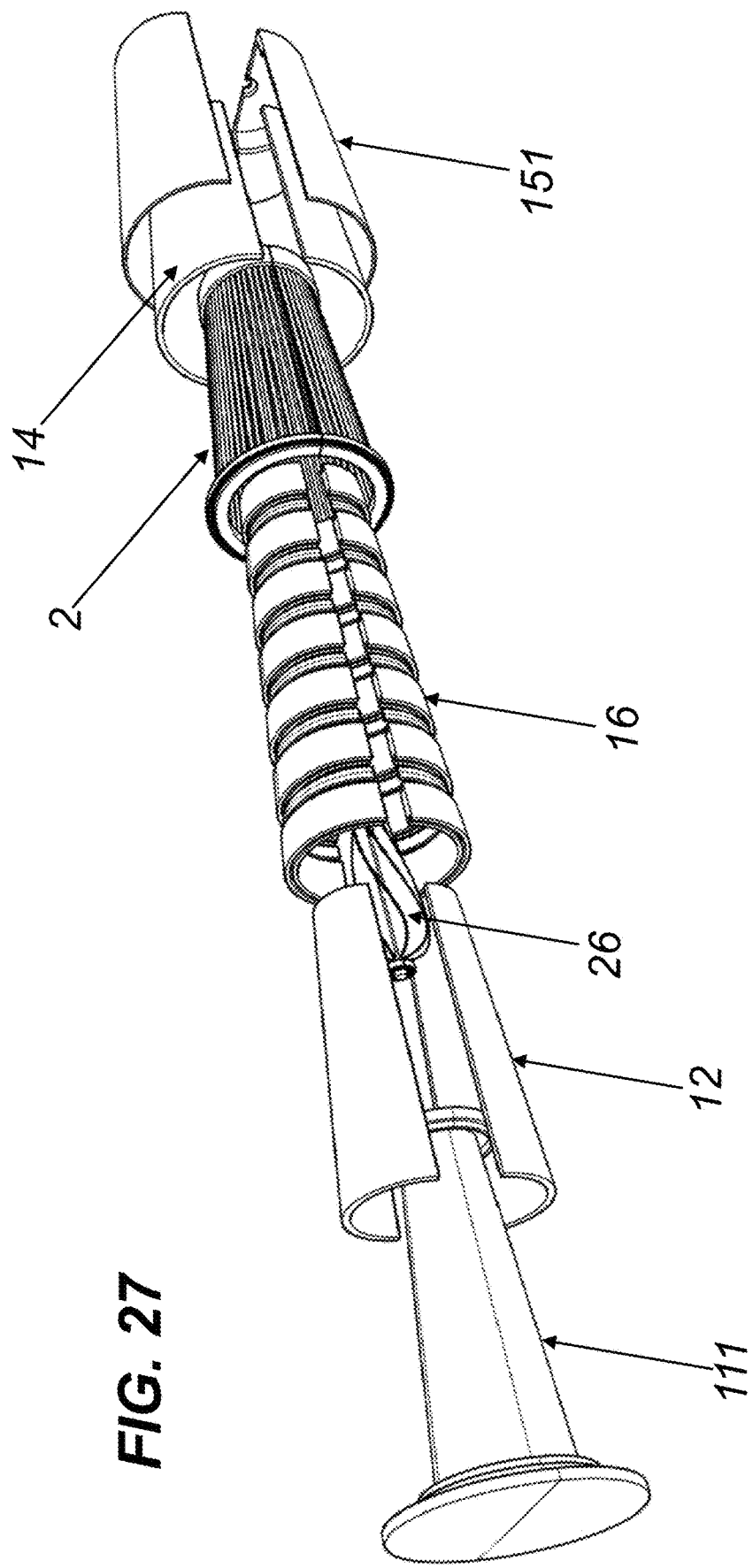
FIG. 27 an exploded perspective view of the dynamoelectric machine shown in FIG. 26.

The dynamoelectric machine in FIG. 26 preferably further includes a fan 26 located in a central tube 111 of the inner yoke 11. The fan 26 preferably has a spiral shape, and includes a fan shaft 27 which is fixed to the rotor 2 through a rotor fixing point 24 to rotate together with the rotor 2. The fan 26 generates an airflow to cool the components of the dynamoelectric machine.

The rotor 2 preferably includes a upper rotor ring 23 and rotor support frame 22 which are provided on opposing axial ends of the rotor conductors 21. An upper rotor bearing 31 is preferably provided between the upper rotor ring 23 and the outer stator 4. The rotor support frame 22 preferably includes an integrally provided drive shaft 25 which, in the case of a generator, receives a rotational input to rotate the rotor 2, and which, in the case of a motor, outputs a rotational force to drive an attached member.

As shown in FIG. 26, the inner yoke 11 preferably includes housing upper end 18 and a lower support plate 113 which are provided on opposing axial ends of the inner yoke 11. The inner yoke 11 is structured to support an inner radial surface of the inner permanent magnet 12 (which could be a permanent magnet, an electromagnet, or a hybrid permanent/electro magnet). The housing upper end 18 and the lower support plate 113 both preferably include linking tabs 38 which are structured to support axial portions of the inner electromagnet stator 16. The housing upper end 18 preferably includes a recess 39 which houses an upper shaft bearing 32 which rotatably supports an upper end of the shaft fan shaft 27. The lower support plate 113 preferably includes an opening 40 through which a lower end of the fan shaft 27 extends. The lower end of the fan shaft 27 is preferably affixed to a rotor fixing point 24 defined in the rotor support frame 22. The rotor fixing point 24 may include a recessed structure extending into the rotor support frame 22 and the lower end of the fan shaft 27 may be attached within the rotor fixing point 24 using, for example, fasteners, adhesives, welding, etc.

The outer stator yoke 15 preferably includes a housing lower end 19. The housing lower end 19 preferably includes a recess 192 which houses a lower shaft bearing 33 and an opening 193 which permits the driving shaft 25 to extend out through housing lower end 19. The lower shaft bearing 33 is structured to rotatably support the driving shaft 25. The outer yoke 15 which defines an outer shell 151 of the stator assembly 1. The outer yoke 15 is structured to support a radially outer surface of the outer permanent magnet 14 and to provide a flux path as well as cooling fins.

The inner electromagnet stator 16 preferably includes a plurality of bobbins 162 which are wound with wires of an electromagnet coil 17 and a plurality of linking plates 163 which interconnect adjacent ones of the bobbins 162. In other preferred embodiments of the present invention, the bobbins 162 may be replaced/exchanged with teeth. Further, the plurality of linking plates 163 may be omitted if coils which are wound on the plurality of bobbins 162 are too large to provide the clearance for the linking plates 163, which may be coils.

In preferred embodiments of the present disclosure, because the magnetic field is defined by magnets (e.g., permanent magnets 12, 14 and/or electromagnets 16, 220) that are closer to each other, the field is much stronger. With the magnet layout of preferred embodiments of the present invention, the fields are prevented from bulging the way they do in the conventional structures, making them still stronger, the field is 100% ordered, without cross-fielding or incorrectly orientated sections. A traditionally large, heavy and expensive laminated central rotor core and the laminate stator case are not needed, thus reducing the weight in half. These advantages and the others described in the advantages section, allow the motor and generator to be made smaller, lighter, and more powerful. Better magnetic utilization means less expensive and non-rare earth magnets can be used.

The generally cylindrical configuration requires a novel rotor. Starting with the theoretical simplest preferred embodiment of the present invention, the rotor can be one, or more than one, generally cylindrical tube(s) of electrically conductive material(s) suspended such that it can rotate within the inter-magnet air gap 13.

This rotor positioning and rotation can be accomplished by various structures including the bearings 31, 31', 32, and 33 associated with the ends and/or end caps of the stator assembly 1 and the rotor 2. This arrangement creates a significantly higher-efficiency/power rotor. In this most basic permutation, as the rotor 2 turns, the entirety of the inter-magnetic rotor wall (i.e., the rotor conductors 21), throughout its length, circumference, and thickness, transects a radial inter-magnetic field at right angles to the radial field lines. The rotor 2 does this throughout 100% of the rotation duty cycle. There is not another conventional rotor design that achieves that. All other conventional designs have dead zones in the rotor and field relative dead zones in their path of travel, with parts and regions of the rotor that do not contribute to torque or electricity production.

In preferred embodiments of the present invention, increasing the rotor length increases the voltage produced. Increasing the cross-sectional thickness of the rotor wall, Provided the stator field is adjusted to a constant flux density, increases amperage as long as neither the field nor metal has reached saturation. Increasing the stator and rotor diameters will increase the number of field lines per second being transected for a given RPM, which will lower the cut in speed and increase the power produced, while also increasing amperage in a second way. The larger rotor has a bigger circumference so there is more volume of metal. This increases the amount of metal that is simultaneously transecting the field lines so there is increased amperage.

The rotor thickness and inter-magnet air gap space width for each of these permutations is best optimized by balancing multiple factors including stator magnetic field strength range, included ways of fostering the rotors flux conductivity, material's susceptibility to current induction, magnetic permeability/saturation, amperage vs. voltage, expected RPM range, current and voltage loads, cooling requirements, type and amount of ferrous or magnetically permeable material used in the rotor, and need for longitudinal gradient strength in the magnetic field.

Such a simple, elegant, and relatively monolithic type of rotor has several advantages. It can rotate at a very high speed with minimal effect from the vibrations and centrifugal force that would destroy other structures. Virtually its entire mass can be current producing. There are no gaps such as the space between wires in a coil, allowing full use of the EMF active inter-magnet zone. It can be cast, machined, 3D printed or even extruded as a single piece saving manufacturing time, cost, and complexity. It does not require the expense and weight or complexity of a laminated metal core.

In addition to incorporating any combination of the above described attributes, first preferred embodiments of the present invention are additionally adapted such that the overall shape may become a tapering, generally conical frustum, including layers of similar concentric, but now generally conical, frustum segments. Each of these permutations is combinable with the other permutations to adapt the technology to specific applications.

As discussed below, shaping the stator assembly 1 and the rotor 2 in a generally conical frustum fashion confers a powerful ability to use a greater range of variable input's own force to make the generator instantly adapt to exactly match the strength of generator needed for maximal energy harvest of that input. This adaptation of gaining and dismissing generator strength to match the input force is seamless, instant and occurs without additional equipment, gears, clutches, brakes, active airfoils, computers, sophisticated controllers, etc. Much of that adaptability and its control are derived from the intrinsic advantages of the conical or stepwise cylindrical shape.

A correctly oriented wire or conductor, moving in the correct direction and speed such that transects enough correctly oriented field lines will experience both (1) an Electro Magnetic Force (EMF) that induces electrons to move down the length of the wire and (2) resistance to the motion proportional to the amount of current created. It is important to understand that a certain number of field lines per second must be transected for the creation of sufficient EMF to initiate the current flow. If the wire is moving too slowly or the field is too weak to supply the requisite field lines per second, current does not flow.

When a frustum is rotated about its central axis (height), all longitudinal points turn at the same RPM. Because points toward the wide end have to go further around their larger circumference in each revolution, they move proportionally faster and farther than points closer to the narrow end. For example, if the wide end had twice the diameter of the narrow end, points at the wide end have to travel twice the distance as those on the narrow end and therefore move twice as fast. In this description, the terms conical, generally conical, and frustum include but are not limited to shapes similar to Gabriel's Horn/Torricelli's Trumpet and convex-sided similar shapes. These terms also cover shapes that function similarly but have the sections arranged with stepwise diameters and/or not by radius gradient change, rather than conical. An example is shown in FIGS. 27, 33, 35, and 40. When referring to shapes such as cones, conical, generally conical, frustum, etc., all generally similar thick walled open-ended hollow structures are being described.

Figure 14:
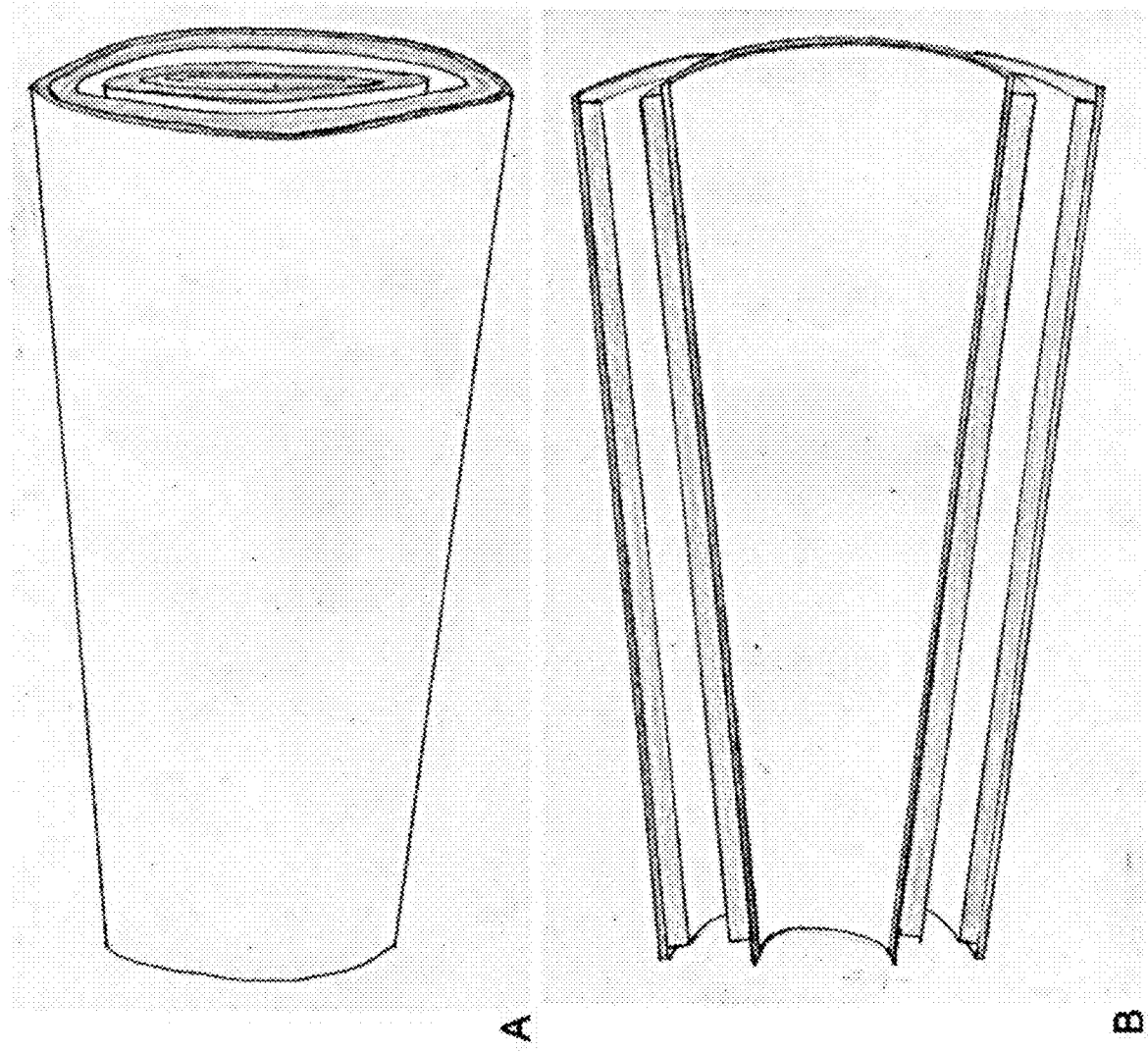
FIG. 14 shows a frustum stator according to a preferred embodiment of the present invention in: (A) a side perspective view and (B) a side cross-sectional perspective view.

In this series of permutations, the stator preferably includes two or more concentrically nested, radially magnetized generally conical frustum sections, as shown in FIG. 14. The generally conical inner yoke 11, inner permanent magnet 12, outer yoke 15, and outer permanent magnet 14 are arranged such that opposite poles are facing each other across the gap between the two cones. For example, the outer cone may include the outer permanent magnet 14 with a magnetic north facing inward and the inner frustum may include an inner permanent magnet 12 with a magnetic south facing outward, or vice versa. This creates a circumferentially uniform inter-magnet radial magnetic field with the lines oriented like the spokes of a bicycle generally perpendicular to the surfaces of the outer permanent magnet 14 and the inner permanent magnet 12. The outer permanent magnet 14 and the inner permanent magnet 12 cones can be made from a single piece of magnetic material or they can be formed from several magnets machined or shaped to fit together to make such a generally conical structure. Examples of these preferred embodiments can be seen in FIGS. 19-22.

Figure 15:
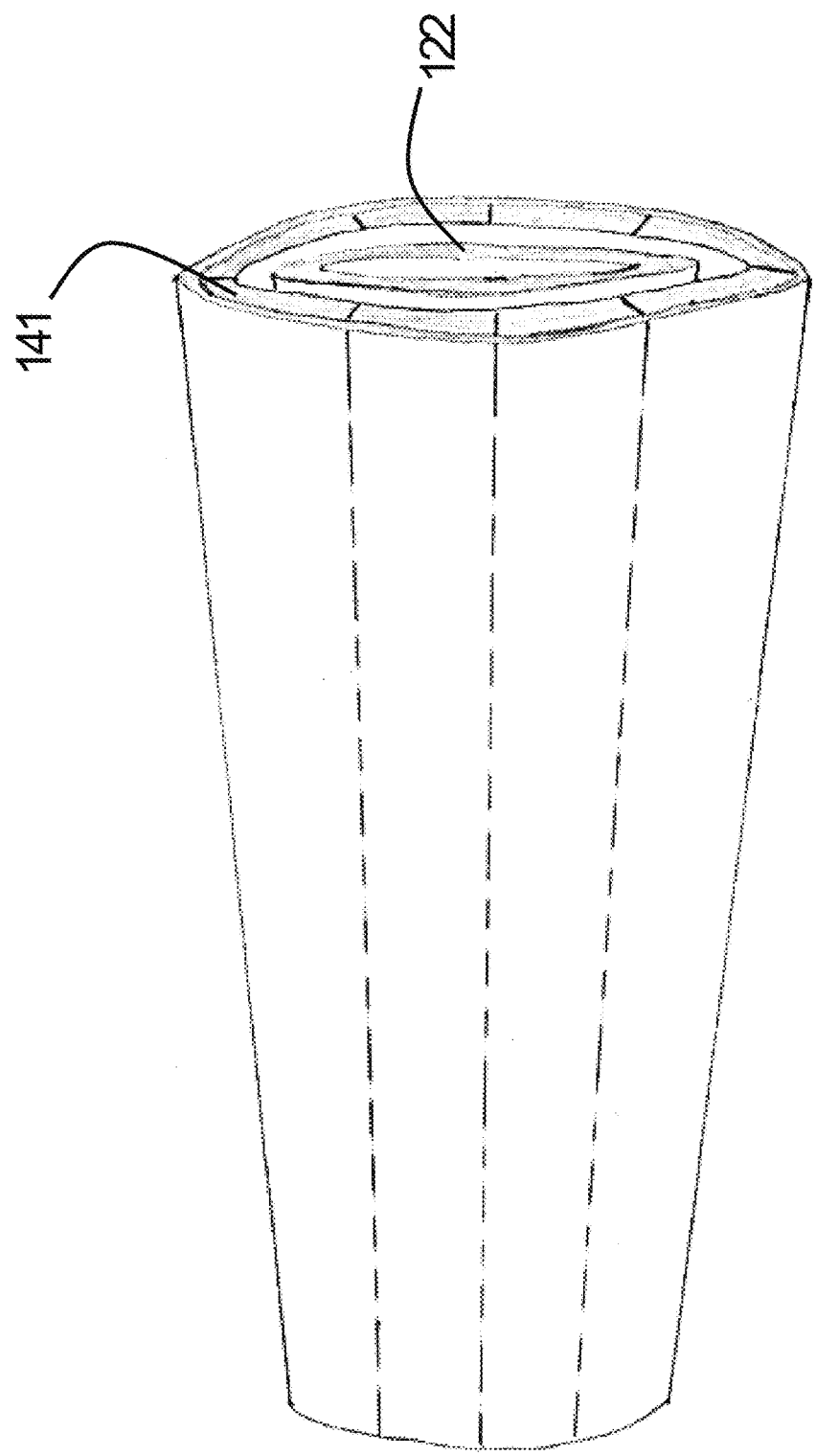
FIG. 15 shows a stator frustum according to a preferred embodiment of the present invention including assembled longitudinal wedge pieces.
Figure 16:
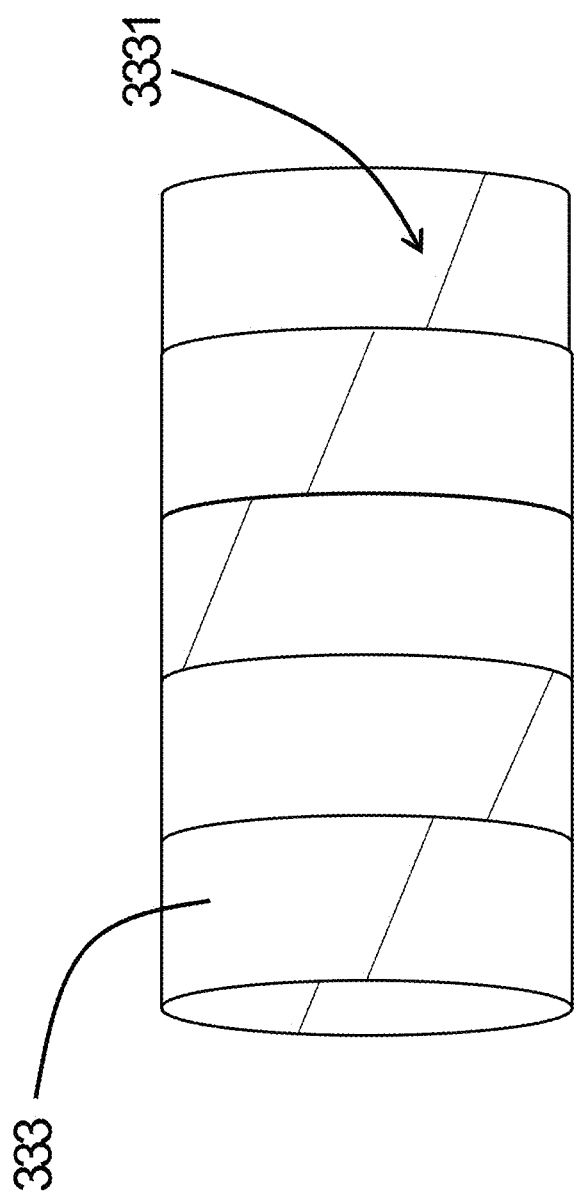
FIG. 16 shows a stator including latitudinal wedge sections without spacers according to a preferred embodiment of the present invention, in which longitudinal seams are preferably diagonal and staggered to prevent longitudinal weak areas in the field.

FIG. 15 shows that the outer permanent magnet 14 may be defined by longitudinally extending permanent magnet wedge pieces 141 which are opposed to permanent magnet wedge pieces 122 of the inner permanent magnet 12. FIG. 16 shows an example of a stator assembly 333 which includes latitudinal wedge segments 3331. The latitudinal wedge segments 3331 including diagonal ends which act to prevent longitudinal weak areas in the stator magnet 333.

Figure 17:
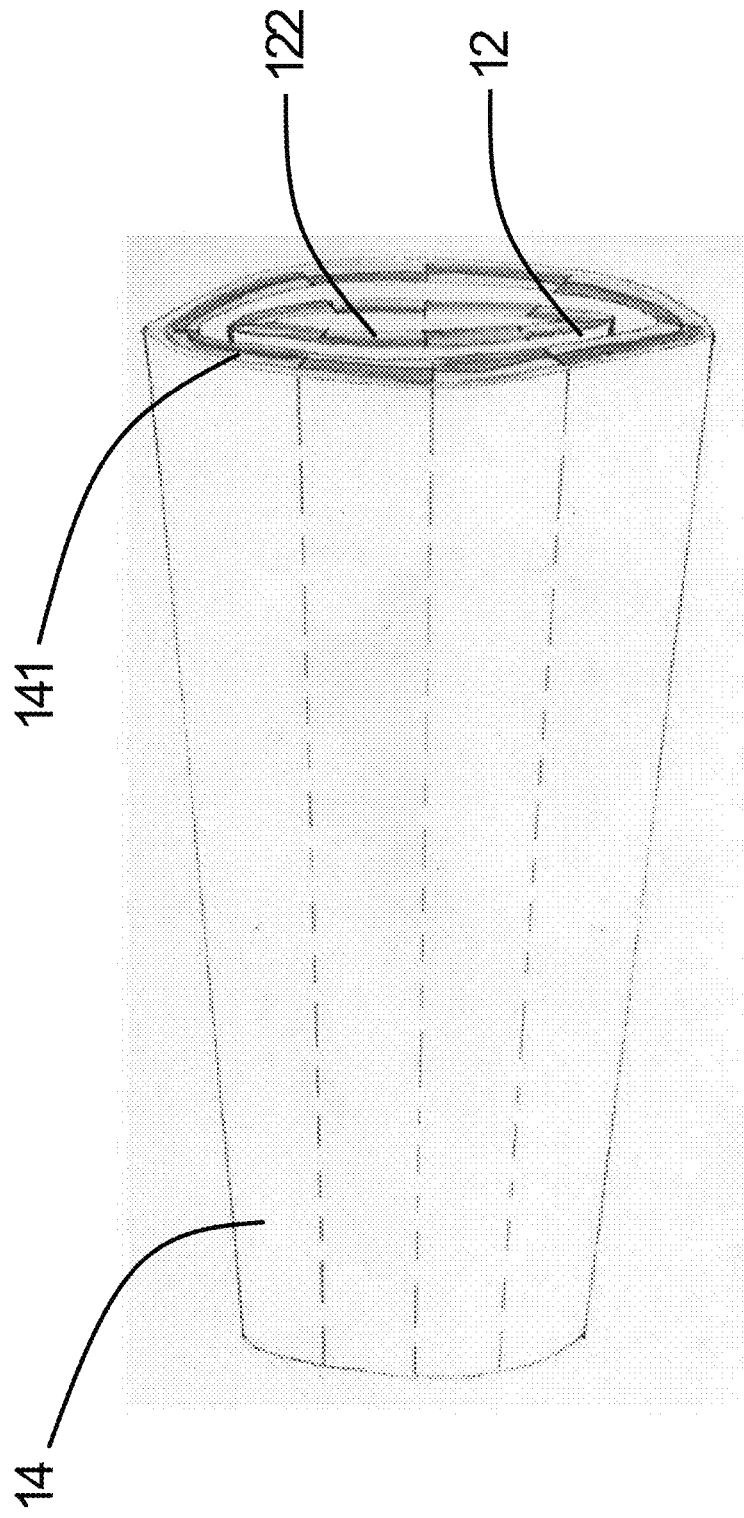
FIG. 17 shows a stator according to a preferred embodiment of the present invention with alternating adjacent longitudinal wedge segments magnetized with opposite polarity.

FIG. 17 shows that the outer permanent, electric, or hybrid magnets 14 may be defined by longitudinally extending permanent, electric, or hybrid magnet wedge pieces 141 which are opposed to permanent, electric, or hybrid magnet wedge pieces 122 of the inner permanent magnet 12, with magnetic polarities of opposing wedges of the outer permanent, electric, or hybrid magnets 14 and the inner permanent magnet 12 being reversed.

Another feature according to preferred embodiments of the present invention is that the magnetic field is also of a longitudinally gradient intensity. For example, the magnetic material of the wide end of the stator cones is stronger and generates a stronger, more dense flux field than is on the weaker narrow end, or vice versa, or any other organization of circumferentially uniform, but longitudinally different sections of field strength. Further, the flux field is adjustable via the electromagnet or electromagnet portion of the hybrid magnets.

Stators of preferred embodiments of the present invention include hybrid electric/permanent magnets. The permanent magnets allow the generator to start up without needing an excitation current, and the electromagnets can be used to selectively augment the field strength as a way of adapting the generative capacity such that the generator can act as a stronger generator or a weaker generator on demand. In fact the electricity that goes into the electromagnets may come from the generator itself so there is the opportunity for it to become not only an adaptable generator, but a self-controlling, automatically adjusting generator. The wind speed changes the RPM which increases the amount of electricity available. A small portion of that electricity is shunted through the electromagnets making the generator stronger so it can handle the higher energy input of increasing wind speed. This also increases the counter torque resistance to further acceleration referred to herein as "generative braking."

In a preferred embodiment of a rotor of the present invention, the conical stators/rotors may be provided as stepwise cylinders or frustums. The stepwise configuration can offset the voltage differences created at each radii. Voltage is a function of speed of rotation, field strength(s) and length of the metal in the field. That is, the more magnetic flux lines per second being cut through by the metal bars of the rotor, the higher the voltage produced.

It is preferable for the additional areas provided by conical stators/rotors (i.e., areas which are not present in conventional cylindrical stators/rotors) to produce voltage that is similar. In one example, this can be attained by having a shape that is the same as or substantially similar to a Gabriel's trumpet overall shape that makes the subsequent cut in areas longer so they create equal voltage to the shorter but wider area that cut in first. Another way of equalizing the voltage is to have the narrower diameter segments be longer in proportion to the wider diameter segments as is seen in FIG. 40. Yet another way is by controlling the stator field intensity of each segment.

Additional Permutations of the Concentric and Cylindrical Design can be made in accordance with additional preferred embodiments of the present invention. Some of the preferred embodiments of the present disclosure include the non-limiting examples below.

Stator Alternative Polarities. The stator magnetization polarity can be arranged in other fashions, such as having different longitudinal, generally wedge-shaped, areas magnetized in opposite directions as in stepper motors, three phase devices, and AC generators and motors described in in later discussions.

Differential Strength in the Stator Magnets. The two magnetic stator layers can be of similar or different magnetic strengths. An example would be making the inner, smaller layer out of a stronger or thicker magnet composition to balance the larger field coming from the larger outer magnet.

Alternative Stator/Rotor Configuration. The generally cylindrical magnets and yokes could rotate, individually or together, as the rotor, and the above described rotor can be the stator. Or both could rotate relative to the other. In the most commonly used preferred embodiment, the magnets will be stationary, forming the stator and inter-magnet air gap. There may be a non-magnetized buffer zone between the adjacent areas of opposite polarity.

Figure 6A:
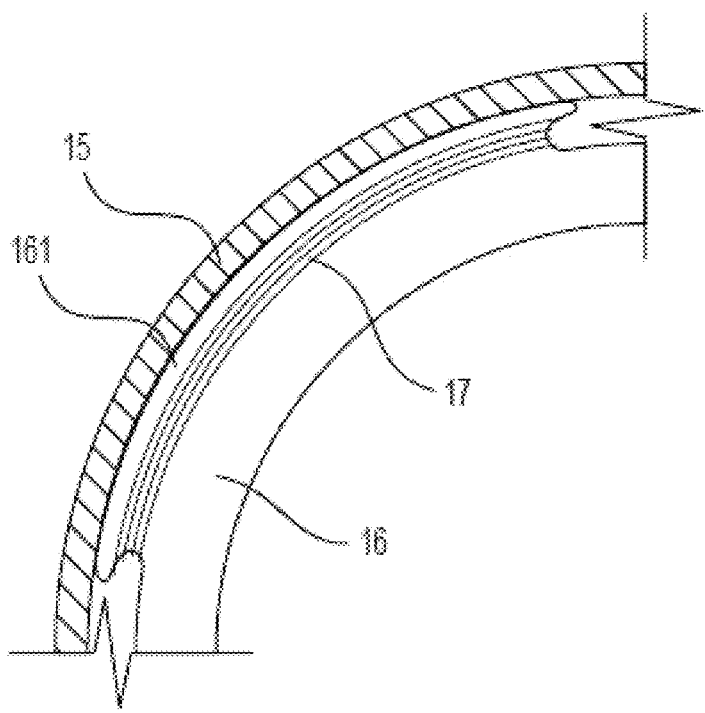
FIGS. 6A-6F show hybrid permanent magnet/electromagnet configurations according to preferred embodiments of the present invention.
Figure 6B:
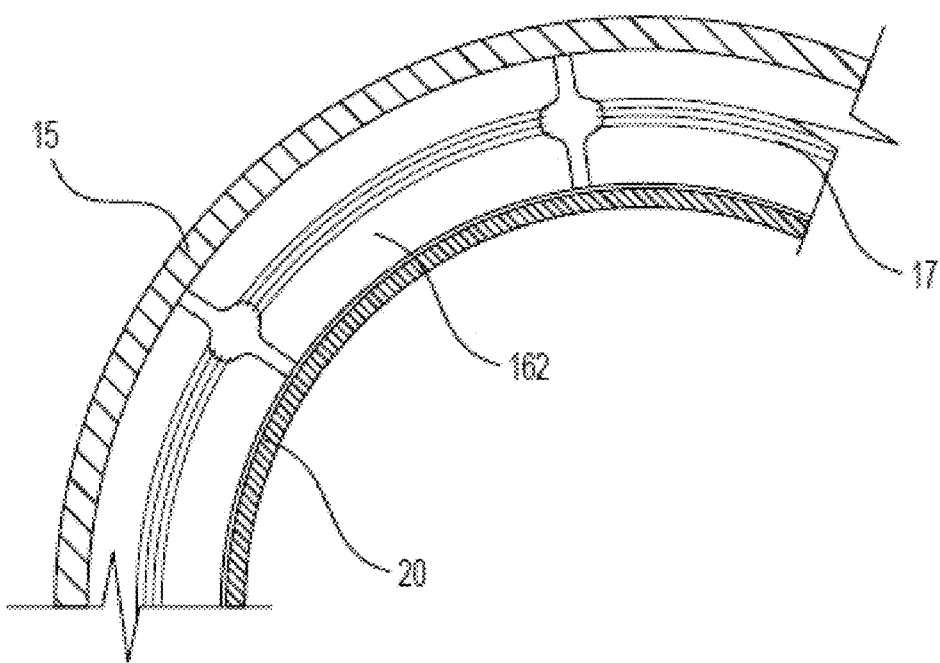
Figure 6C:
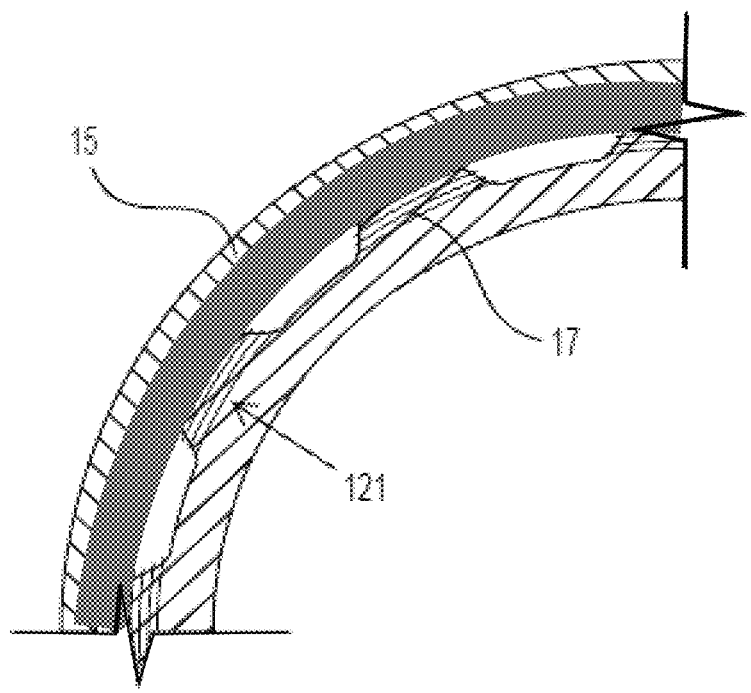
Figure 6D:
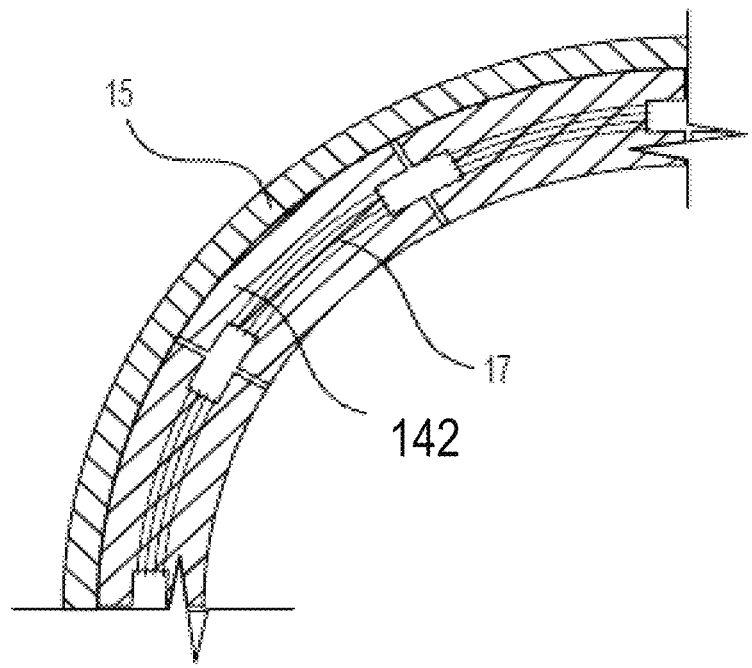
Figure 6E:
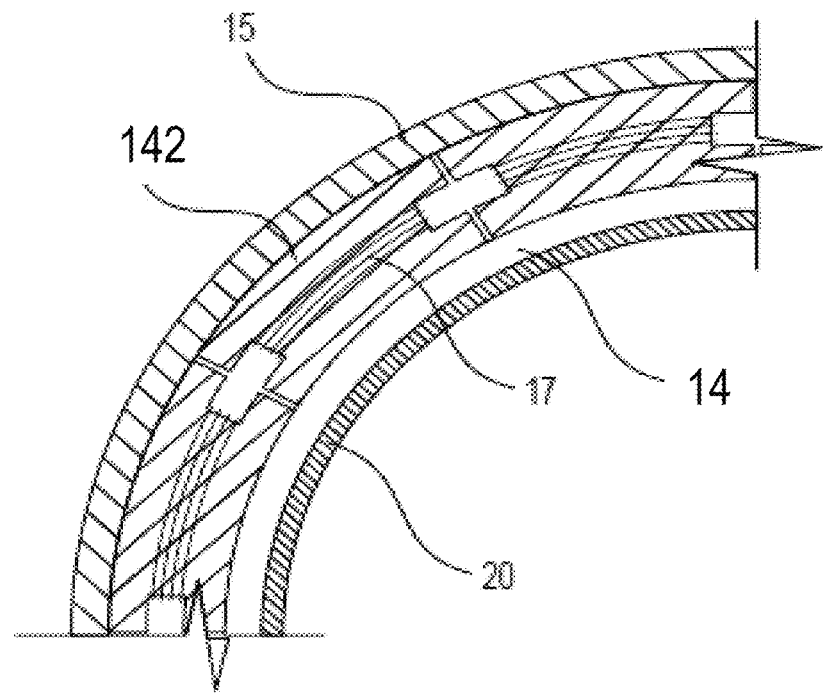
Figure 6F:
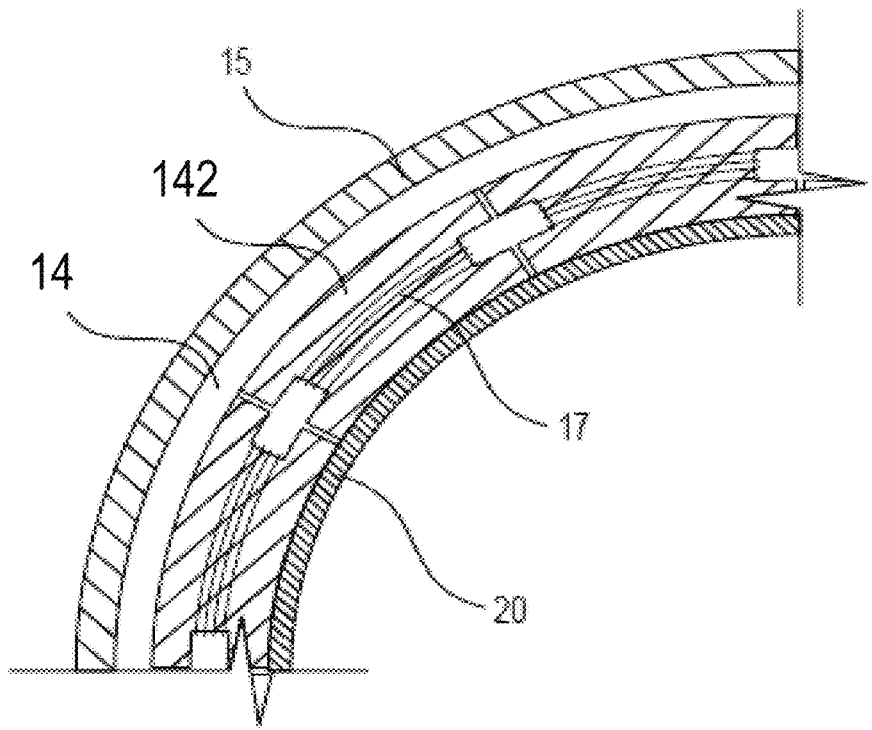

Permanent and Electromagnets. The stators can be permanent magnets, electromagnets, or any combination of either. As shown in FIGS. 6A-6F, the following arrangements could be possible. FIG. 6A shows an outer yoke 15 that includes an electromagnet stator 16 which includes an electromagnet coil 17 wound about a stator projection 161, FIG. 6B shows an outer yoke 15 that includes an electromagnet stator 16 which includes multiple bobbins 162 which are wound with individual electromagnet coils 17 and covered by a ferromagnetic field leveler 20, FIG. 6C shows an outer yoke 15 that includes an outer permanent magnet 12 with outer magnet protuberances 142 which are wound with individual electromagnet coils 17, FIG. 6D shows an outer yoke 15 that includes an outer permanent magnet 12 with outer magnet bobbins 142 which are wound with individual electromagnet coils 17, FIG. 6E shows an outer yoke 15 that includes an outer electromagnet with outer magnet bobbins 142 which are wound with individual electromagnet coils 17 and covered by a ferromagnetic field leveler 20 which is spaced apart from the outer magnet bobbins 142 with a permanent magnet 14 therebetween, and FIG. 6F shows an outer yoke 15 that includes an electromagnet with outer magnet bobbins 142 which are wound with individual electromagnet coils 17 and covered by a ferromagnetic field leveler 20 with permanent magnet 14 between the outer yoke 15 and the outer magnet bobbins 142.

In FIGS. 6C-6F, specially crafted permanent magnet extensions may define and function as electromagnet cores provided the magnets are structured with unsaturated domains. If the electromagnet component is on the rotor side of the outer yoke 15, its ferrous core and coil will be of sufficient size and composition to not saturate unless the electromagnets are at full strength.

Single Solid Magnet or Combined Magnetic Segments. Starting with a generally cylindrical structure, in a preferred embodiment, the stator permanent magnets each will include a single solid contiguous magnet. They can alternatively be composed of magnetic segments structured to fit together to make a stator magnet of generally the same overall shape.

Ferrous Layer, Powerful Magnetization, or Staggered Seams. If the generally cylinder magnet stators are formed of subset segments, a field leveling layer of thin ferrous or other magnetically active/conductive material can help even out inhomogeneities in the magnetic field that form around the magnet center as weak spots in the field could allow potential limits of generative ability by allowing electrical backflow or eddy currents. Another way to prevent electrical eddy and backflows would be utilizing powerful magnetization in all or in circumferential segments of the rotor, as would staggering the seams and the creation of laminated or segmented rotor described below.

Permanent and/or Electromagnets. The preferred embodiments of these generally cylindrical versions utilize hybrid combinations of electromagnetic and permanent magnets. In one such example, due to the difference in area, an inner magnet cylinder made of the same material and same thickness with the same magnetization as the outer ring would support a smaller field than the outer ring. This can be balanced by making the inner ring a stronger magnet via increased magnetization, compositional changes, and thickness changes, but also by the addition of an electromagnetic component. Utilizing an electromagnet component can allow for active control modification of the strength of the inter magnet field.

Figure 6G:
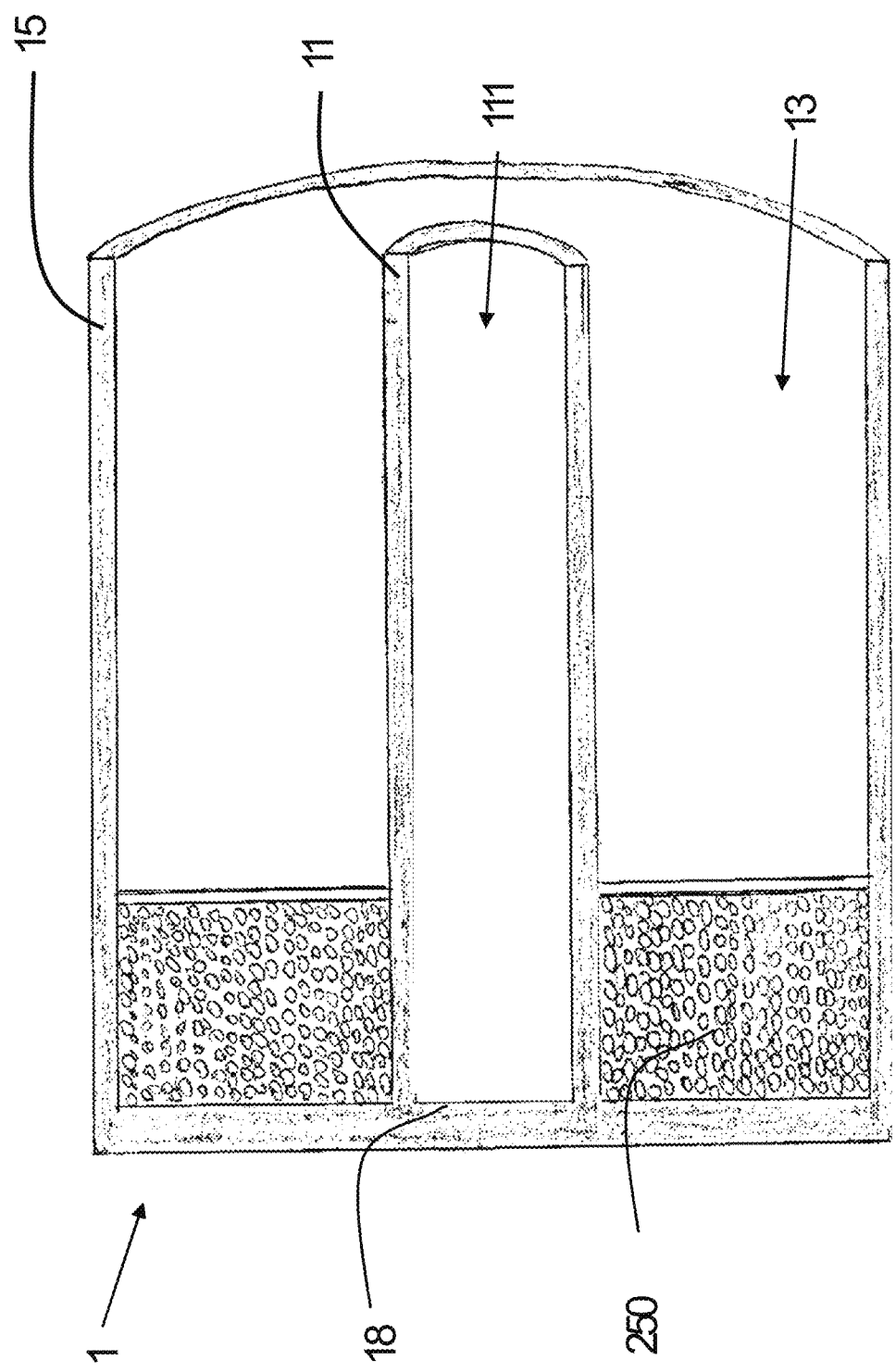
FIG. 6G shows another example embodiment of a stator according to a preferred embodiment of the present invention.

FIG. 6G shows an another example of a preferred embodiment of a stator assembly the present disclosure. The stator assembly 1 in FIG. 6G includes an inner yoke 11 and an outer yoke 15 which are connected through an end 18. The inner yoke 11, the outer yoke 15, and the end 18 may be made from a ferromagnetic material (preferably iron for AC applications and permanent magnet material for DC applications). A lower electromagnetic coil 250 is preferably provided on an inner surface of the end 18 between the inner yoke 11 and the outer yoke 15. A portion of a coil retaining barrier or bobbin 251 is preferably provided on an upper surface of the lower electromagnetic coil 250 to firmly retain the lower electromagnetic coil 250 on the inner surface of the end 18 between the inner yoke 11 and the outer yoke 15. The lower electromagnetic coil 250 is structured to be driven with a current to adject the magnetic flux field of the inner yoke 11 and the outer yoke 15. An inner and outer rotor (not shown) can be respectively inserted between the inner yoke 11 and the outer yoke 15, and within the central tube 111 of the inner yoke 11. The outer yoke 15 preferably corresponds to magnetic south while the inner yoke 11 preferably corresponds to magnetic north, however it is also possible to reverse these polarities if so desired.

Next is a comparison between generator stator structures of preferred embodiments of the present disclosure and a conventional wind generator stator structure.

Preferred embodiments of the present invention provide generally conical, or functionally conical, machines with a plurality of stators that make magnetic fields with different characteristics than the conventional art, so they are structurally and functionally unique. To start with, as described above and as explained further here, unlike the stators of the prior art, preferred embodiments of the present invention include stators which are defined by circumferentially uniform cylindrical or conical circumferential annular segments, rings, cylinders and/or frustums that have no strong defined salient poles and have a circumferentially uniform radial magnetic field. Unlike the prior art, in the circumferential cross section the magnetic field is entirely radial, uniform, without gaps, weak spots, bulging, cross fielding, or disorganized sections. This helps to produce their novel function. Further, unlike the conventional art, some preferred embodiments of the present invention include hybrid electro/permanent magnets which are able to be oriented circumferentially and which preserve the circumferential uniformity of the magnetic field.

Most of the generators used in wind power have a single stator on the periphery of the rotor. Induction, squirrel cage, DFIG, Type 2, reluctance, synRM, synRM IPM, and others all use nearly identical stators. These stators include a series of adjacent and often partly overlapping electromagnet winding coils. When this form of stator is operating as a motor, specific numbers of grouped adjacent coils are electrified momentarily (for a fraction of a second), creating electromagnetic fields that combine to briefly make a series of melded magnetic fields.

Different structures energize the coils in different patterns to make different shapes and numbers of melded fields. In some motors or generators, the melded fields are oriented straight across the center to the opposite side. In other motors or generators, the stator fields take a more diagonal course arcing to adjacent side areas. When this form of stator is used in an induction generator, as the spinning rotor bars rotate past the electrified stator coils, electric current loops are induced in the rotor bars. The current loops make their own electromagnetic fields. These induced fields are moved by the spinning rotor such that they pass through the stator windings, in turn inducing a back EMF that becomes strong enough to overcome and reverse the flow of exciter current. This current is the generator output. In grid-tied systems, the rotor has to spin about 3% faster than the 1500-3600 RPM of the stator field adjusted for the number of poles.

When this form of stator is used in a wound rotor or DFIG generator, instead of bars, the rotor has electromagnets that are selectively energized to create their own set of field RPMs. These fields, again, rotate past the stator cores where they propagate into the cores and through the stator windings inducing the flow of electrical current. Again, in direct grid-connected systems, the rotor has to be forced to spin faster than the stator field which is usually turning at 1500-3600 RPM (depending on the number of poles) for American power grids.

In a preferred embodiment of a rotor of the present invention, the entire rotor is a solid structure. This gives the maximal amount of rotor metal in the intermagnet field, but not being longitudinally laminated increases the propensity for eddy currents and back currents in the weak spots of the inter-magnetic field. This is partially atoned for by making the magnetic field stronger and as near completely uniform as possible. However, another preferred embodiment of the present invention shown in FIG. 31 has the rotor 2 divided into longitudinal sections hereafter named bars or longitudinal segments 211. In the tapered preferred embodiments, the wider ends of the rotor would have wider laminations than the narrow end, and/or branching laminations. The wider end would again have a degree of propensity for eddy currents or reverse currents under heavy loads. One solution is to partially split the wide end of the bars longitudinally one or more times as shown in FIG. 31.

Figure 31:
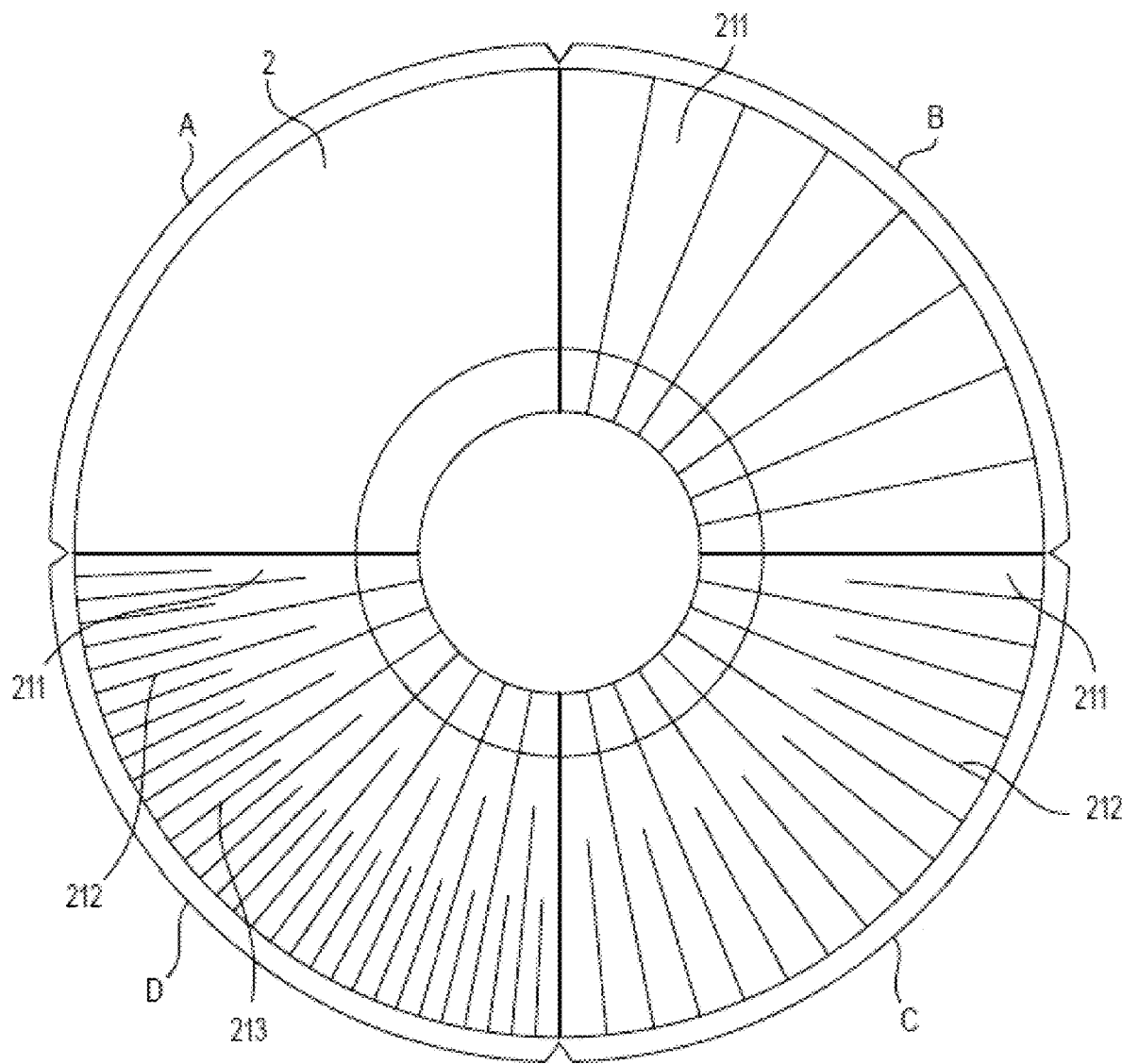
FIG. 31 shows examples of rotor configurations according to preferred embodiments of the present invention.

As shown in FIG. 31, the tapered rotor 2 is shown with a narrow end facing outward from the drawing. The tapered rotor has been quartered to show different ways to create laminations. Please note that FIG. 31 is for informational purposes only. Actual devices will preferably have the structure of only one of the quadrants in FIG. 27. In the A quadrant of FIG. 31, the rotor 2 is solid and not laminated. In the B quadrant, the rotor 2 is formed of simple laminated tapering bars 211. In the C quadrant, the individual bars 211 are additionally longitudinally split 212 at a point where wideness can cause problems. In the D quadrant, each bar is split three times with the center split 212 going further down the bar 211 than the lateral splits 213.

The thinnest areas of the bars 211 might heat up if they are too small due to the decreased ampacity of the smaller cross-section of metal. This could partially be addressed by making the narrow end radially thicker to give it a greater cross-sectional area. It could also be addressed by giving that area a more robust cooling mechanism. Because the inner air chamber is narrower on the end that would be more apt to heat up, it experiences a greater venturi wind flow which would give it naturally increased cooling. There are permutations where the cooling air enters from that side so it also experiences the coolest air.

The number of bars 211 into which the rotor 2 is split is limited by the ampacity of the narrowest part and the maximum evolved amps. Interestingly, the amount of amperage created depends on the radial thickness of the bar 211, so as the amount of amperage created by the additional thickness of the bar 211, the ampacity also increases.

The preferred radial thickness of the rotor 2 is derived from the balance of a number of factors. The more metal in the magnetic field (up to the point of saturation), the more power that will be evolved. However, when the amount of metal increases, and the distance between the stator magnets (i.e., the air gap) must also be increased to fit the rotor 2, it drops the field in the ratio to the cube of the increased distance. So a balance needs to be achieved between the most metal possible without weakening the field strength beyond the point of diminishing returns.

From the perspective of the magnets, copper space is essentially the same as airspace (i.e., is a magnetic void). The prior art partially sidesteps this problem with laminated cores that conduct flux. As an alternative, preferred embodiments of the present invention include a specifically structured architecture of mixtures of one or more of iron, silicon steel, mu metal, permalloy, supermalloy and the like highly magnetically permeable materials in the form of particles, filaments, and the like embedded within the copper of the rotor. In the prior art, this would not be possible because the electrical and magnetic conducting components need to be kept separated to prevent inducing fields that would produce a reverse EMF for reverse eddy currents. Such a problem is much less likely to occur in the structures of the preferred embodiments of the present invention.

Figure 36:
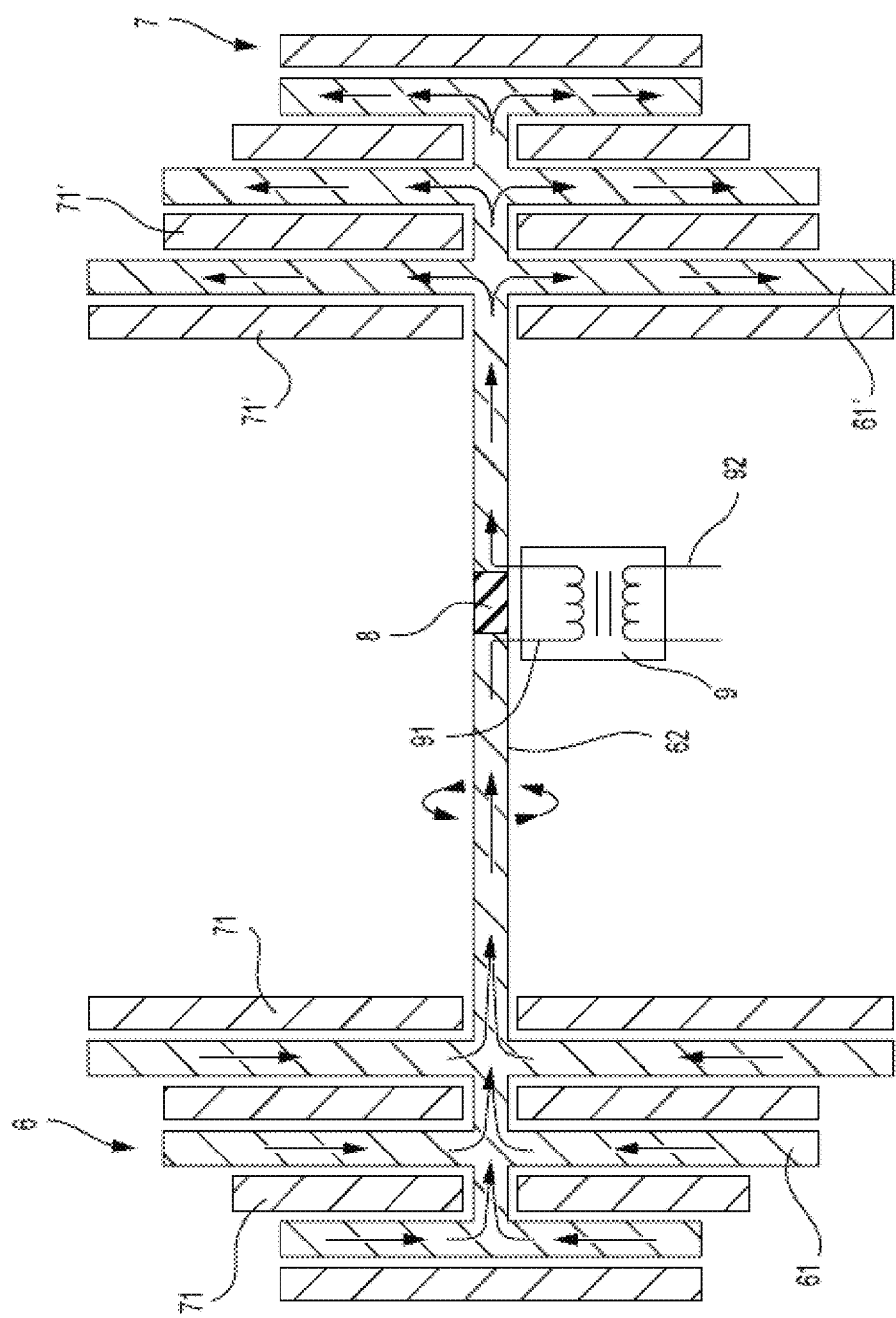
FIG. 36 shows another cross section of a dynamoelectric machine corresponding to another preferred embodiment of the present invention.

As shown in FIG. 36, there is a permutation of a preferred embodiment of the present invention which includes a structure and/or circuitry to feed back the current being developed at the negative end of the rotor to its positive end, reminiscent of a power bussing system that can repeat the current's flow through the magnetic field, increasing the voltage each time around. As the voltage passes a certain threshold, it powers electrical collection circuitry including, for example, a step up transformer apparatus, power conditioner, converter circuitry, or inverter circuitry such that the preferred higher voltage and conditioned current can be selectively directed out of the generator.

Figure 9:
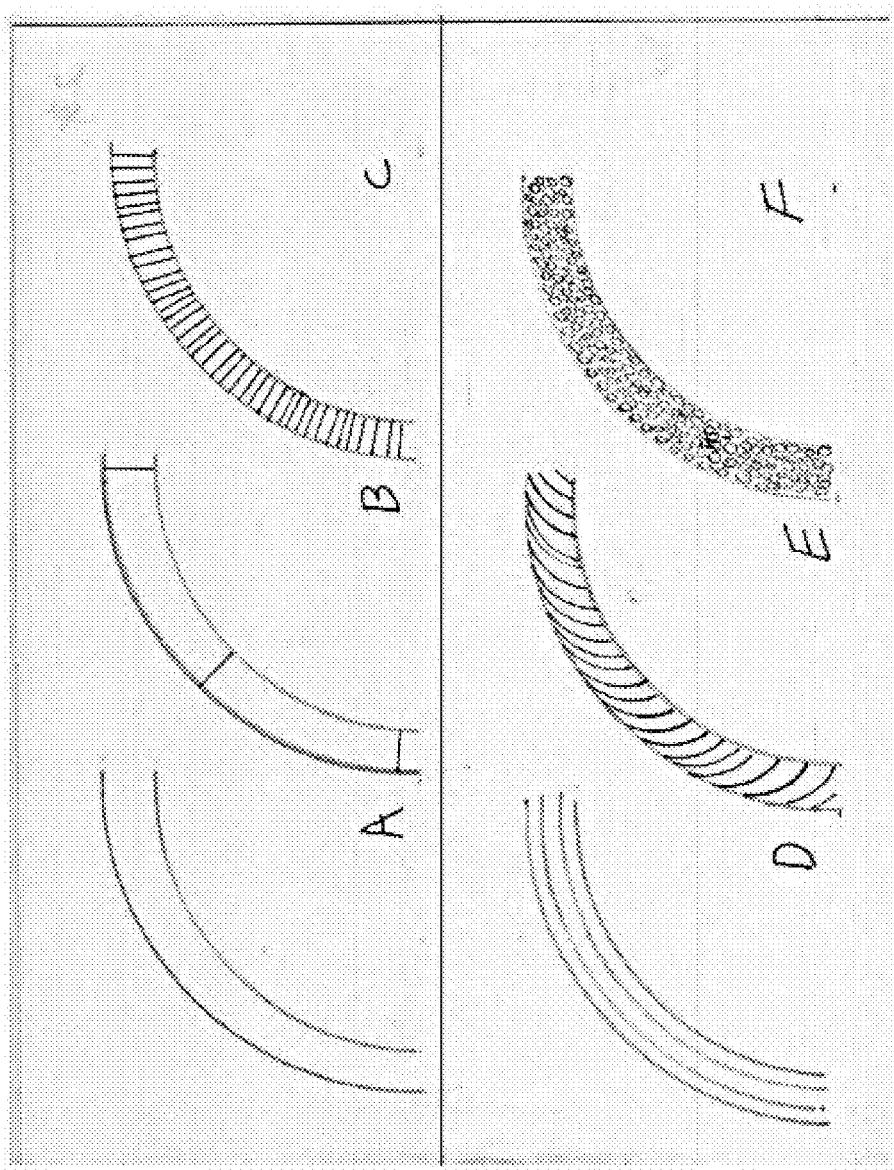
FIG. 9 shows various possible rotor configurations according to a preferred embodiment of the present invention including: (A) a solid/monolithic rotor core, (B) a segmented rotor core, (C) bar segments defining a rotor core, (D) a multilayered rotor core, (E) a radially curved or diagonal bar rotor core with or without interspersed ferrous longitudinally laminated bar segments, and (F) an embedded wire rotor core with or without ferrous material interspersed in, or composing, the binder.
Figure 10:
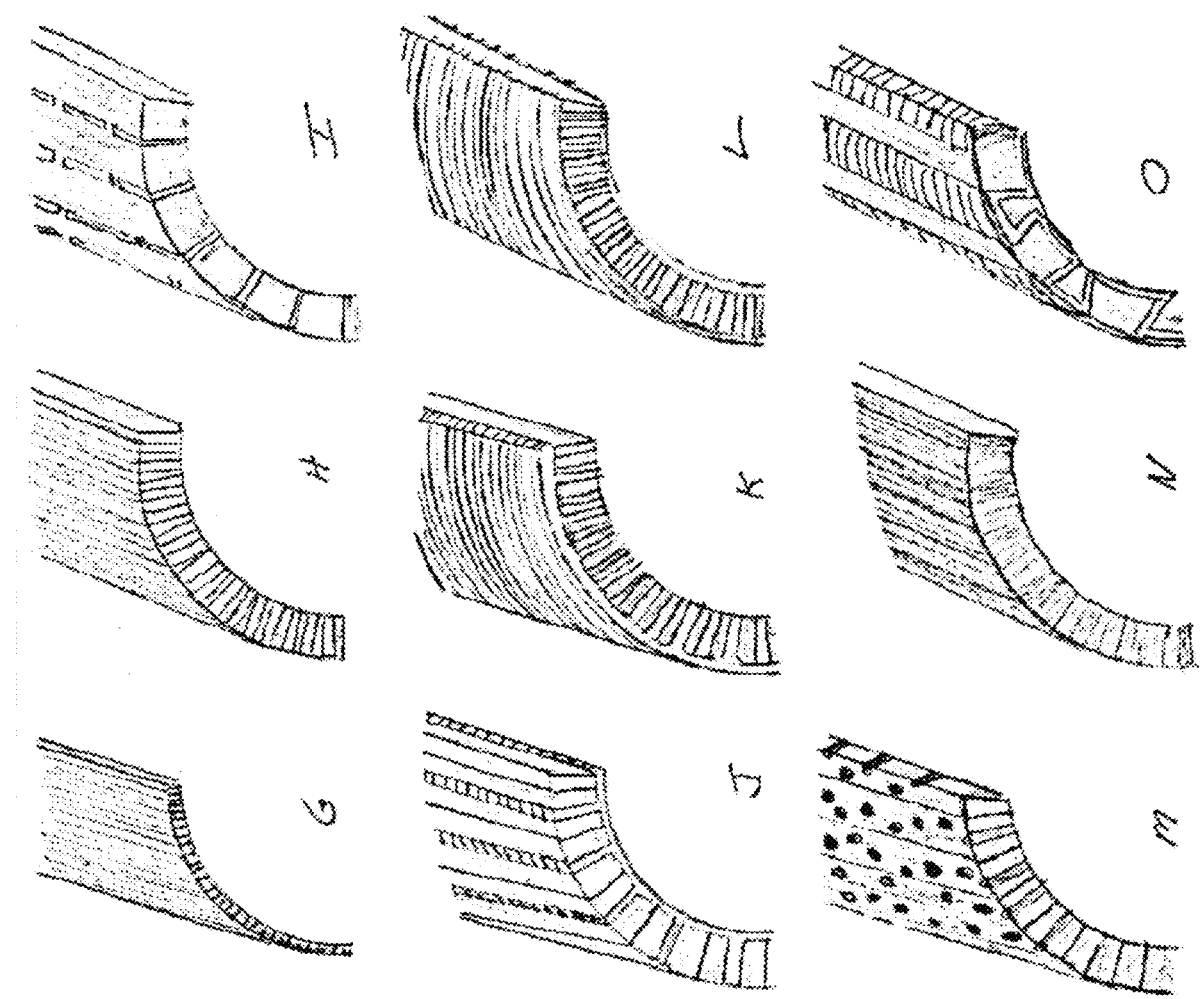
FIG. 10 shows additional possible rotor configurations according to a preferred embodiment of the present invention including: (G) a thin walled bar segmented rotor core without ferrous component to minimize inter-magnetary distance, (H) a ferrous alloy rotor core with material such as copper etc., (I) a rotor core with material such as copper interspersed with generally longitudinal, electrically insulated ferrous segmented laminated sections, (J) interspersed, electrically insulated ferrous laminations of a rotor core defined by circumferentially contiguous laminations connected on the inner surface of the rotor, (K) interspersed ferrous laminations of a rotor core defined by circumferentially contiguous, electrically insulated, laminations connected on the outer surface of the rotor, (L) interspersed ferrous laminations of a rotor core defined by circumferentially contiguous, electrically insulated laminations connected on the inner and outer surface of the rotor, (M) a ferrous material rotor core in an isolated insulated, generally radial perforations of the rotor, (N) a rotor core with thin rotor bars with ferrous material deposited in thin film, longitudinally separated segmented coatings on one or more surfaces, (O) a ferrous material rotor core defined by circumferentially contiguous electrically insulated rings that traverse back and forth from the inner and outer walls of the rotor.

There are various preferred embodiments of the rotor adapted to specific applications that have the same overall shape but are assembled of different sub-components for various applications (see FIGS. 9 and 10). Rather than a purely monolithic tube, the rotor can be divided into a series of longitudinal, or other, segments, called bars. The segmented coil may have the seams engineered to not align with the longitude of the rotor, called diagonal bar segments. The rotor body may be formed of encased and embedded wires. The segments could have an electrically insulating coating to help prevent electrical backflow.

Many of these parallel wound rotors will require a diode function at the level of the distal bars and/or between the current collector and the load to prevent deleterious back flow of current within parts of the rotor.

Figure 22:
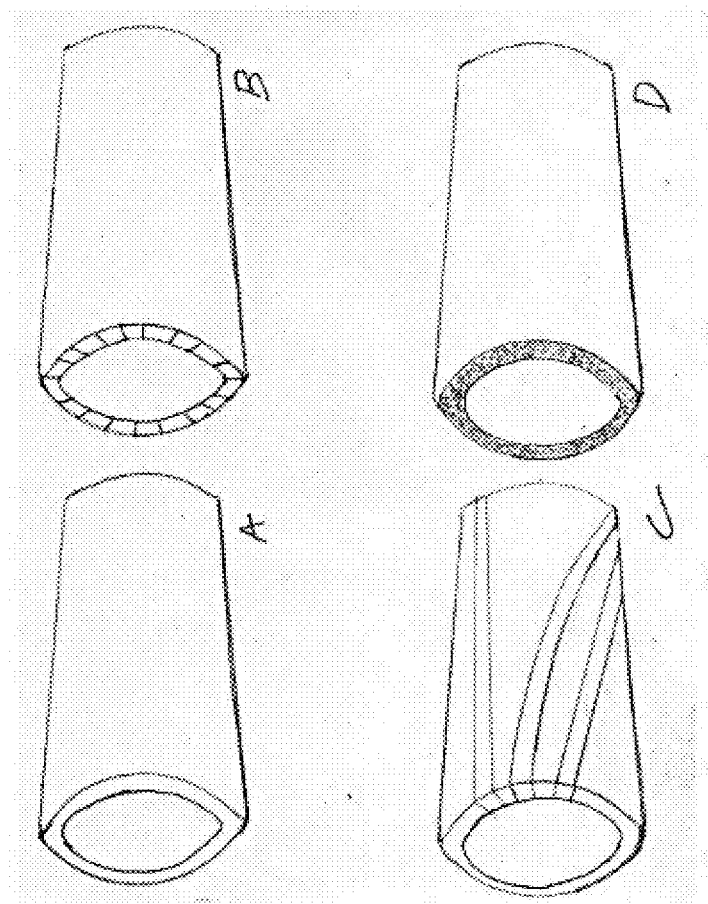
FIG. 22 shows a few examples of a rotor configurations according to preferred embodiments of the present invention, including: (A) a solid wall, (B) longitudinal bars, (C) straight, spiral, or diagonal walls, and (D) an embedded wire.
Figure 23:
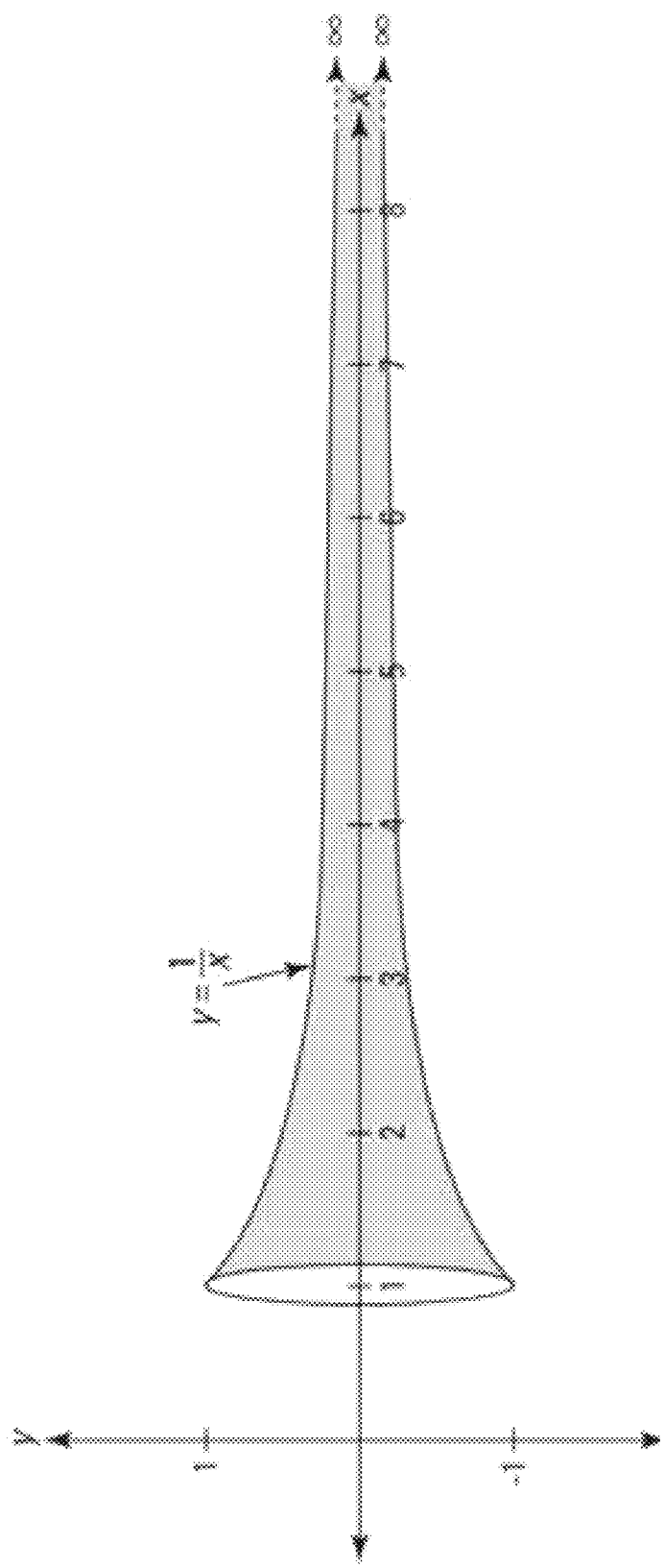
FIG. 23 shows an example of a Gabriel's Trumpet/Torricelli Horn.
Figure 24A:
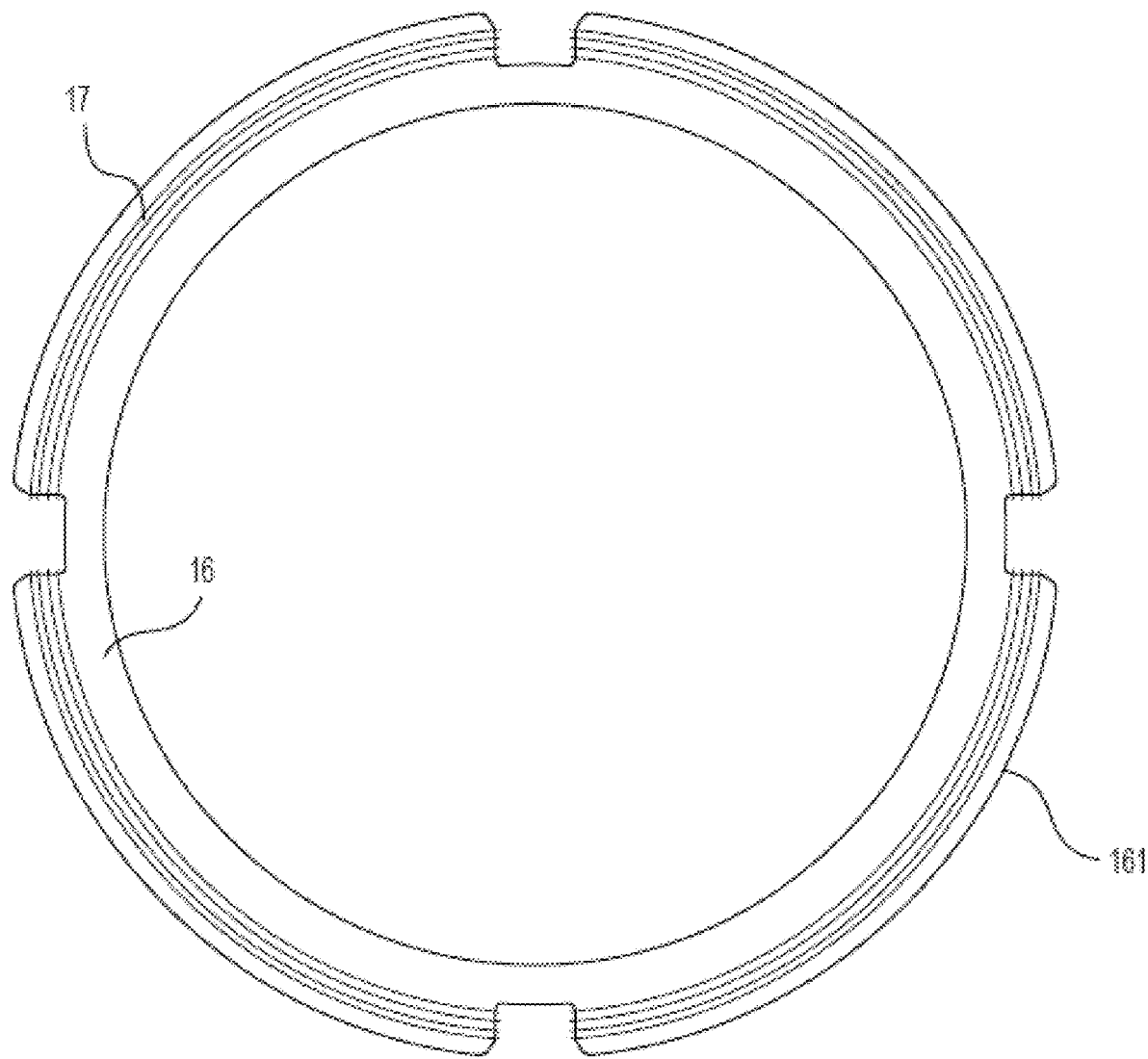
FIG. 24A is an end view and FIG. 24B is a side view showing preferred embodiments of external stator electromagnets of the present invention including.
Figure 24B:
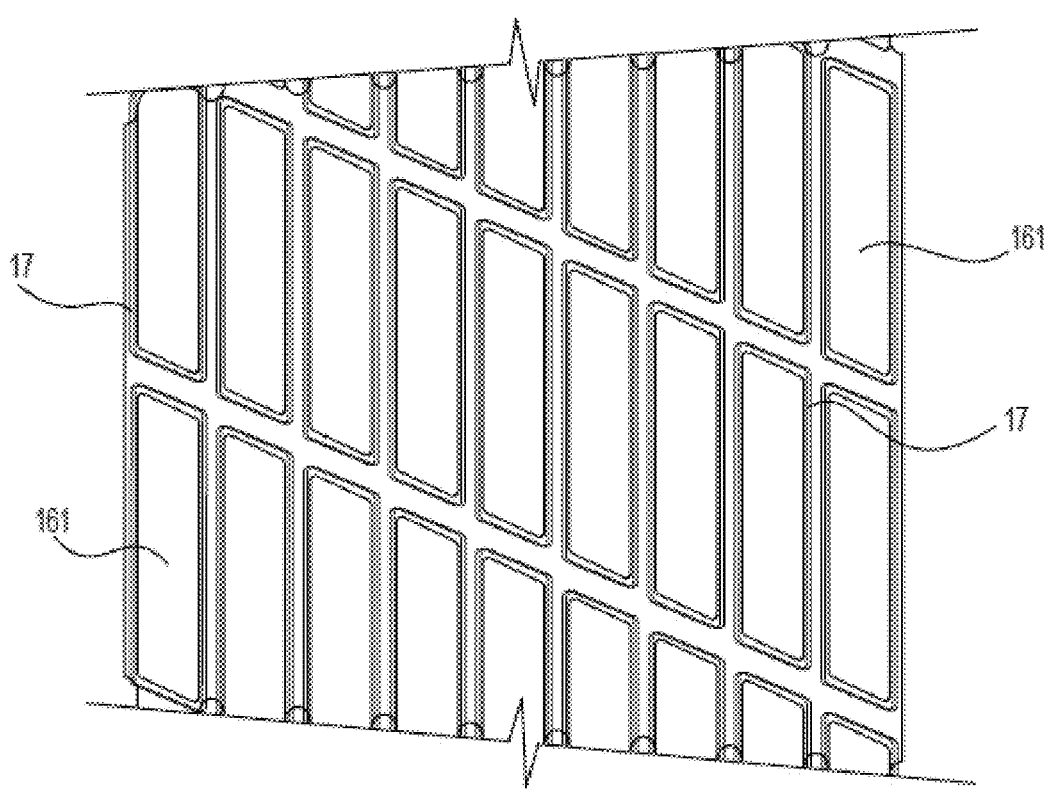

As shown in FIG. 22, the longitudinal segments 211 of the rotor 2 may be straight, diagonal, or spiral, which is useful if avoiding being parallel to magnetic seams of the stator assembly 1, should the stator assembly 1 have seams. The layers may have different internal morphologies including thickness, materials, and segment shapes depending on the needs of the application. AC rotors will be discussed in their own sections.

Figure 11:
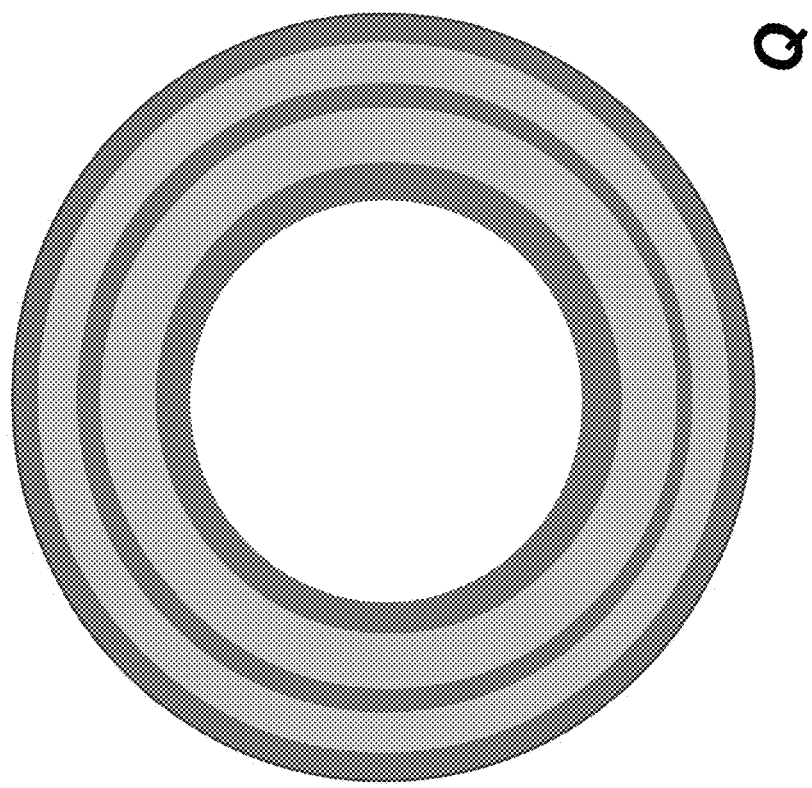
FIG. 11 shows additional possible rotor configurations according to a preferred embodiment of the present invention including: (P) ferrous materials embedded, in a uniform or substantially uniform, generally radially oriented or aligned oblong or filamentary particles, inclusions particles, fillings, strips, etc. and (Q) ferrous material and conductive material such as, for example, copper or thin film silver disposed in concentric layers, interspersed with layers of ferrous or other suitably highly magnetically permeable material.
Figure 11:
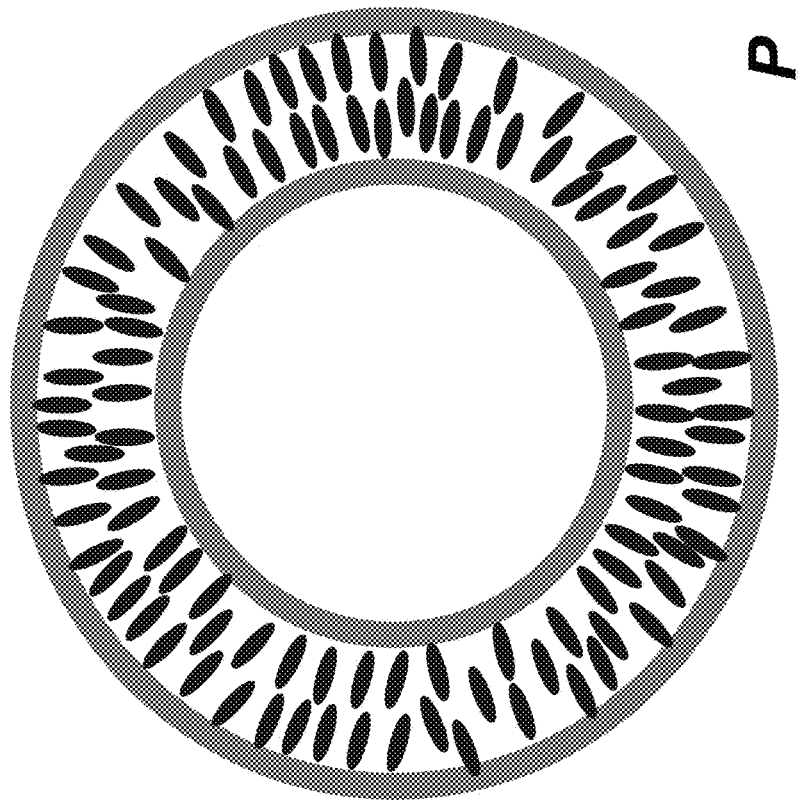

When a thicker rotor is desired, a ferrous, ferromagnetic, or other magnetically permeable material will need to be incorporated into the permanent magnet section of the rotor to allow magnetic flux to conduct through the wall of the rotor in such a way to reduce distance based field loss. This material may be incorporated in a number of ways, illustrative representative fashions are illustrated in (H) through (O) of FIG. 10 and (P) and (Q) of FIG. 11. It is noted that the ferrous, ferromagnetic, or other magnetically permeable materials referenced in this disclosure refers to any desirable material which possesses magnetic permeability, such as, for example, iron, cobalt, nickel, gadolinium, permalloy, molypermalloy, Mu-metal, carbon steel, ferrous stainless steel, ferrous alloys, soft ferrite, etc.

Specifically, FIGS. 9 and 10 show various possible rotor configurations. Portions A-F are directed towards the possible configurations of the rotor bars, and Portions G-Q are directed toward demonstrating various ways ferrous material can be incorporated to increase the rotor's net magnetic permeability to allow for thicker rotors. Specifically, the various portions show: (A) Solid/monolithic, (B) segmented, (C) bar segments, (D) multilayered, (E) radially curved or diagonal bar with or without interspersed ferrous longitudinally laminated bar like segments, (F) embedded wire with or without ferrous material interspersed in the binder, (G) thin walled bar segmented without ferrous component to minimize inter-magnetary distance, (H) ferrous alloy with material such as copper, etc., known to those skilled in the art, (I) material such as copper etc. interspersed with generally longitudinal, electrically insulated ferrous segmented laminated sections, (J) interspersed, electrically insulated ferrous laminations defined by circumferentially contiguous laminations connected on the inner surface of the rotor, (K) interspersed ferrous laminations defined by circumferentially contiguous, electrically insulated, laminations connected on the outer surface of the rotor, (L) interspersed ferrous laminations defined by circumferentially contiguous, electrically insulated laminations connected on the inner and outer surface of the rotor, (M) ferrous material in isolated insulated, generally radial perforations of the rotor, (N) thin rotor bars with ferrous material deposited in thin film, longitudinally separated segmented coatings on one or more surfaces, (O) ferrous material defined by circumferentially contiguous electrically insulated rings that traverse back and forth from the inner and outer walls of the rotor, (P) ferrous materials embedded, in a uniform, generally radially oriented oblong or filamentous particles or inclusions, and (Q) ferrous material and conductive material such as, for example, copper or thin film silver disposed in concentric layers. Further, a thin film silver layer could be deposited over entire external surfaces of the rotor to increase conductivity.

The rotor should have a high electrical conductivity, high magnetic permeability, reasonable cost, acceptable Young's modulus, corrosion resistance and thermal expansion, among other factors. The first three parameters listed are the most important. Copper is one of the best choices when considering conductivity per dollar. Unfortunately copper's very low magnetic permeability limits rotor output by weakening the flux field significantly per unit of the rotor's thickness.

Increases in rotor thickness increase the mass of metal producing current, but to accommodate the additional thickness the stator magnets need to have more distance between them. Distance between the magnets reduces the field flux density by the cube of the distance. This massively deleterious effect can be reduced by using rotor materials with a greater magnetic permeability. Materials such as, for example, pure annealed iron, Mu metals, Metglas, silicon steel, permalloy and supermalloy have excellent magnetic permeability, so the distance-related magnetic field loss would be greatly reduced, but these materials have poor electrical conductivity/susceptibility to current induction and worse affordability. Silicon steel has acceptably good magnetic permeability and cost, but poor electrical conductivity. Pure iron has a good magnetic permeability but suboptimal electrical conductivity.

As there is no material with all the good properties and none of the disadvantages, preferred embodiments of the present invention combine select materials and do so in a specific manner so as to combine the advantages while limiting the problems.

Rotor materials according to preferred embodiments of the present invention can be made by mixing metal powders of iron, and the above high permeability materials into molten copper and casting rotors. The smelting temperature is maintained so that the copper is liquid and the aggregate of high permeability granules do not melt but mix in as whole particles. 3D printing also allows simple construction of the correct architecture mixtures.

The copper is of sufficient concentration so as to be completely electrically contiguous so as to avoid the impedance losses from current forced to pass through the juncture of dissimilar metals. For conventional generators the eddy currents inherent in their design, make these kinds of materials unsuitable for use in rotors.

Another concern is the need to avoid the lengthening/distortion of flux lines that usually occurs in a conventional spinning rotor. Flux lines get dragged and stretched up to more than halfway around the rotor's path. This distortion weakens their effectiveness. A rotor that has good and generally homogeneous magnetic permeability will have less distortion, a stronger flux field, and can incorporate more current producing mass.

The above novel generator structures of preferred embodiments of the present invention allow for a generator to be smaller, lighter, simpler, more efficient, and more powerful. The next series of described novel structures allow generators to operate at a much greater range of power inputs than conventional generators by immediately/automatically adapting via intrinsic synergies to become the exactly correct power generator for the input. This makes them especially suited to variable input applications such as wind power or vehicle generators/alternators.

Figure 12:
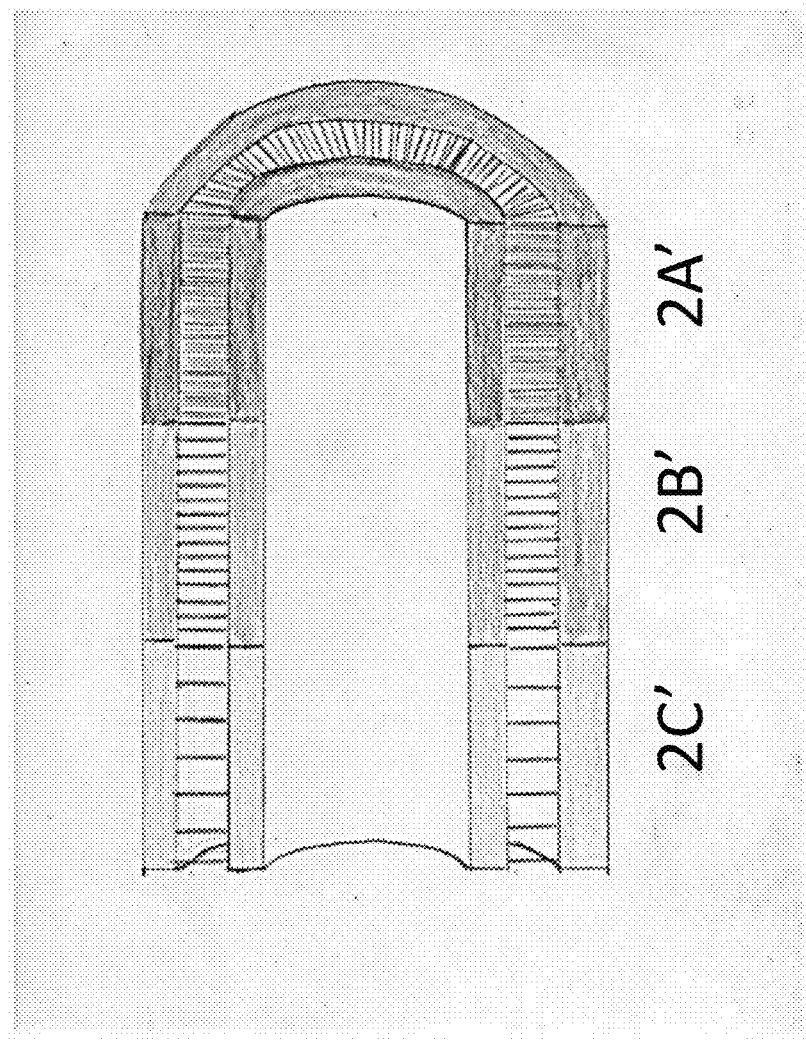
FIG. 12 shows stator cylinders with different strength segments and creating different strength magnetic sections of the inter-magnet stator field according to a preferred embodiment of the present invention.
Figure 13:
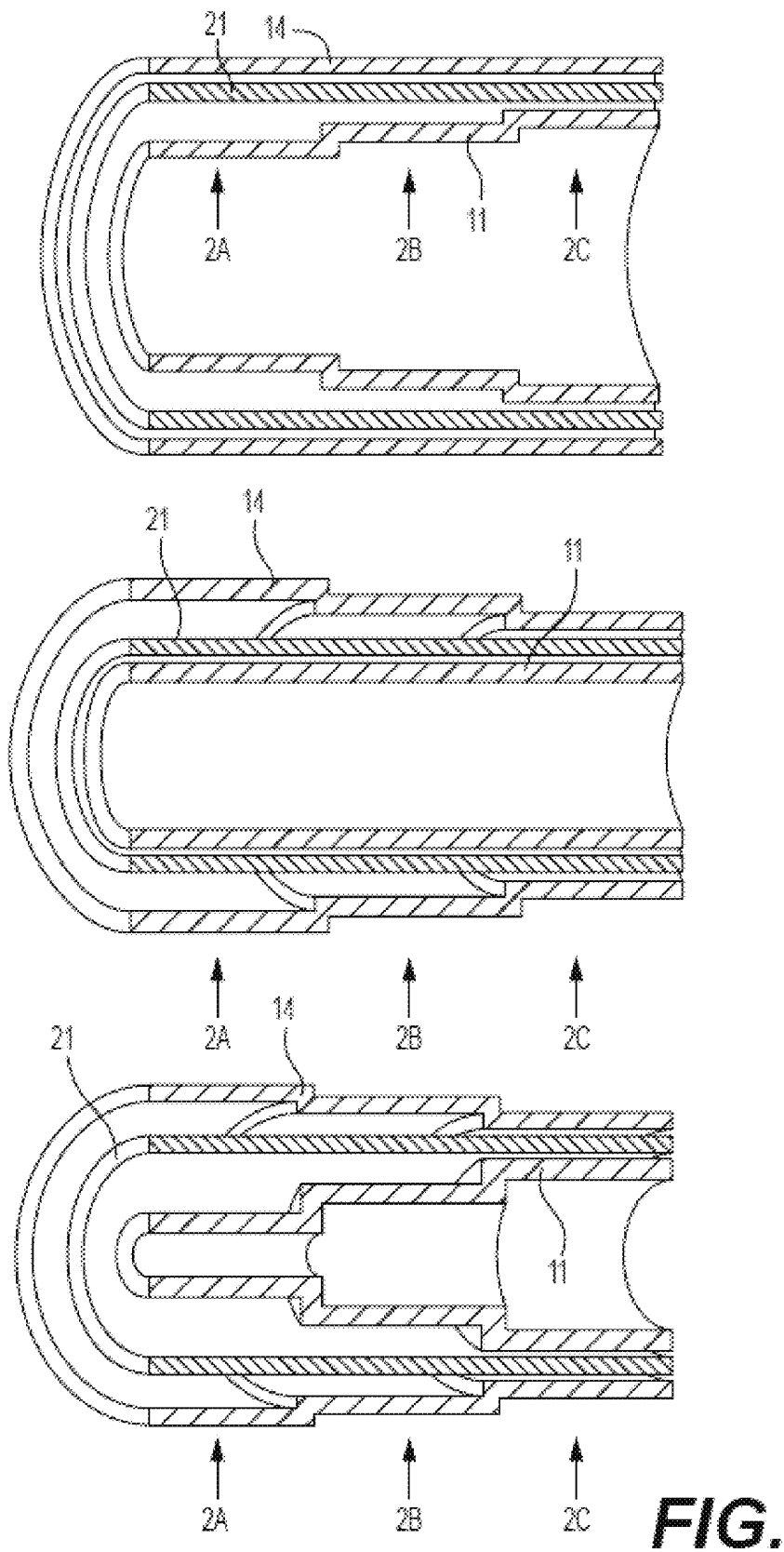
FIG. 13 shows varied inter-magnet distances achieved in three different ways according to preferred embodiments of the present invention.

The stator can be fashioned in generally the same shape but with a gradation or variety of circumferential ring segment magnetic field strengths arranged along its longitudinal length. For example, the first cylindrical ring segment of the inner and outer stator can be made with a stronger magnet than the next segment and so on. In FIG. 12, those field variations are shown as different gradient magnetic field strength areas 2A'-2C' which are arranged by strength with weaker to stronger laid out from left to right.

There can be greater or fewer of the different gradient magnetic field strength areas 2A'-2C' shown in FIG. 12 based on a desired adaptability parameter. The gradient magnetic field strength areas 2A'-2C' can be in any order and it can be more of a gradual gradient in field strength than a stepwise progression. The differential magnetic strengths can be procured by varying the magnetization steps or the composition materials used. The segments may be of different field strengths in a number of ways including being made of different magnet materials such as alnico, ceramic and neodymium, etc., or they may be made of different grades or dilutions of magnetic materials, or they can be magnetized to different strengths. They can be made as described in the next section paired with electromagnets to strengthen or weaken the magnetic field or they can be composed of electromagnets powered to different strengths.

In FIG. 12, as the rotor spins, different sections pass through progressively stronger fields. While the entire rotor has the same RPM and the electroactive rotor segments are all moving at the same speed, the different longitudinal rotor areas are passing through magnetic fields of different intensity. This is conceptualized by realizing that each segment of the electroactive rotor segment is transecting a different number of field lines per second. The segment with the strongest field has the most lines per area, so as the coil speed ramps up from too slow an RPM to generate power, only the section of coil with the highest field strength segment first experiences the transaction of enough magnetic field lines per second to induce a current flow. Therefore, the generator acts like a much smaller unit of the conventional type generator. It makes a small amount of power but is relatively easier to spin as less back force is generated to resist the rotation.

Still referring to FIG. 12, as the RPM increases, at a specific RPM a section at 2B' encounters and transects enough field lines per second to also contribute current, even as the section at 2A' has an output which also increases. So, as the rotor spins faster, the current output and the EMF resistance to spin also rise in greater than direct proportion to the change in RPM. As the RPM increases further again, the output and needed input torque increase more proportionally until section 2C' encounters enough field lines per second to also become generatively electroactive. At this point both the electrical output and the force needed to turn the generator jump up again.

Varied field strength segments allow different parts of the generator to function as different additional generators that can be recruited or dismissed depending on rpm input conditions such as wind speed. In the conventional technology, this difference is analogous to having multiple generators of different sizes. Using a small one that is easy to spin but only makes a little power to harvest low speed winds, a medium-sized generator to make a medium amount of power from medium-speed winds, and a large generator that takes a lot of energy to turn but makes a lot of power from high-speed winds all built into one self-adapting machine.

Having the different sections of magnetic field strength allows the generator to automatically increase or dismiss the generating function based on the wind-driven RPM.

Another way to better match the generation power/electrical output seamlessly to the input force and thereby make the generator more able to handle a greater range of input forces is to create areas of varied inter-magnetic space. The magnets could diverge to create a varying inter-magnetic gap, creating areas of differing field strength as in FIG. 13.

In another additive, roughly cylindrical way of further widening a generator's ability to adapt to a greater range of inputs is to make it a multi-rotor device as in FIGS. 3, 33, and 34-37. Because the outer rotor is moving faster and throughout a larger area, it transects more lines per second and will cut in at a lower RPM than the inner rotor layer. The magnet layers could have different field strengths and or gradient fields to further tune this advantage.

Brushes function as part of current collecting for many types of generators. They have the disadvantage of being a wear item that needs intermittent replacement. They arc and spark and they wear down into an electrically conductive dust that can contaminate the device. While a variety of brushes and commutators could be used in later described preferred embodiments of the present disclosure, in a preferred embodiment, the bearings are specially adapted with conductive lubricant to function as current collectors obviating the need for brushes. Part of this novel adaptation is insulating layers in areas needed to prevent electrifying the yoke, etc.

The rotor segments could be collectively bussed together by a current collector at the ends to create a high amperage, low voltage system. The bar segments can be bussed together in a more serial circuit to make a higher voltage/lower amperage output. Different segments can be bussed together for three-phase and AC preferred embodiments described in later applications. They can be bussed or commutated such that current from one segment is transferred back to a different segment's far end, creating a series circuit to increase the voltage.

In some preferred embodiments, the individual segments can be serviced, grouped, or excluded by a controller and a series of brushes/commutators. This would be advantageous in AC, three-phase, and direct grid intertie systems.

The stators could be electromagnets with polarity electronically controlled, of variable power, and reversible. The rotor could be longitudinal electromagnets that are polarity controlled, variable electromagnets. In motor applications, the stator could be permanent magnets offset in alternating polarity. The rotor could embody electromagnets that could be activated in a pattern and polarity that cause the rotor to spin. Conversely the longitudinal electromagnets could be in the stator and longitudinal alternating polarity permanent magnets could be in the rotor. The stator magnets could be flash electrified in patterns and polarity to force the rotors' torque. The pattern and speed of the electromagnets can be varied for various torque, loads, and RPM operating conditions to create differing torque or speed or to maximize efficiency. These permutations will be further discussed below.

Figure 18:
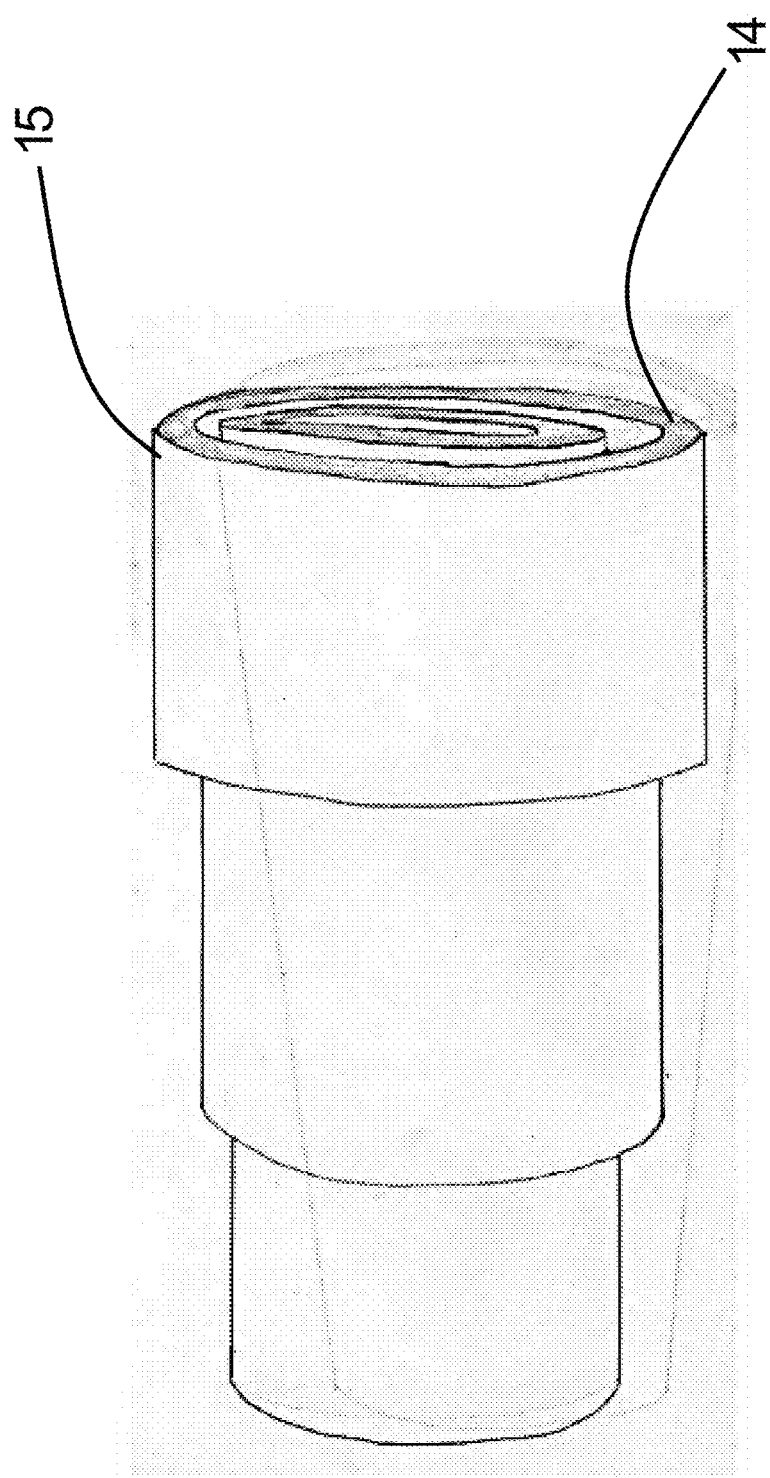
FIG. 18 shows a stepped gradient stator according to a preferred embodiment of the present invention.
Figure 19:
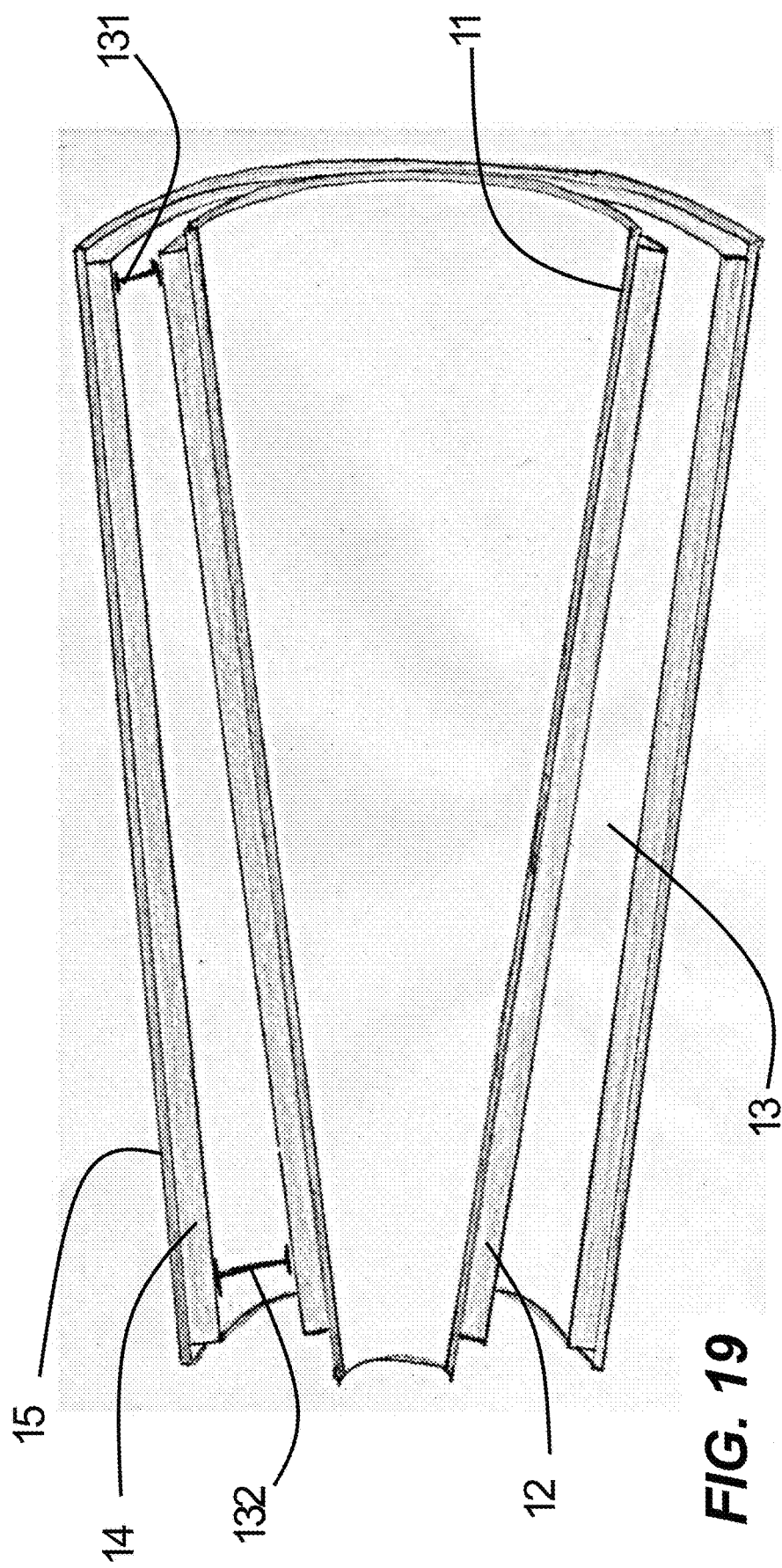
FIG. 19 shows an inter-magnet cross-section space having different thicknesses but the same amount of cross-sectional area in each latitudinal area. Note the lines in the longitudinal section drawing.
Figure 20:
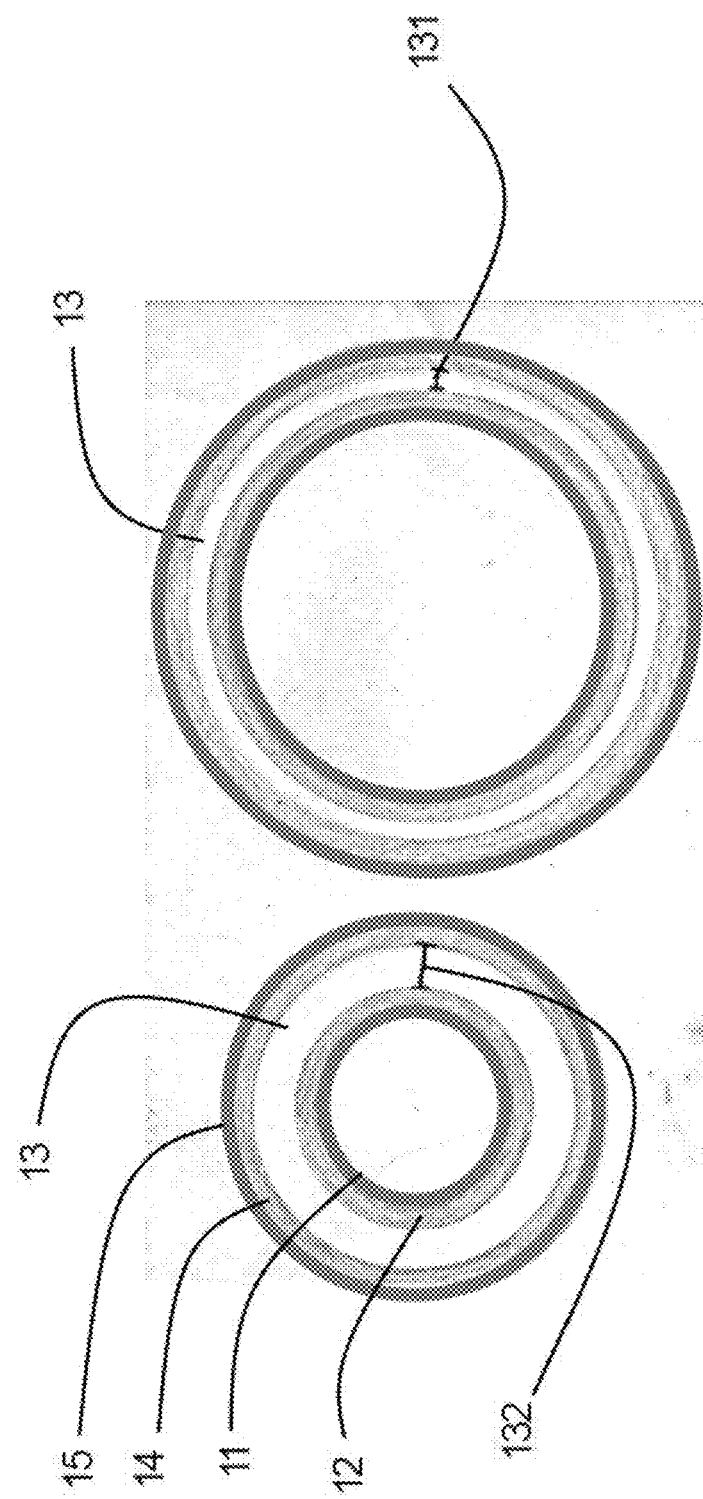
FIG. 20 shows end views of the preferred embodiment of FIG. 19 with an inter-magnet cross-section space having the same amount of cross-sectional area in each latitudinal area. Note the lines in the cross-section section drawing.

A series of different radius ring, cylinder, or frustum segment magnets can be used to approximate the general conical frustum shape (see FIG. 18).

There are permutations in which the generally conical stator magnet layers have different wall angles to make a tapering inter-magnet space. An example of this would be having the inner walls slightly steeper than the outer stator wall so that the inter-conical space for the rotor is wider on the narrow end of the apparatus than it is on the wide end. This can be stepwise, and/or gradient, or in other arrangements.

These can be manufactured such that the cross-sectional area of the inter magnet space is preserved throughout the length of the apparatus. Doing so not only maintains an identical cross-sectional volume of the rotor throughout all segments but also adds another way to provide variable input adaptability by providing a wide portion 132 in the inter-magnet space 13 as one approaches the narrow end of the device and providing a narrow portion 131 at the wide end in the inter-magnet space 13 (see FIG. 19 and FIG. 20). This adds the benefit of relatively increasing field strength the closer to the wide end.

At the narrow end, the circumference of this inter-magnet space is smaller but the radial thickness is proportionally larger, such that the area of the space is the same as at the wide end, which has a much bigger circumference but smaller radial thickness. This equality of area is preserved across every cross-section along the longitudinal length of the inter-magnet space. This permutation allows for an equal mass of rotor metal in every equal length cross-sectional area of the rotor annular segments regardless of the overall diameter of that segment.

Figure 21:
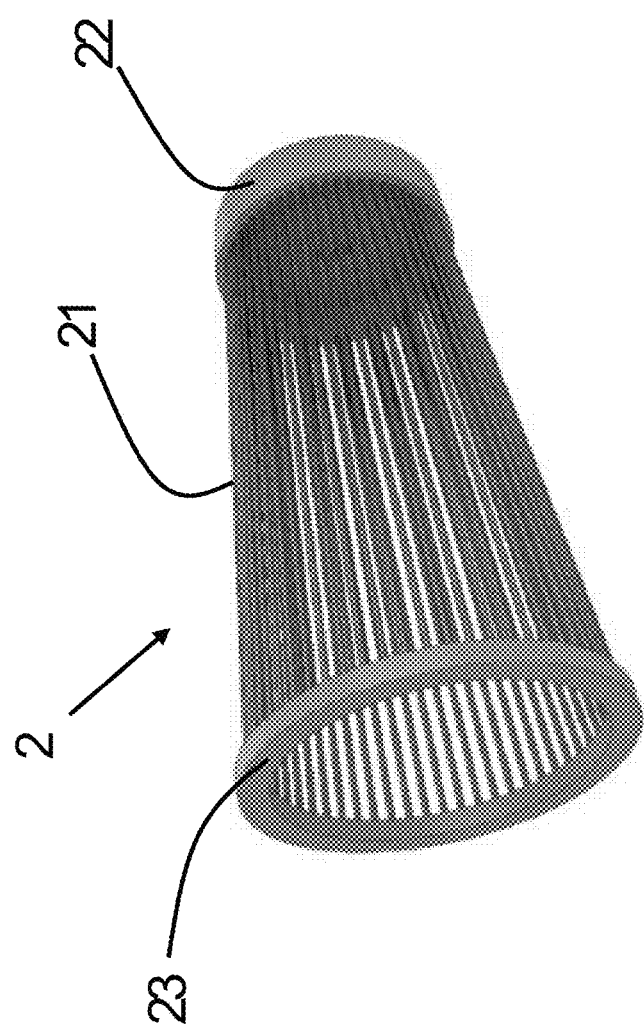
FIG. 21 shows a rotor with non-imbedded straight rod bars according to a preferred embodiment of the present invention.

Interposed in the space between the stator magnet layers is the rotor which rotates in this space. There are many permutations of possible rotors according to preferred embodiments of the present invention. A first possibility would be a solid metal frustum, the body of which is structured to fit within the inter-stator space. Although the uniformity of the field would create less potential for eddy currents than conventional designs, this rotor would still have a degree of deleterious eddy current formation potential. In a second permutation, the rotor body is divided into longitudinal, diagonal, spiral, or other shaped, electrically insulated strips called bars. These are similar to those described in the cylindrical section but modified to the more conical hollow frustum shape. Examples of rotors according to preferred embodiments of the present invention can be found, for example, in FIGS. 26 and 27. As shown in FIG. 21, a rotor assembly 2 may include a conductor array 21 provided between a rotor support frame 22 and an upper rotor ring 23. Further, as shown in FIG. 22, other examples of rotor configurations according to preferred embodiments of the present invention, include: (A) a solid wall, (B) longitudinal bars, (C) straight, spiral, or diagonal walls, and (D) embedded wire.

In the above permutation, the bars are laid out in an electrically parallel fashion. A series of buses, brushes, and/or commutators can be used to create a functionally series wound rotor. The wires or strips can have a straight, diagonal, spiral, or other skew orientation within the cone shape.

In a permutation, the rotor is defined by a series of wires laid out longitudinally throughout the body of the cone. These may be embedded in a ferro metallic, or possibly ferro metallic infused (or not) plastic, resin, or epoxy substance, or the like.

A sub-permutation of the wire or bar based rotor body would include wires/bars that are close together on the small end of the cone and spread apart on the larger end, or they could taper to fit or converge into fewer wires/bars. There is a permutation of the rotor wherein the wires/bars themselves taper longitudinally such that the small end of the cone has the small or narrow ends of the wires and the large end of the cone has the large ends of the wires.

If the rotor is composed of wire, at the narrow end the wires are stacked more radially to fill the thicker area, whereas at the narrower wide end they are stacked more circumferentially to fill that area.

If the rotor is defined by strip segment bars, these segments could be larger in their radial axis on the narrow end with a narrow circumferential width, changing to become larger in the circumferential axis and shorter on their radial axis on the wide end. This would prevent narrow spots which could be current limiting or heat generating.

Alternatively, an additional responsive range of RPM or input torque adaptation can be obtained by tapering the stator's generally conical sections more, or less, than the equal volume ratio to create a gradient gap for the thickening rotor or as airgaps on one or both sides of the rotor. This would be an additional way of causing a gradient, generative torque production by additionally making a more or less gradient in the magnet field strength via the change in inter-magnetic distance.

The above permutations can be used with a Gabriel's Trumpet (see FIG. 23) shape or specific length gradient cylinders can be chosen such that the extra voltage expected in the wider sections is proportionally offset by making the narrower sections longer to increase their voltage. This offsets the wider rotor sections making a higher voltage than the narrower, unless the narrower section is proportionately longer, balancing the voltage.

With the unit area strength of the stator magnets held constant, an increased diameter of the rotor/stators will increase the maximum amperage producible, as well as increase the number of stator field lines per second being transected for a given RPM. This can increase generative ability in low speed winds, although there will be some increased resistance to spin caused by the back pressure being evolved on a longer lever arm.

Figure 25:
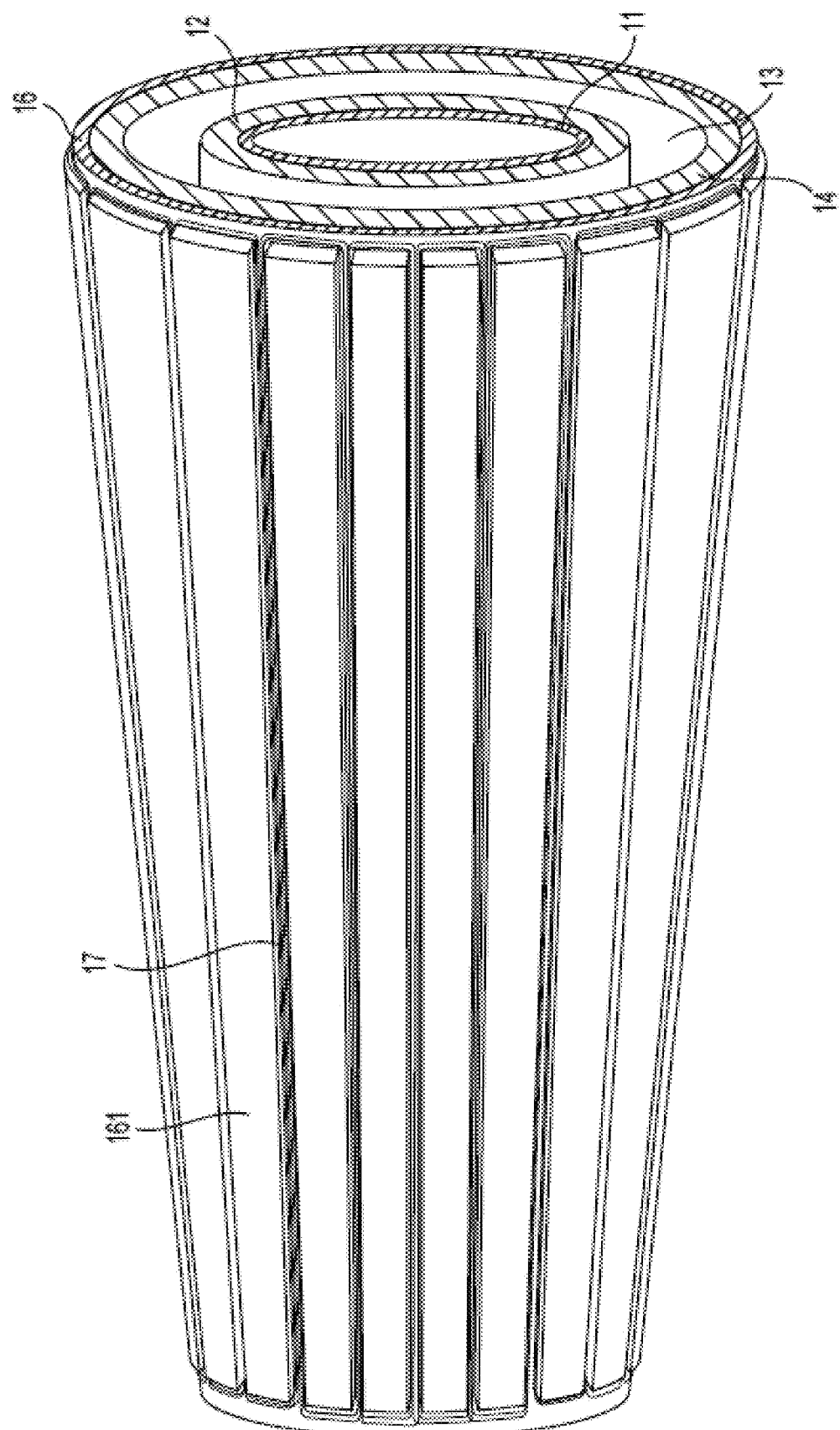
FIG. 25 shows longitudinally arranged stator electromagnets in a preferred embodiment of the present invention.

Using a combination of electromagnets functioning synergistically with the permanent stator magnets confers a still greater range of instantaneous and automatic adaptability. There are many possible ways of achieving this. For this conceptualization, a neodymium material is used with an overabundance of the ferrous component such that a powerful magnet is created which is then not magnetized to its strongest potential. That, and the dilutive effects of the extra iron, keep it from being fully magnetically saturated. If this material is used, for instance, in the inner frustum, the outer surface is smooth to allow for a reduced or minimized air gap between the stator wall and the outer rotor face, but the inner stator surface is manufactured with studs, ridges, or rings as protuberances that accept a surrounding electromagnet coil as in portion (C) of FIG. 6 and FIG. 30. Alternatively, the coils can be in spool-shaped indentations around the magnetic segments as in FIG. 30. Another embodiment for delivering uniform, radial electromagnetic flux is seen in FIG. 6G wherein the multiple coils of the previously described designs are augmented or supplanted by a single large coil 250. When energized, the electromagnet field combines with the permanent magnet field to increase or decrease the field strength. In the outer stator magnet, the electromagnet core protuberances could be on the external side as can be seen in FIG. 25, or they can be part of the permanent magnet as in FIGS. 6D-6F or they can be a separate, adjacent structure as in FIG. 25 which shows an array of stator projections 161 on an electromagnetic stator 16 which are wrapped with electromagnetic coils 17.

Alternatively, the electromagnets and permanent magnets can be individual structures with the core of the electromagnet being distinct from the permanent magnet. As in the section of cylindrical magnets, they can be configured in multiple ways to function as a hybrid electro/permanent magnet stator wall and can be on one, part of one, or more than one stator as well as having the stator made primarily of electromagnets.

If the electromagnets are electrified in the same magnetic orientation as the underlying radially magnetized cone, the electromagnetic field is additive to the permanent magnetic field, creating a more powerful inter-magnetic radial field with more field lines per volume. As such, they would add to the power output and back force resisting over speeding to adapt the generator to higher wind speeds, allowing the generator to ramp up its power as the wind speed increases while relatively constraining the increase in rotor and turbine RPMs.

Alternatively, the electromagnets can be energized in the opposite direction so the net result of the interaction between the electromagnet and permanent magnetic fields is a dampening or lessening of the inter-magnet radial electromagnetic field.

These coils can be electrified together or to individual levels, or the electrification can be controlled in a non-uniform manner. If they are electrified together via series or parallel connections, the entire inter-magnetic field is boosted or reduced. As wind speed increases, the generator automatically boosts the magnetic field, so the output is proportional to the input while the increase in RPM is relatively less than in the conventional designs. If the coils are energized with the segments near the wide end receiving progressively more power, the adaptability range is increased.

Figure 29:
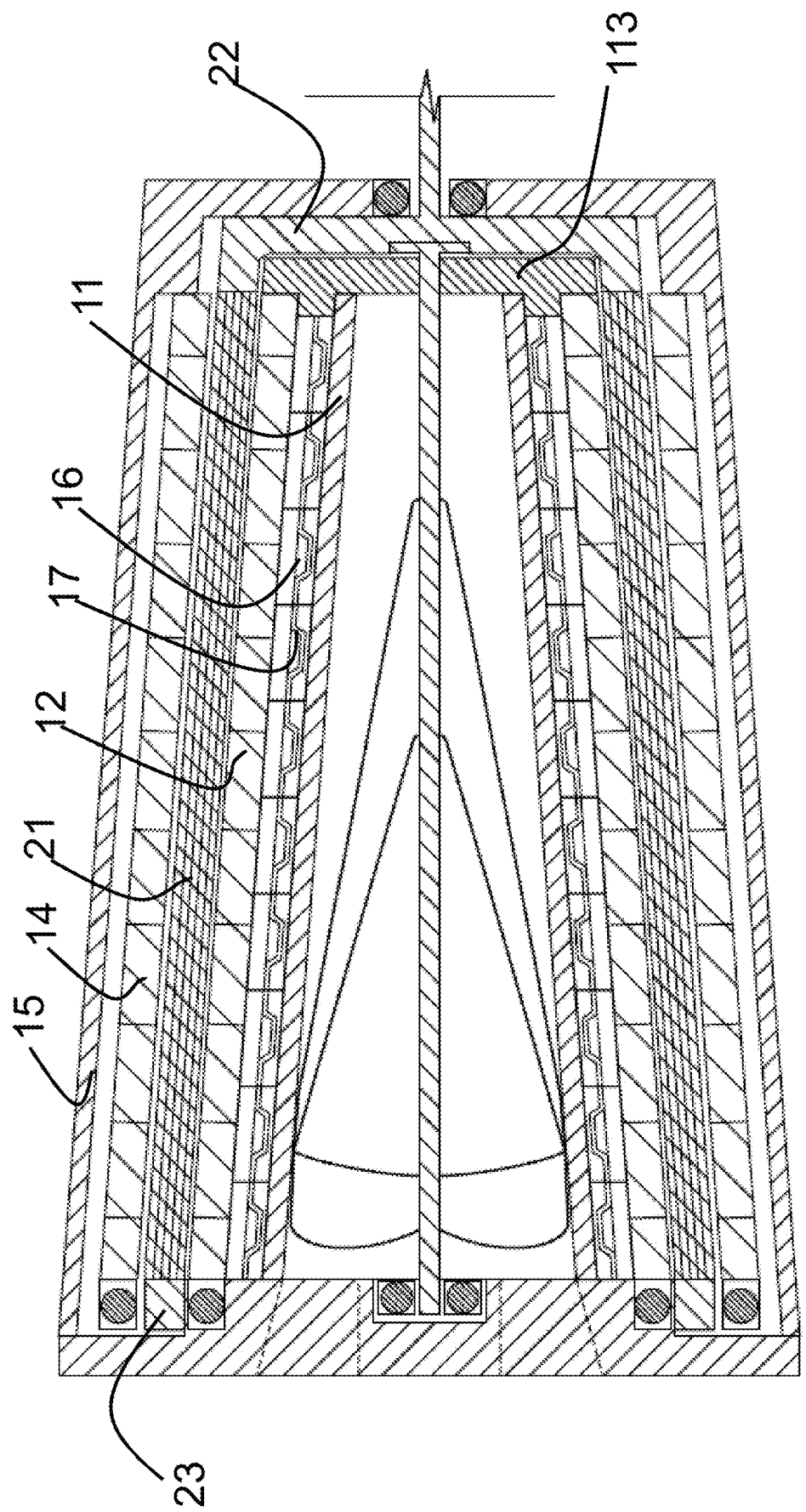
FIG. 29 shows another cross section of a dynamoelectric machine corresponding to another preferred embodiment of the present invention.
Figure 30:
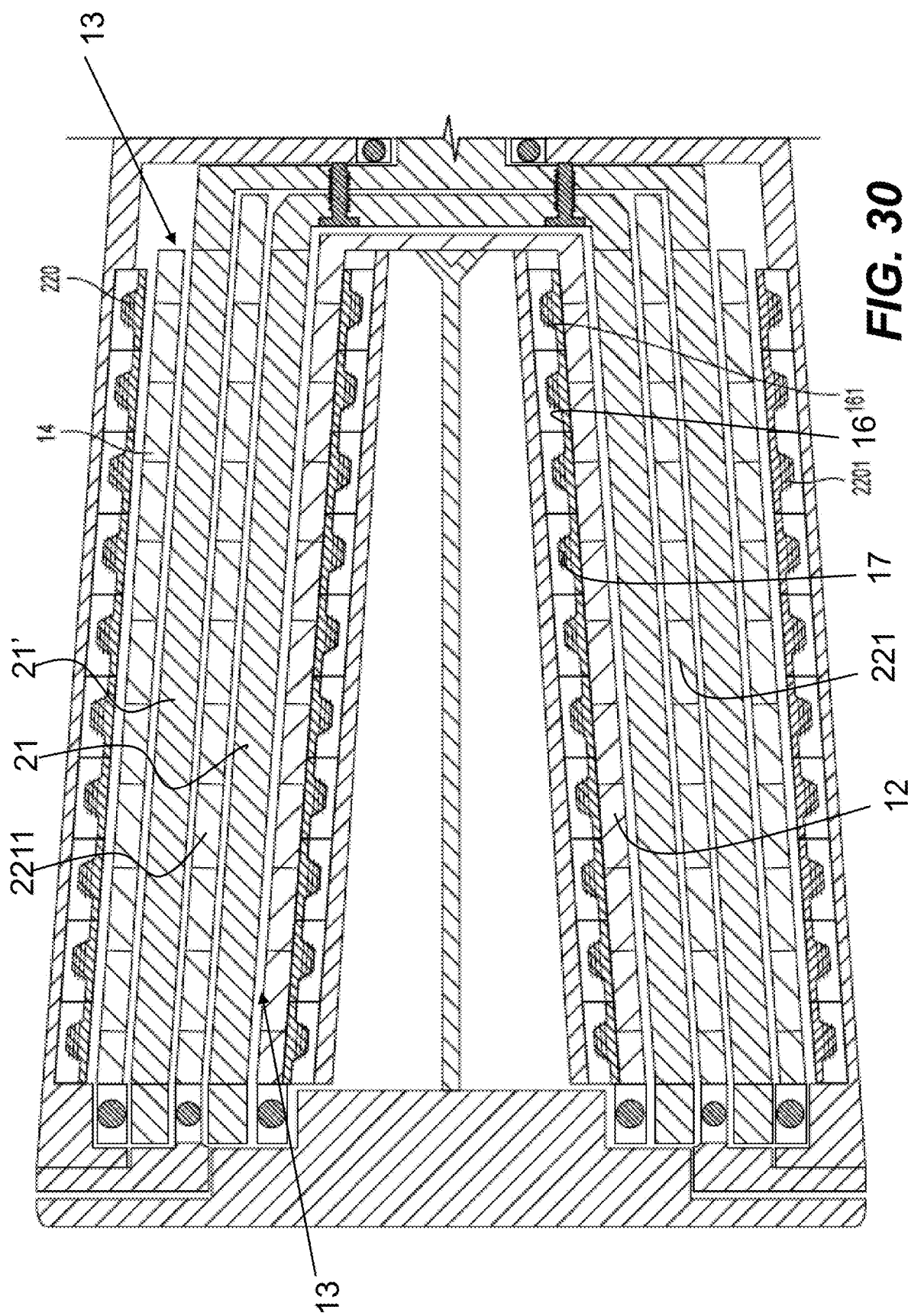
FIG. 30 is a cross-section diagram of a preferred embodiment of the present invention which includes a dual rotor and tri-stator configuration with hybrid electro/permanent magnets on the inner and outer stator and only permanent magnets on the middle stator. Permanent magnets in the drawing are preferably adjacent conical frustum segments that are on the rotor side of the permanent magnets with the inner and outer stator electromagnets on the yoke side of the stators.

The electromagnets can include stator projections 161 which are arranged longitudinally or arrayed on an outer circumference of an electromagnet stator 16 as shown in FIGS. 29A-30. This is especially useful for stepper motors, EV motors, and three-phase and AC generator applications described in more detail in subsequent applications.

The electrification of the electromagnet components can be carried out by a controller or by simply allowing a small amount of the increased power being produced from the faster wind to be diverted from the load to the magnets, for conceptual instance, by overcoming a resistance. In this way, the additional adaptability is automatic and solid state, and less dependent on parasitic additional control systems needed by the conventional generators.

The wide end diameter of the conical rotor defines the rotor's influence on the cut in speed. The stators' magnetic field strength also contributes a factor. The stronger the field, the lower the cut in speed, and vice versa. The larger the ratio of increasing diameters from the narrow end to the wide end, the greater increase in the range of RPM adaptability over which the conical function recruits additional electroactive rotor length and therefore generative or torque-producing function. The longer the rotor, the higher the voltage. Among other factors, such as magnetization strength variability, the space between the stator sides, and the narrow end rotor diameter defines the limit of adaptability to increasing RPM conveyed by the cone shape of the rotor, but the generator or motor is engineered such that the hybrid electro-permanent magnet function takes over to convey additional range tolerance. If so desired, the stator frustum can be entirely electromagnetic without any permanent magnets.

The electromagnetics may have control systems that modulate each area independently including longitudinal segments such as that used to create a stepper motor or rotating magnetic field analog. These controls can be used, for example, in a DFIG generator analog described in greater detail in later applications.

In specific preferred embodiments, the electromagnets can be a portion of transformers to step up voltage and additionally, with the intrinsic synergy of the variable transformer field, strengthen the stator field.

Additional Preferred Embodiments

FIGS. 33-35 and 37-42 provide renderings and diagrams of the structures of some additional preferred embodiments of the present invention. For the sake of brevity, only elements of the additional preferred embodiments which are different from the above described preferred embodiments and permutations will be described in detail.

Figure 28:
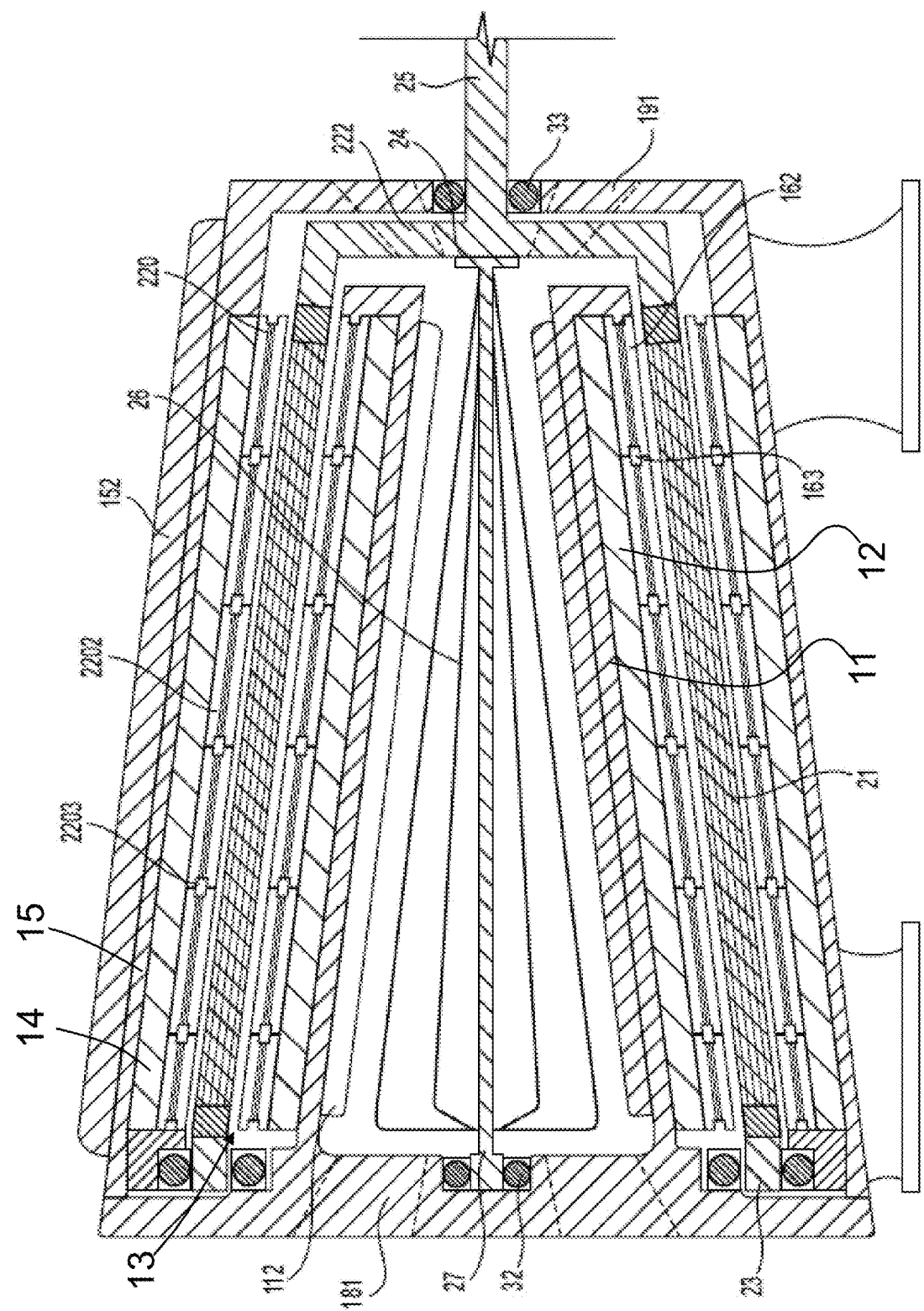
FIG. 28 shows a cross section of a dynamoelectric machine corresponding to another preferred embodiment of the present invention.

FIG. 28 shows a preferred embodiment in which the stator assembly 1 preferably includes an inner stator yoke 11 and an outer stator yoke 15 which respectively include an inner electromagnet stator 16 wound with an electromagnetic coil 17 and an outer electromagnet stator 220 wound with an electromagnetic coil 17. The inner stator yoke 11 and an outer stator yoke 15 further respectively include an inner permanent magnet 12 and an outer permanent magnet 14. By using both permanent magnets and electromagnets, the stator assembly 1 is able to have a strong magnetic field produced by the permanent magnets which can also be adjusted by changing the current flowing through the electromagnetic coils 17 of the inner electromagnet stator 16 and the outer electromagnet stator 220.

The preferred embodiment of FIG. 28 also shows that surfaces of the inner stator yoke 11 and the outer stator yoke 15 may include cooling fins. Further, the housing upper end preferably includes upper ventilation openings 181, the housing lower end 19 preferably includes lower ventilation openings 191, and the rotor support frame 22 preferably includes rotor ventilation holes 222. The upper ventilation openings 181, the lower ventilation openings 191, and the rotor ventilation holes 222 permit an airflow to be directed through the central tube 111 by the fan 26 to further aid in cooling.

FIG. 29 shows a preferred embodiment in which the stator assembly 1 preferably includes an inner stator yoke 11 which includes an inner electromagnet stator 16 wound with an electromagnetic coil 17 and an inner permanent magnet 12 which is defined by a plurality of laterally stacked permanent magnet ring frustum elements. The outer stator yoke 15 preferably includes an outer permanent magnet 14 which is defined by a plurality of stacked permanent magnet elements.

FIG. 30 shows a preferred embodiment in which the stator assembly 1 preferably includes an inner electromagnet stator 16 wound with an electromagnetic coil 17 (the inner electromagnet stator 16 could be defined by a permanent magnet with projections 161), an inner permanent magnet 12 which is defined by a plurality of stacked permanent magnet elements, a middle stator 221 which includes permanent magnets 2211, an outer permanent magnet 14 which is defined by a plurality of stacked permanent magnet elements, and an outer electromagnet stator 220 wound with an electromagnetic coil 17.

Figure 32:
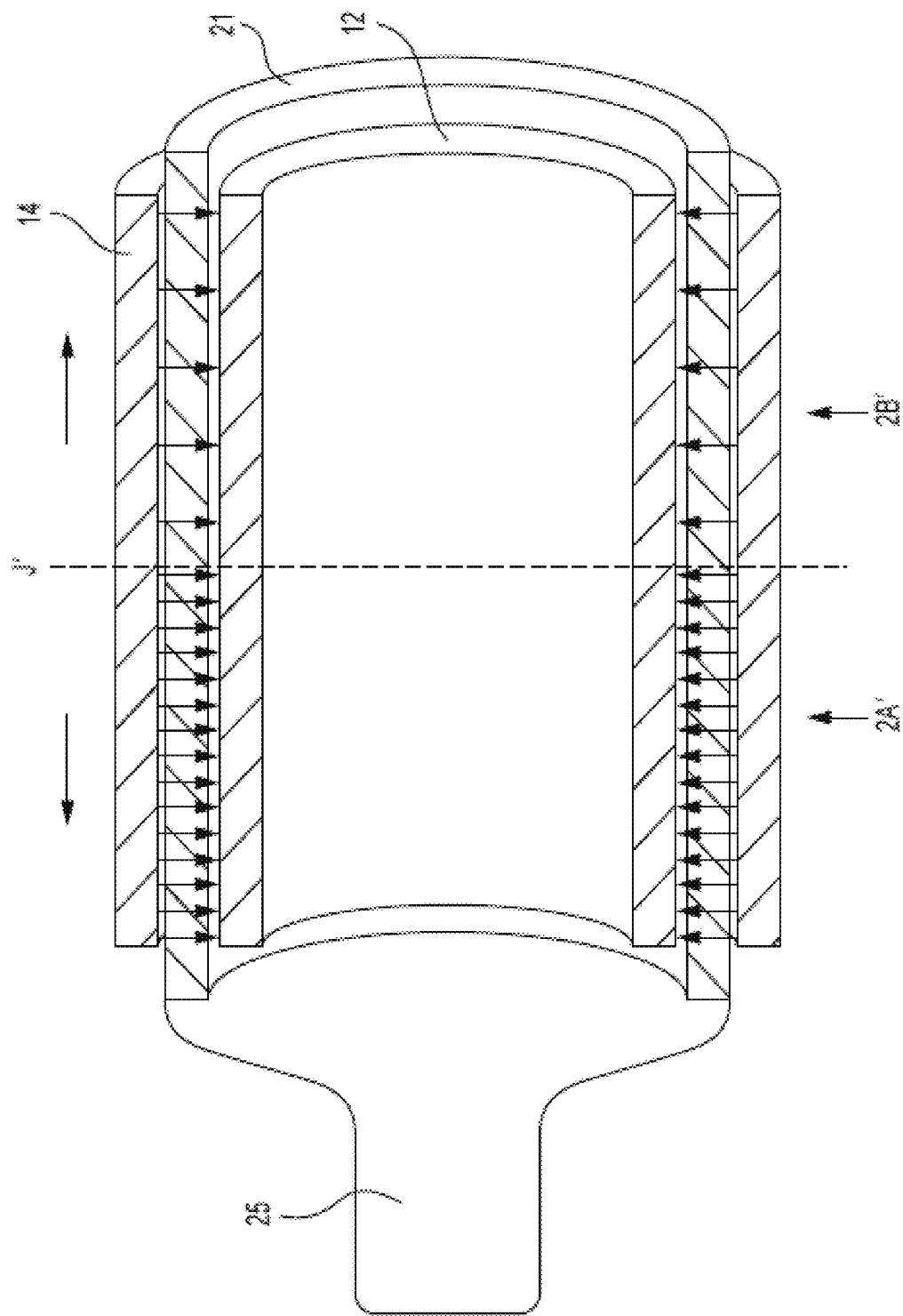
FIG. 32 shows a cross section of a dynamoelectric machine corresponding to another preferred embodiment of the present invention.

FIG. 32 shows a preferred embodiment in which a rotor conductor array 21 is rotated between an outer permanent magnet 14 and an inner permanent magnet 12 which include different gradient magnetic field strength areas 2A' and 2B' which are separated at a dividing line J'. With this arrangement, the left side of the rotor conductor array 21 cuts through a greater density of flux than the right side, causing it to cut in and ramp up power production at a lower rpm than the right side. This makes its output and the force needed to accelerate it more responsive to changing rpm. There can be multiple gradient magnetic field strength areas, not just two. Further, the field strength could also change in an analog gradient fashion longitudinally.

Figure 33:
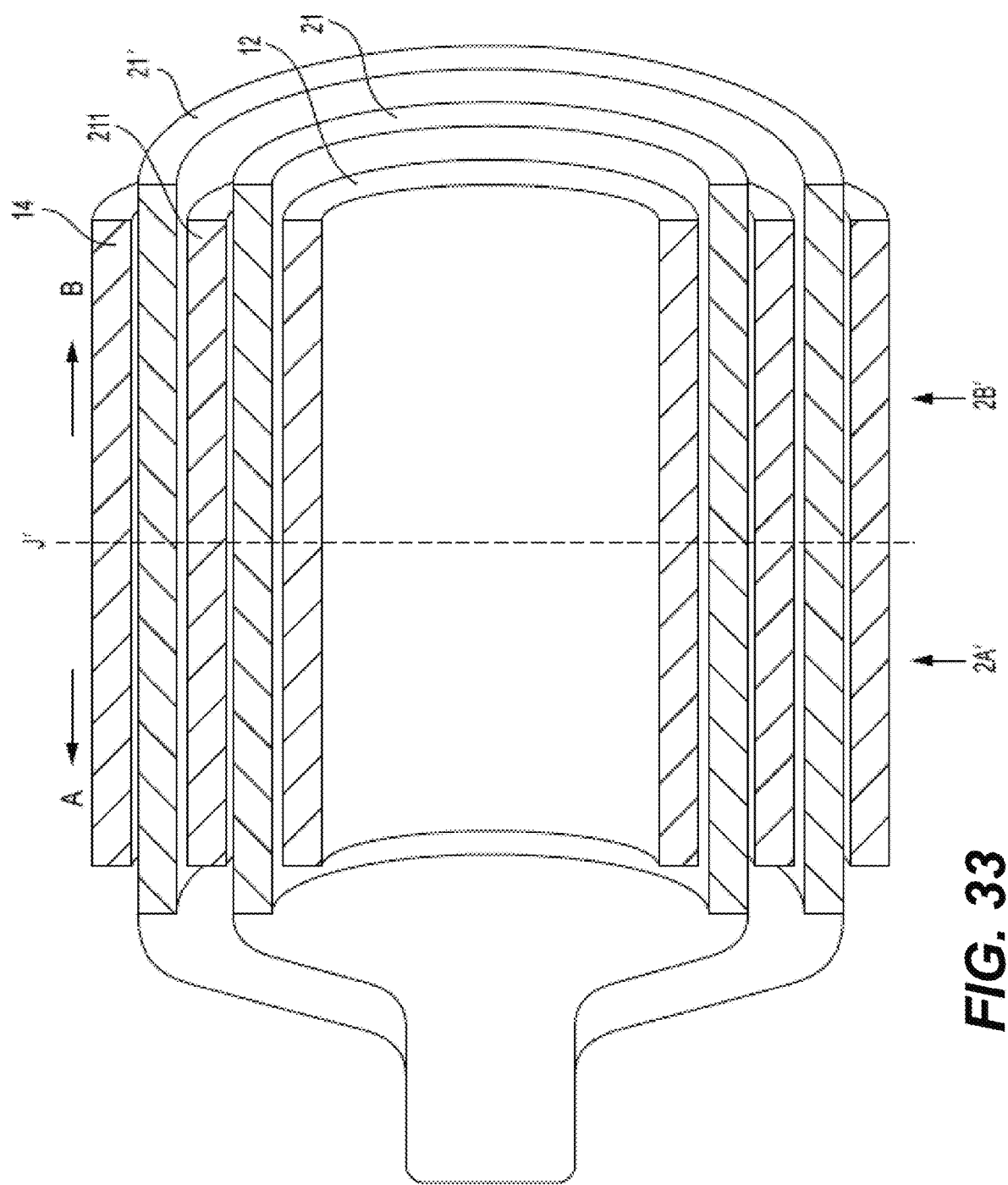
FIG. 33 shows another cross section of a dynamoelectric machine corresponding to another preferred embodiment of the present invention.

FIG. 33 shows a preferred embodiment in which a rotor 2 including an inner conductor array 21 and an outer conductor array 21' is rotated between air gaps 13 defined between an outer permanent magnet 14, a middle permanent magnet 221, and an inner permanent magnet 12 which each include different gradient magnetic field strength areas 2A' and 2B' which are separated at a dividing line J'. With this poly rotor iteration, while each rotor conductor array 21 and 21' has the same rpm, each travels a different distance and a different speed to make each revolution. Therefore, the outer rotor array 21' material will go farther and faster around each revolution than the inner rotor array 21 material.

If both inner and outer stator air gap fields 13 have the same flux density, the outer rotor 21' will kick in sooner and ramp up power production at a lower RPM increasing the way power output varies with changes in rpm, e.g., at a certain speed the outer rotor 21' has kicked in but the inner rotor 21 is not yet producing meaningful power. At a higher rpm, now the air gap fields both are producing meaningful power thus adding additional adaptability, each of these separate rotor's fields can be of different intensities, plus each can vary longitudinally as long as they are homogenous circumferentially.

In FIG. 33, the longitudinal difference is divided into the gradient magnetic field strength areas 2A' and 2B'. Now there are 4 distinct regions including outer rotor 2A' and 2B' as well as inner rotor 2A' and 2B'. Each distinct region kicks in and starts ramping up power production at a specific rpm. This further widens the range of responsive change in power production as the rate with which the rotors are spun varies.

Figure 34:
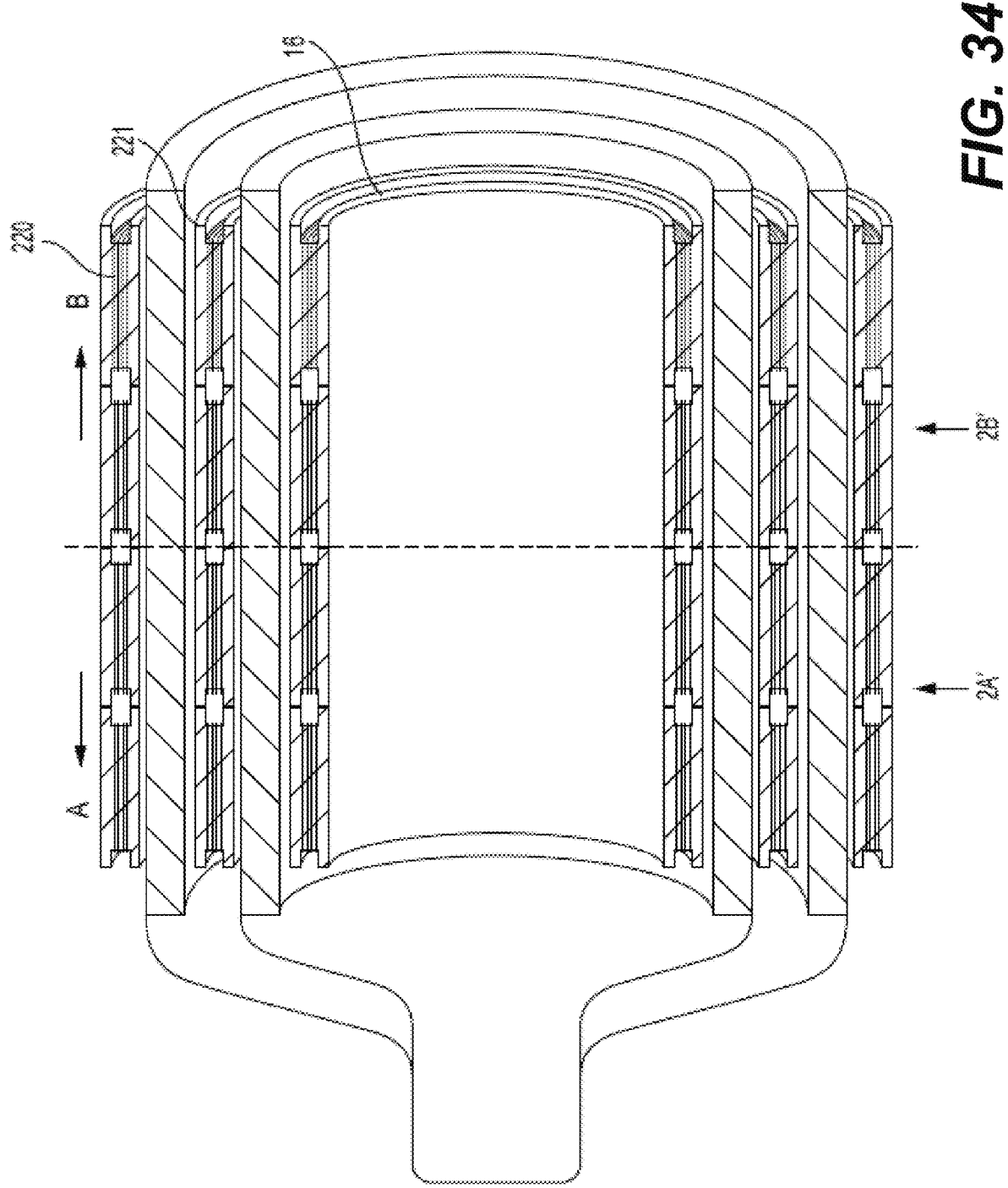
FIG. 34 shows another cross section of a dynamoelectric machine corresponding to another preferred embodiment of the present invention.

FIG. 34 shows a preferred embodiment in which a rotor 2 including a conductor array 21 and an outer conductor array 21' is rotated between two air gaps 13 defined between an outer electromagnet stator 220, a middle electromagnet stator 221, and an inner electromagnet stator 16 which are each able to produce different gradient magnetic field strength areas 2A' and 2B' which are separated at a dividing line J'. The two airgaps 13 define four flux regions, two for each of the opposed stator arrangements (e.g., in the 4 distinct regions: outer rotor 2A' and 2B' as well as inner rotor 2A' and 2B'). Further, 2A' and 2B' can be further split into different strength field sections by differentially powering the electromagnet of the stator. The electromagnets of the stator could also be hybrid combined permanent and electromagnet magnets.

Now, the stator field intensity for each segment can be individually increased or decreased through the electromagnets. This confers multiple changes, for both when this machine is used as a generator and when used as a motor. Focusing on the generators used for wind power, and that when the wind speed rises there is more power to harvest, conventional generators have to waste the lucrative power to prevent overspin of the generator or blade tips. In this generator, before either overspin phenomena can happen, and as the power output ramps up (in addition to the increased resistance to acceleration conferred by the different radii areas of rotor, different areas of baseline magnetic field strengths, different rotor thicknesses and air gaps, etc.), the final protection against over spin is that some of the large extra power output can be diverted to the electromagnet coils, increasing the stator field intensity to its maximum in all segments. This increases the flux that is being transected by the rotors, increasing both the power output but also increasing the amount of force needed to spin and accelerate the generator/turbine. This prevents or forestalls overspin.

In gusty wind, the control algorithm preferentially electrifies certain electromagnets more than others to make a greater range of field intensities so the machine becomes more responsive to sudden changes in wind speed. In low wind conditions, the electrification to the electromagnets is minimized to make it the equivalent of a small, easy to spin, low output generator.

Figure 35:
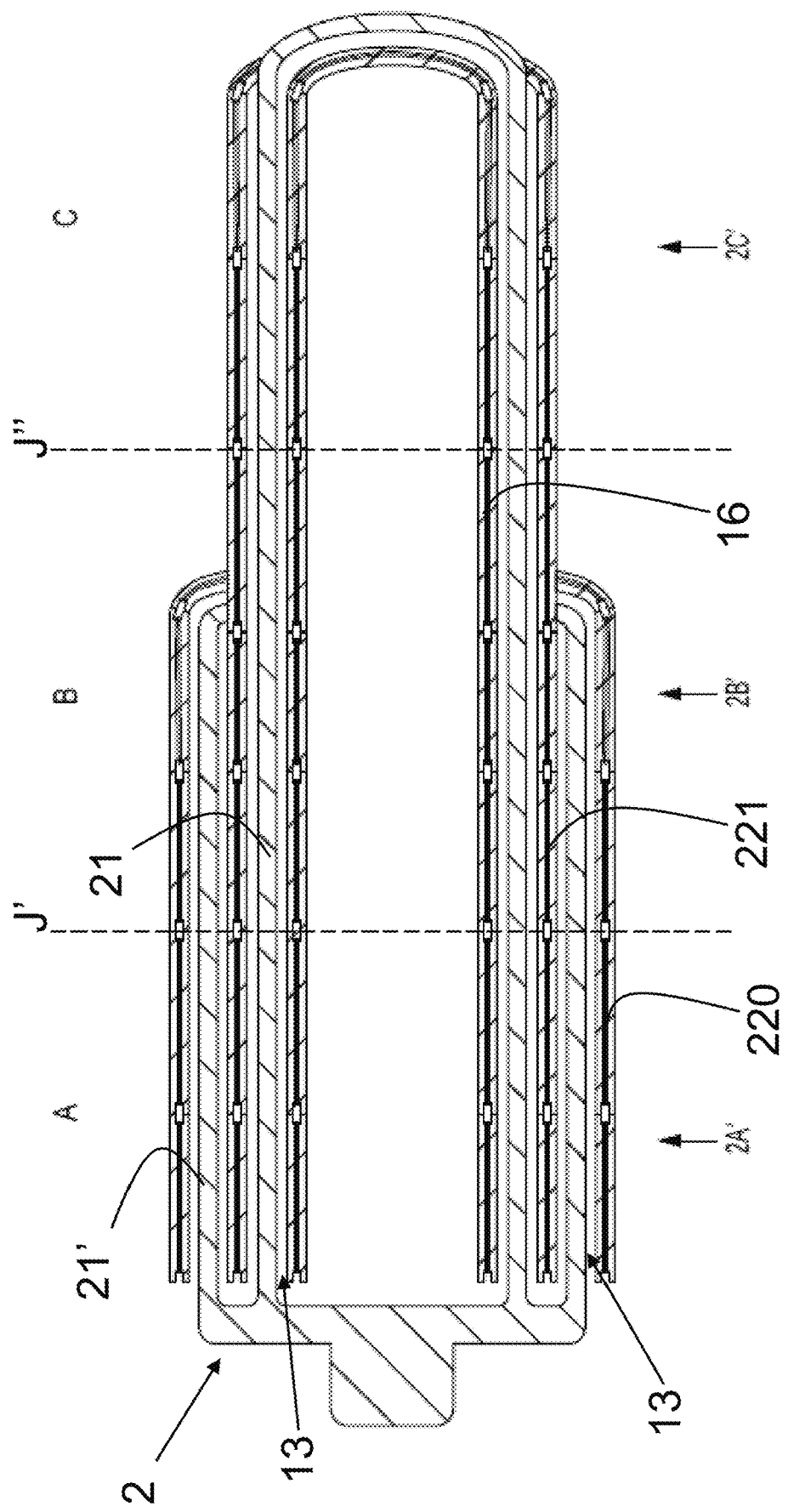
FIG. 35 shows another cross section of a dynamoelectric machine corresponding to another preferred embodiment of the present invention.

FIG. 35 shows a preferred embodiment in which a rotor 2 including an inner conductor array 21 and an outer conductor array 21' is rotated between air gaps 13 defined between an outer hybrid electro/permanent stator 220, a middle hybrid electro/permanent stator 221, and an inner hybrid electro/permanent stator 16 which are each able to produce different gradient magnetic field strength areas 2A'-2C' which are separated at a dividing line J' and J".

The above structures and arrangements increase the voltage from the smaller diameter rotor such that it can be more equal to that produced by the larger diameter rotor by varying the flux density, but also by virtue of the longer inner assembly. Having the rotors concentrically positioned also saves on magnet cost and weight. It also multiplies the device power density by making it more compact. It also gives the device a conical shape that is of small aerodynamic advantage.

In FIG. 35 there are three zones of differing baseline magnetic strength (A, B, C) surrounding 2 different diameter/different length rotor conductor arrays (inner 21 and outer 21'). In this configuration there are five zones with different cut in/ramp up characteristics (A/inner rotor, A/outer rotor, B/inner rotor, B/outer rotor, C/inner rotor). Each of these 5 zones contribute to the adaptability because each has a different output/rpm curve based on their individual rotor diameter and magnetic field strength.

Next, a control system which selectively energizes the windings of the electromagnetic components of stators 16, 221, and 220 will be described. With the ability to power each circumferential band of the electromagnetic components of stators 16, 221, and 220, the number of adaptability zones increases, i.e., Section A, as drawn, has 2 electromagnet circumferential bands. If only one is energized, or if they are energized unequally, section A becomes two different sections (A and A prime). So there a total of 10 different zones, for example. Each of these zones have a unique radius to field strength ratio, so taken together, they impart a cone-like variability termed functional conicity.

Each circumferential section can be magnetized not just to one different fixed level of field strength, but to anywhere within a range of multiple magnetic field strengths, so it is not limited to 10 single fixed options for the adaptability/generative/braking characteristics.

In addition, with algorithmic varying of specific circumferential field strengths, a generator corresponding to FIG. 35 can adapt to conditions in a different way. For example, on a high speed wind day, the electromagnets can all be energized uniformly to their maximum to harvest the most power while providing the greatest protection against over spin. Also, on a gusty day, the magnets can be energized with some toward their maximal range and others toward the minimal and the rest in a gradient stratification so as to create a wide spectrum range of different operating parameters so the generator has had its adaptability maximized and it is ready for the highly variable gusty input. On a light wind day, in a case that the stator includes both permanent magnets and electromagnets, the electromagnetic input can be shut off such that the magnetic field in the airgaps 13 of the generator becomes its weakest and easy to spin rating and continues to harvest that range also. Under more constant mid wind speed conditions, the various segments will be adapted to have flux field strengths that improve or optimize output for that input. That is, each segment will be controlled to have the flux density to diameter ratio optimized for maximal output and appropriate braking. For example the inner rotor, traveling less than the outer rotor per rotation will have the field made stronger than that of the outer rotor. Another way of saying this is the two will be made to have the same rotor circumference to flux transection ratio so they will contribute in a balanced fashion.

Note that this electromagnetic control is also applicable to motors, especially EV motors that encounter a tremendously variable set of operating conditions as the car accelerates and decelerates, goes up and down hills, and carries a varying load of occupants and cargo.

Recall that, prior to these novel structures according to preferred embodiments of the present invention, every type of motor has a small range of load/rpm at which it can operate at >90% efficiency (sweet spot). Outside of that individual type of motor's sweet spot, efficiency can drop to as low as 55%, for example. For constant load and rpm operating applications such as running a conveyor belt, a design engineer maximizes efficiency by simply choosing the type of motor that has a sweet spot that is the same as the operating demands for that machine or system.

With cars, however, the rpm and load are always changing radically. By having a motor that (1) starts with zones that have different sweet spots, but then (2) can change the zone's magnetization, the overall motor's sweet spot can be changed, in real time, to match the instantaneous operation condition of the EV motor, even as they change. The end result is a motor that operates in its sweet spot for a greater range of its operation, so less batteries are needed for greater range.

In one preferred AC embodiment, all the electromagnets can be AC powered electromagnets. The same generator can power the US's 60 Hz grid as well as the European 50 Hz grid, the Japanese 60 Hz and 50 Hz grids, and all remaining other standard 50 Hz and 60 Hz grids.

Figure 37:
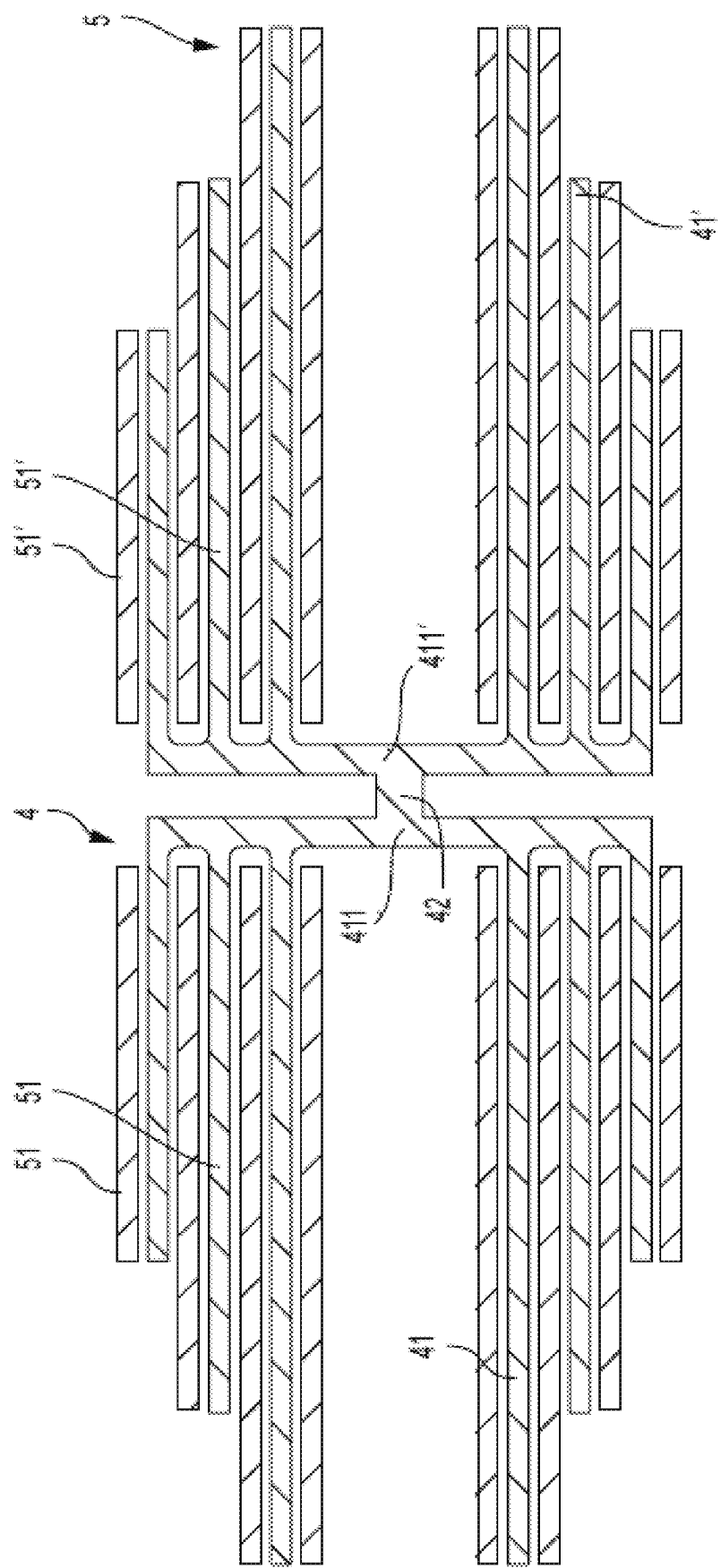
FIG. 37 shows another cross section of a dynamoelectric machine corresponding to another preferred embodiment of the present invention.

FIG. 36 shows a preferred embodiment in which a lateral double rotor assembly 6 interacts with a lateral double stator assembly 7. The double rotor assembly 6 includes upper rotor disks 61 which are mutually connected to one side of a common connecting shaft 62, and lower rotor disks 61' which are mutually connected to another side of the common connecting shaft 62. The double stator assembly 7 includes upper stator magnets 71 and lower stator magnets 71' which are opposed to the upper rotor disks 61 and the lower rotor disks 61'. Note that these disks could be replaced with drums, similar as to what is shown in FIG. 37.

An insulating shaft insert (preferably made of non-electrically conductive resin or non-electrically conductive metal) is preferably provided between the one side of the common connecting shaft 62 and the another side of the common connecting shaft 62 and a transformer or similar component 9 is provided, for example, with input leads 91 connected to the opposing ends of the lateral double rotor assembly 6 is able to provide an output current through output leads 92. The input leads 91 are preferably connected to the opposing ends of the common connecting shaft 62 through brushes or some other rotational connector. While not shown in this figure, the periphery of the left disks is preferably electrically coupled to the periphery of the right disks. The directly generated low voltage/high amperage electrical energy goes in a circle path with the load being the transformer or similar component 9.

It is important to note that the polarity of the magnetic fields are reversed from the left side to the right side in FIG. 36. In this side view, there are six spinning rotor disks (61 and 61') affixed to, and electrically coupled with the same single axle/spindle rod 62. But for the novel manner of dealing with brush losses to be discussed later, the entirety of the six disks 61 and 61' and the axle rod could be cast as a single piece from a suitably conductive material and the transformer or similar component 9 would be moved to the connecting wire on the disk periphery. It is also the only moving piece. In this iteration the disks 61 and 61' have been made with different diameters to confer extra adaptability. All but the end disk magnets 71 and 71' include a hole in the center to allow the axel rod to pass through. They all are arranged so opposite poles oppose each other across an inter magnet space, which is occupied by the spinning rotor disks 61 and 61'. Note that the group of magnets 71 on the left side are preferably positioned so that south magnetic pole is to the left and north magnetic pole is to the right, while the right sided group of magnets 71' is positioned so north magnetic pole is to the left and south magnetic pole is to the right. This way, when the axle 62 and rotor 6 are spun, on the left group, electrons are induced to flow from the periphery of the disk to the center and out into the rod. On the right hand side, while the disks rotate in the same direction as those on the left, the magnetic field polarity is reversed so the electrons are induced to flow from the central rod to the periphery of the disks. The magnets can be electro mags or hybrid or permanent magnets in dc versions, and electromagnets in AC versions. While each side's group of disks can be thought of being arranged in parallel so their individual amperage adds together, the two groups are connected in series so the voltages add.

Current collecting brushes (not shown) preferably touch the outer circumferential edges of the disks 61 and 61'. There are several advantages to this layout. The first is reduced brush loss. Sliding brushes collect current but at a penalty of voltage loss.

The more important concept here comes from examining the non-conductive insulating shaft insert 8 and the transformer 9. When the system is an AC generator, the current in the rod 62 now has to pass through a primary winding 91 of the transformer 9 (preferably a step up transformer). For simplicity and lack of vibration, understand the transformer 9 to be a cylindrical transformer built uniformly, circumferentially around the rod axle 62 which rotates together with the rod 62. The high voltage power is taken from the secondary transformer coil 92 via, for example, slip rings or the like.

With this transformer system, the low voltage direct rotor 'output' never even has to leave the generator. It only has to travel a short circular distance inside the generator. Its path is practically a short circuit so percentage voltage losses are minimal. The output from the transformer secondary winding 92 is what leaves the generator casing and has high voltage that can be efficiently transmitted.

It is possible to construct a similar system for a generator that uses permanent magnets. The internal circuit can be low voltage DC and the power can go through an internal inverter/converter. Alternatively, one set of the rotor disks/drums 61 and 61' can have intermittent nonconductive areas built into their outer rims that intermittently interrupt the flow of the dc current. During the off times, the surplus charge is stored in the disks 61 and 61' and delivered during the on times, as is known to occur with homopolar designs. The dc current flashing on and off can activate a suitably built step up transformer or similarly functioning inverter.

FIG. 37 shows a preferred embodiment in which a longitudinal double rotor assembly 4 interacts with a longitudinal double stator assembly 5. The double rotor assembly 4 includes upper rotor cups 41 which are mutually connected to an upper base 411, and lower rotor cups 41' which are mutually connected to an lower base 411'. The lower base 411' is connected to the upper base 411 through a common connecting shaft 8. The longitudinal double stator assembly 5 includes upper stator magnets 51 and lower stator magnets 51' which are opposed to the upper rotor cups 41 and the lower rotor cups 41'.

Again, similarly to FIG. 36 but not shown, there could be an internal step up transformer with the primary circuit of low voltage, high amperage primary output traveling only the very short, circular path from the rotor drums 41 and 41' through the primary transformer winding and back to the rotor drums 41 and 41'. The power induced in the secondary transformer coil leaves the generator. In preferred embodiments for DC, again, an inverter can substitute for the transformer.

Benefits of Preferred Embodiments of the Present Invention

Preferred embodiments of the present invention are able to provide a true intrinsically adapting, variable speed generator or motor. That is, the generator or motor is able to instantaneously adapt and modify its operating parameters in response to the current environment in which it is operating. That is, a major advantage of the generally conical shape or function is adaptability to a fluctuating force input, which unlike conventional designs, make the novel structures of the preferred embodiments of the present disclosure a true intrinsically adapting, variable input speed device which is efficiently operable across a large continuous swath of operating conditions. This occurs because at any RPM, while any point longitudinally along the rotor has the same RPM, they have different speeds and intercept a different number of field lines progressively. Points progressively nearer the wide end are moving progressively faster and intercepting more field lines per second. As such, as RPM ramps up from zero, the wide end, being the part that is moving the fastest and intersecting the most field lines per second, will be the first and only initial part to cut in and start making electricity and resistance to turning. At this low cut in speed, it functions as a very small generator in that it makes a small amount of power and is easy to spin.

As the RPMs increase progressively more of the rotor's longitudinal length crosses the threshold into cutting enough field lines per second to become generative also. In this way, the rotor automatically, and without additional equipment, recruits additional generating capacity to progressively act as a larger generator that makes more power and takes more force to turn as the input power ramps up. The adaptation to changes in wind speed is automatic and does not involve extra equipment. The generator adapts automatically to function as the correct size machine at a wide range of wind speeds.

Preferred embodiments of the present disclosure are also able to provide intrinsic regenerative braking. In addition to making more power when the wind blows faster, recruiting more generative power also produces more resistance to being turned faster. The increased force needed to turn the faster moving rotor relatively decreases the increase in rpm. As such, the generator can be thought of as automatically using regenerative braking to make more power while preventing the system rotation speed from ramping up too quickly. The harder the wind blows, the more power the generator makes and the harder it is to spin, which leads to more regenerative braking. The turbine RPM does not ramp up as fast as would conventional designs because the power output and resistance to being spun ramp up proportionately to the power in the wind, not to the wind speed itself. The net result is that input power is matched by output power, but the turbine's speed is relatively throttled by the increased force needed to spin the progressively more powerful generator. In this way, the generator obviates much of the need for active airfoil equipment, gearing, and braking systems. Making more power is a major aspect of its braking system.

The automatic seamless instantaneous adaptability to the variable input can be enhanced or tempered by including the gradient strength to the magnets described above, as well as the option for additional gradient widening of the inter-magnet space described above, increasing the ratio of diameter from the narrow end to the large end, adding additional rotor and stator levels, and by the use of stator hybrid electro/permanent magnets. This can be done using, or without using, a conical shape.

For example, when wind blows frequently at low speed, even though there is only a little power available, it occurs more often, increasing the significance of the output. In mild to moderate wind speeds (e.g., approximately 5 to 10 m/s), the ramp up in the power output in conventional designs is essentially solely due to, proportional to, and limited by the increase in RPM of the rotor. In the novel structures of preferred embodiments of the present disclosure, it is due to this increase in RPM plus the recruitment of additional electroactive armature or rotor length, plus the ability to automatically recruit or engage the electromagnets to additionally increase the stator magnet field strength and boost output. The net result is more power production throughout this range than is available from conventional designs.

In moderate to fast wind (e.g., approximately 10 m/s to 25 m/s), conventional generators have to utilize power wasting, costly additional equipment such as friction brakes, active airfoils, DFIG rotation that plateaus the output even though the available energy increases tremendously and asymptotically. These new structures continue to recruit the additional generating ability to harvest that additional power. In doing so, as the generator becomes more powerful to match its output to the available energy of its input, it also becomes harder to spin, relatively decreasing the increase in RPM compared to the conventional technology. This is analogous to regenerative braking in that the creation of extra power decreases the increase in RPM allowing the generator to produce more power in higher winds. The bottom line is the production of significantly more power.

In a very high windspeed region (e.g., over about 25 m/s), the regenerative braking analog intrinsic to these novel structures can allow the generator to, not just make more power per wind speed, but also to continue to function at a relatively lower RPM in the higher wind than conventional generators and therefore function in windspeeds that would force other generators to cut out, enabling structures of preferred embodiments of the present disclosure to harvest still more energy as they can instantly adapt to their operating condition to function optimally.

The novel features described herein are advantageous to improving most generators and motors in that they will be stronger, lighter, longer lasting, and smaller. They are particularly advantageous to applications with variable load and input conditions such as wind power generators, car alternator/generators, and electric vehicles.

They will be described first for generators with an emphasis on wind power than on motors in a later section. Conventional generators are based on designs that were engineered to function at a specific very small range of RPM. Too slow and they miss much or all of that energy. Too fast and they have to use a variety of ways to waste all the extra harvestable energy. As such, they only capture a surprisingly small amount of the available power. For the wind power industry, engineering effort has gone into addressing this problem which can loosely be described as making them more like variable input generators. On closer evaluation, the generators are not actually functioning by adapting to that variability to always collect the maximal available power. Largely these improvements in named "variable generators" only serve to find ways to waste, rather than capture the range of harvestable power so the generators can function.

No windspeed to low windspeed: The structures of the preferred embodiments allow for a lower cut-in speed.

Increasing to moderate windspeed: The ramp-up in the power output in conventional designs is essentially solely due to, proportional to, and limited by the increase in RPM of the rotor. In the structures of the preferred embodiments, it is due to the increase in RPM PLUS the recruitment of additional electroactive armature or rotor length and layers, PLUS the ability to automatically recruit the electromagnets to additionally increase the stator magnet field strength and boost output.

Moderate to high windspeed: Conventional generators have to utilize power wasting, costly additional equipment such as friction brakes, active airfoils, DFIG rotation that throttles and plateaus the output even though there is a tremendous amount of extra harvestable energy. The structures of the preferred embodiments continue to recruit and engage the additional generating ability to harvest that additional power. In doing so, as the generator becomes more powerful to match its output to the available energy of its input, it also becomes harder to spin, relatively decreasing the increase in RPM compared to the conventional technology. This is analogous to regenerative braking in that the creation of extra power decreases the increase in RPM allowing the generator to produce more power in higher winds.

Very high windspeed: The regenerative braking analog intrinsic to the structures of the preferred embodiments can allow the generator to, not just make more power per windspeed, but also to continue to function at a relatively lower RPM in stronger wind than conventional generators and therefore function in windspeeds that would force other generators to cut out.

The innovations of the preferred embodiments of the present disclosure allow for a stronger, more efficacious magnetic field. Specific advantages are described below.

Advantages of magnet proximity. A magnetic field's intensity drops relative to the increase in distance between the magnets depending on the size of that distance. Therefore, tremendous drops occur as distance between the magnets increases even a little. If the distance between two magnets is doubled, the magnetic force between them will fall to a quarter to an eighth of the initial value. Conversely, If the distance between two magnets is halved, the magnetic force between them will increase to between four to eight times the initial value.

In many generators, the magnets are spaced as far apart as the generator's diameter can allow. In the novel structures of preferred embodiments of the present disclosure, the magnets are concentric and as close to each other as possible. For example, in the new generator structure according to preferred embodiments of the present invention, the distance between the magnets would be closer to about ½ inch, for example. Even if the magnets were of the same strength, having them so much closer together increases the magnetic field strength by about 10,000 times. To partially correct for this, the conventional generator inventors added a heavy and expensive laminated steel core to the rotor and stator to conduct the magnetic field. This way, they only lose about an order of magnitude of field intensity compared to the structures of preferred embodiments of the present disclosure.

In most wind generators, such as those with squirrel cage, wound, and DFIG rotors, the magnetic field arcs about ⅛th of the way around the stator's internal diameter. The stator in a 9-inch diameter unit is about 1 inch thick, so the inner circumference would be about 23 inches. As such, each subfield averages about 3.66 inches between the poles, but the field does not cross this distance in a straight line. Instead, it arcs a long way around into an average of 5.75 inches, losing about 75% of its field intensity were it not for the expensive and heavy laminated steel cores. This arcing flux path increases the functional distance between the magnets. Furthermore, the resulting arced field is not uniform. It is stronger where two poles are closer and weaker where they are farther away causing less functional areas and dead zones. Further, in the center of that arc, the field lines run parallel to the rotor's rotation so they do not contribute, but serve as dead space.

In the power structures of the preferred embodiments, the rotors move through a perfectly aligned, uniform series of field lines which are laid out to achieve the straightest and strongest radial lines between two points. The power is induced in the simplest, most perfect possible manner. Further, in preferred embodiments, the rotor's novel inner materials architecture is designed to reduce the flux distortion caused by the architecture of conventional designs.

This is in complete contrast to the convoluted way in which power is made in the most often used types of wind generators. Starting with the squirrel cage induction designs, first, in a separate efficiency loss, the stator coils need excitement energy input to begin to function. The stator field is not optimally shaped or oriented as described above, but that is not as important as the stator field does not make the output power. It induces a series of looped short circuit electrical currents in the rotor. This creates a series of electromagnetic fields around the bars of the squirrel cage. As the rotor turns, their fields are dragged past the stator cores where they expand through the stator coils, inducing an opposite current to produce the generator output. This is a phenomenally indirect way of making power, and each energy transition has an inherent efficiency cost.

In Type 2, wound rotor generators, the rotor relies on parasitic draining of the stator field to make its rotating fields. It requires a parasitic current to flow into a series of rotor electromagnets to create the magnetic field. Again, these fields are serially dragged by the spinning rotor to expand into the coil cores and out over the stator wires to make power. While this functions reasonably, it is less direct, more complex, and less efficient than power creation according to preferred embodiments of the present disclosure.

In Type 3, DFIG systems, the wound rotor has a separate electrification from the stator coil which allows the superimposition of a computer-created phi phenomena facsimile of a rotating field onto the rotation contributed by the spinning rotor. This functionally uncouples the net rotor's field RPM from the rotor's physical RPM, relieving mechanical stress by allowing the rotor to spin at different speeds, but it again functions as a way of electronically wasting all the extra lucrative power in faster winds. This takes a surprising amount of parasitic control apparatus, and parasitic energy into the rotor and stator, to make power in the same complex fashion.

With preferred embodiments of the present invention, all inter-magnet stator field lines are straight, linear, orderly, and aligned at the precise angle for maximum effectiveness. The field lines are oriented at perfect right angles to the rotor segments and direction of motion. Unlike the conventional generators, they maintain this orientation throughout the complete 360-degree rotor duty cycle. Essentially all conventional generators have complex, vastly suboptimal fields by comparison, and unlike conventional generators, in the novel structure well-positioned collateral magnets compress each other's fields increasing flux density and therefore further increasing the motor's power and range.

Related to the previously described advantage, the field does not arc, bulge, have subtractive interactions, or have weak areas or areas where the lines are not perfectly aligned, so there is essentially zero field loss. All field lines are equidistant apart and are packed much closer together. This perfect field orientation confers still more power with much less input energy.

In preferred embodiments of the present disclosure, the inter-magnet field is nearly exactly the same size as the rotor thickness.

The field in preferred embodiments of the present disclosure is temporally stable and circumferentially uniform avoiding efficiency losses. Unlike in many conventional generators, the field is not made of dozens of intermittent, pulsating, and reversing subunits, so there is no loss from subfields expanding with wrong orientation fronts and there is no loss from negative cross-field interactions.

Many generators are said to have a rotating magnetic field. While this is partly true, in that the polarity of the net field does rotate, the field, itself, does not actually rotate. This dichotomy is accomplished in an energetically costly and inefficient manner. Like a Vegas marquee flashes stationary lights to create the illusion of motion, a net field is created by sequentially energizing and de-energizing dozens of stationary adjacent electromagnet coils. This makes dozens of small immobile temporary subfields that all constantly grow, shrink, disappear and reverse stroboscopically.

The pattern mimics rotation and does cause the net polarity to appear to rotate. However, compared to the stronger, constant, perfectly ordered base stator field of the preferred embodiments, fields created in the stroboscopic way are a roiling organized mass of constantly changing, interacting subfields. While this gets the job done, the cost is multiple inefficiencies and the subfields lose potential efficiency in their interactions with each other.

Another efficiency loss found in a stroboscopic field comes from how the field lines at a specific area change orientation as a field grows and shrinks past that area. As the electromagnets are energized and de-energized (many times a second), the fields do not suddenly appear and disappear at their full size. Rather, when the electromagnet is turned on, they start small at the edge of the electromagnet and rapidly expand outward to full size. Then they collapse inward, shrinking out of existence as the electromagnet is de-energized.

As the field expands and contracts past a fixed point in the metal in which a current or torque is desired, the EMF produced at that point is directed in unwanted directions at different times. The same occurs as the field shrinks. Only a central uniform arrangement of field lines includes forces in the required direction to create the flow of current. As the field grows and shrinks it momentarily exerts counterproductive forces in the wrong direction. It is a minute phenomenon, but it happens up to thousands of times a second, so it adds up to rob efficiency.

Preferred embodiments of the present invention do not have these power losses as the field takes much less power to produce and yet is much more powerful and effective. The magnets are physically and functionally closer together so, compared to the prior art, equal strength magnets can make a field that is orders of magnitude more powerful. Every bit of the field of preferred embodiments of the present invention helps augment the power of every adjacent portion, and every part is oriented perfectly for maximal effectiveness, as compared to the prior art wherein a surprisingly large percentage of the field does not contribute to power or torque production.

The bottom line is that conventional generators generally use more energy and stronger, more expensive magnets to get a weaker and disadvantageously disordered magnetic field than preferred embodiments of the present invention. This has a profoundly limiting effect on the function of the conventional generators.

Preferred embodiments of the present invention are able to significantly improve permeability or field line orientation loss. Different from the above losses, at full mature field size, devices such as a reluctance, DFIG, or DC machine's rotor net field arcs through the rotor and back to the stator.

At the periphery of the rotor, the field line's arc is aligned in the correct perpendicular direction to create a force on the rotor, but at the center of the arc, the lines are pointing in the wrong direction to do any work. These misaligned sections and non-straight lines result in weaker magnetic fields. Preferred embodiments of the present disclosure have no field loss due to this problem. The novel structure's intermagnet field is always the exactly smallest straight line, which is always exactly oriented entirely in the perfect direction throughout its entire length. This contributes more to greater range and power.

Preferred embodiments of the present invention are able to provide vastly reduced stator energy requirements. The basic stator field magnet field according to preferred embodiments of the present disclosure primarily utilizes permanent magnets, so it does not drain efficiency. Many generator stator fields are made by running electricity through dozens of coils. That takes a lot of electricity. Electromagnet coils according to preferred embodiments of the present disclosure are generally only energized at times of high winds when there is a tremendous amount of energy available.

Generators and motors of preferred embodiments of the present invention have nearly no non-electroactive producing parts. All other conventional designs necessitate parts that do not directly contribute to current generation. They are necessary but require maintenance and add weight and cost. In a standard permanent magnet machine rotor coil, up to about a third of the wire has to be oriented in a way that it does not contribute to producing torque. It does however add weight, size, cost, and complexity. The novel structure simply does not have that problem or anything analogous to it. As discussed above, the conventional rotors also need to have their central core filled with iron to conduct the magnet field.

Preferred embodiments of the present invention are able to provide generators and motors that require fewer parts but are much more powerful. To reduce eddy currents, a steel core is needed by both the rotor and stator of the conventional designs. The cores are built out of dozens to thousands of laminated sections that are formed then assembled and adhered together. This process adds considerable cost, energy, and time to their manufacture. The extra cost and complexity of using laminations reduce but do not eliminate the problem. Conversely, machines according to preferred embodiments of the present disclosure do not need as much laminated metal. DFIG machines require sophisticated control systems to allow the turbine to spin freely. However, preferred embodiments of the present disclosure do not need such control systems, gear boxes, or active airfoil release systems.

Preferred embodiments of the present invention are able to provide a larger electroactive area percentage. The electrically active area of a generator is the area in which current is actually produced. The increased generation to volume ratio allows further size reductions which decrease costs.

Compared to the most common large wind power generator or the DFIGs, preferred embodiments of the present invention are able to avoid common efficiency losses because they: Do not need to be spun to more than 1000 RPM before power is produced; Do not need as much or any efficiency sapping gearing; Do not need expensive controllers; Both cut in at a lower wind speed and do not waste the power of fast wind; Take advantage of permanent magnets for their base stator field, saving efficiency; Only use electromagnets when making a surplus of power; and Follow the wind speed automatically adjusting to being able to harvest the maximum power of every wind speed instead of wasting it.

Preferred embodiments of the present invention are able to provide positive feedback loops. The above advantages automatically cause a cascade of further advantages. For example, because of such advantages, the motors and generators according to preferred embodiments of the present disclosure are stronger for their size, and they can be built smaller which again, eliminates cost and weight. In the case of wind, such advantages in turn improve aerodynamics and decrease the forces on the tower, reducing the costs to construct the tower. For electric vehicles increased power and reduced weight of the motor can extend the range that the vehicles can travel.

Preferred embodiments of the present invention are able to provide additional advantages to the wind power generation industry. Here are additional advantages of the preferred embodiments of the present disclosure specific to the wind industry: Up to 2.5× more power per turbine; Able to be sited in many more locations; Able to be sited nearer to where the power is used, reducing both costs and landline losses; Smaller, lighter, more powerful; Reduced tower costs; Reduced roads and powerline costs; and Because the magnets are used in a much more powerful configuration, the generator can avoid the use of rare earth elements.

Further, preferred embodiments of the present invention are also useful in electric vehicle applications. The smaller, simpler, lighter, more efficient, motor structures according to preferred embodiments of the present disclosure confer multiple advantages that add breakthrough range extension while improving both power and regenerative braking. Electric vehicle motors according to preferred embodiments of the present disclosure utilize massive field and rotor improvements that make them more powerful, more robust and more efficient allowing greater range at lower cost. While offering more torque (EV equivalent of horsepower), they will extend the EV range enough to give whichever company adopts this new technology, the crucial advantage to take the leadership position in an exploding market.

In the burgeoning electric vehicle industry, the design premiums that drive the market are efficiency, weight reduction, full spectrum torque, and regenerative braking. These are the holy grail of the next generation of EVs, and are exactly what preferred embodiments are delivering. The most crucial development driver is range extension. Preferred embodiments of the present invention provide total range increases on the order of about 10% or more, for example.

Preferred embodiments of the present invention are able to provide propulsion efficiency improvements. Propulsion is divided into torque, which accelerates the car and range, which is how far the car can go on a charge. Compared to other EV motors, preferred embodiments of the present disclosure change create a baseline magnetic field that is phenomenally more effective and powerful, but takes less energy.

Not only is the field much more powerful, but it is organized in the exactly perfect form. Every portion of rotor, throughout 100% of its duty cycle, moves simultaneously and continuously immersed in a stable, powerful magnetic field that is always at exactly the perfect alignment, shape, size, and power. IPM Syn RM, for all its impressive attributes, cannot come close to that. In the following, description of how the motors according to preferred embodiments of the present disclosure achieves gains is provided.

All electric motors have a specific set of RPM and load operating conditions under which they can operate at peak efficiency. IPM motors are efficient when producing high torque in low RPMs. In this way, they can be thought of as being similar to a bulldozer—slow and powerful. If they are forced to operate outside of their optimal sweet spot, efficiency drops rapidly. By contrast, the new computer driven synchronous reluctance motors do better at higher RPM ranges, lower torque conditions and when forced to operate outside of this "sweet spot" their efficiency drops. The new computer controls expand the range of their maximal efficiency sweet spot, but there are still gains to be had. The issue is that propelling an EV is one of the most variable operating conditions a motor can face. The car goes slowly, or fast. It accelerates, decelerates, stops, starts and even goes backwards. It carries ever changing numbers of people and cargo. The transmission is always shifting through multiple gears. Even if the control pedal is bolted into one place, the vehicles go up and down hills and even mountains.

The bottom line is that the load, torque, and RPM operating conditions are constantly changing. Only when they are aligned perfectly with the motor's sweet spot RPM and load does the motor work with its maximum efficiency. But the car is almost never in that spot, it just passes through it to spend most of its time in the inefficient operating areas of the torque/load/RPM axes. This translates into a vastly diminished range.

The structures of the preferred embodiments, with the adjustable field strengths and multiple available rotor diameters, permit a motor to reconfigure itself instantly and on the go to be in its sweet spot regardless of the operating demands. Basically, the motor can move its sweet spot to where the current operating conditions are. This results in better range and better power.

The basic stator magnet field of preferred embodiments utilizes permanent magnets so it does not drain the battery bank. Basically, it leverages the free energy from nature with permanent magnets, rather than using battery power and electromagnets. Conventional stator fields are made by running electricity through dozens of massive coils. That takes a lot of electricity. This means extra weight and cost for batteries. Preferred embodiment are able to use the energy savings advantage of more than 10 times the amount of permanent magnets. This results in more power at less energy cost, which therefore vastly improves range and acceleration.

In preferred embodiments of the present invention, all field lines are straight, linear, and orderly, aligned at the precise angle for maximum effectiveness. Conventional motors have a complex field that is vastly suboptimal by comparison. All field lines in preferred embodiments of the present invention are equidistant apart and are packed much closer together. Unlike conventional motors, the field does not arc, bulge or have weak areas. Well positioned collateral magnets compress each other's fields increasing flux density and therefore further increase the motor's power and range. There is zero field loss. This perfect field orientation confers still more power with much less input energy. All field lines are perfectly perpendicular to the rotor. If they were off perpendicular, the force would be reduced by the sine of the skew angle. Perpendicularity is maintained through the entire rotor rotation cycle. The field in preferred embodiments of the present invention is exactly the same size, or substantially the same size as the rotor. The preferred embodiments of the present invention include a field which is also temporally stable and uniform. Unlike in the conventional motors, the field is not made of dozens of pulsating and reversing subunits, so there is no loss from subfields expanding with wrong orientation fronts, and there is no loss from negative cross field interactions.

Another efficiency loss found in a roiling field comes from how the field lines at a specific area change orientation as a field grows and shrinks past that area. A simple strong force in the right direction is what is needed, but as a field expands past a fixed point, forces push that point in different directions at different times. As the field grows and shrinks, it momentarily exerts counterproductive forces in the wrong direction, similar to one rower in a long boat intermittently rowing backwards. For lack of a better name, this is referred to as "push me, pull you efficiency loss." It is minute, but it happens hundreds of times a second, so it adds up to rob potential power and range. Preferred embodiments of the present invention don't have these power losses. In fact, the field in preferred embodiments of the present invention takes much less power to produce yet is much more powerful and effective. Every bit of the field helps augment the power of every adjacent part. The bottom line is that conventional systems use a lot more electricity to get a much weaker and more disordered magnetic field than does preferred embodiments of the present invention. This has a profoundly limiting effect on their range. It requires more battery pack and motor mass to compensate.

The field of preferred embodiments of the present invention is always exactly oriented entirely in the perfect direction for torque production so every bit of the field is pushing the rotor. This contributes more to greater range and power. Further, an entirety of the rotor of preferred embodiments of the present invention is immersed in a tuned, oriented, and uniform field of a proper field strength/rotor volume ratio for maximal torque and efficiency.

Conventional motor designs necessitate parts that do not directly contribute to force generation. They are necessary in the conventional systems, but cause problems and add weight and cost. In a conventional motor rotor coil, up to about a third of the wire has to be oriented in a way that it does not contribute to producing torque. It does however add weight, size, cost and complexity. The structure of preferred embodiments of the present invention simply does not have that problem or anything analogous to it. Coils in motors also need to have their central core filled with iron to conduct the magnet field. This adds weight and cost.

In conventional designs, a motor is sized to be efficient at the most common operating torque and rpm demand. a larger motor may be more efficient in higher conditions and a smaller motor may be more efficient in lower ranges. These novel designs, utilizing the various rotor diameters, differential field strength sections and field adjustability can configure themselves to function as the motor size and power needed to operate at maximum efficiency in all driving conditions, not just the most commonly occurring.

Thus, in view of the above benefits, motor structures of preferred embodiments of the present invention take much less energy to produce more torque which additionally cuts the need for expensive batteries, thus reducing weight and cost leading to less batteries. Also, increased regenerative braking capability is provided by the same design enhancements, resulting in more energy to charge the batteries more so less batteries are needed, reducing cost and weight which in turn further reduces the need for batteries. All of the above combines to create a smaller, lighter, but more powerful motor that requires less electricity and less balance of plant apparatus which can allow for greater range from a smaller battery pack. The bottom line is that motor structures according to preferred embodiments of the present invention can provide an EV with a vastly longer range while reducing cost and weight from batteries.

It should be understood that the foregoing description is only illustrative of example preferred embodiments of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A dynamoelectric machine comprising:
a first stator;
a second stator; and
a rotor positioned between the first stator and the second stator, the rotor being rotatable with respect to the first and second stators; wherein
the rotor includes at least one rotating conductor which includes an electrically conducting material; and
the first and second stators include at least one of:
(i) gradient magnetic field strength areas that vary in flux density longitudinally down along an axial direction of the dynamoelectric machine;
(ii) different radial diameters of overlapping rotor and stator portions provided at different axial positions of the dynamoelectric machine; and
(iii) electromagnets which are structured to be selectively energized based on a changing variable.

2. The dynamoelectric machine according to claim 1, wherein one or both of the first and second stators includes hybrid magnets that include electromagnetic components and permanent magnet components.

3. The dynamoelectric machine according to claim 2, wherein magnitudes of the gradient magnetic field strength areas that vary in flux density are adjustable by changing an amount of current flowing through the electromagnetic components of at least one of the hybrid magnets of the first and/or second stators.

4. The dynamoelectric machine according to claim 1, wherein
the gradient magnetic field strength areas that vary in flux density are produced by varying radial distances between opposing portions of the first and second stators.

5. The dynamoelectric machine according to claim 1, wherein
the different diameters of overlapping rotor and stator portions provided at different axial positions of the dynamoelectric machine include:
a first diameter corresponding to the first stator and the second stator at a lower portion of the dynamoelectric machine in the axial direction of the dynamoelectric machine; and
a second diameter corresponding to the first stator and the second stator at an upper portion of the dynamoelectric machine in the axial direction of the dynamoelectric machine; and
the first diameter is greater than the second diameter.

6. The dynamoelectric machine according to claim 1, wherein
the electrically conducting material of the rotor includes a main copper component, and is embedded with or contacts a magnetically permeable material which includes magnetically permeable particles, fillings, strips, inclusions, or filaments.

7. The dynamoelectric machine according to claim 1, wherein the gradient magnetic field strength areas that vary in flux density are produced by arranging varying strengths of circumferentially uniform magnets along the axial direction of the dynamoelectric machine.

8. The dynamoelectric machine according to claim 1, further comprising:
a central stator located radially between the first stator and the second stator; wherein
the rotor includes first and second concentrically arranged rotor conductor portions between the first stator and the central stator and between the central stator and the second stator.

9. The dynamoelectric machine according to claim 8, wherein
the central stator, the first stator, and the second rotor conductor portion have a greater total longitudinal length along the axial direction of the dynamoelectric machine than the second stator and the first rotor conductor portion.

10. The dynamoelectric machine according to claim 1, wherein the rotor includes longitudinally extending conductor bars which include copper.

11. The dynamoelectric machine according to claim 1, wherein the rotor includes laminated copper and magnetically permeable layers alternatingly arranged with one another in a radial direction of the dynamoelectric machine.

12. The dynamoelectric machine according to claim 11, wherein a radially innermost layer and a radially outermost layer of the rotor are defined by copper layers.

13. The dynamoelectric machine according to claim 6, wherein the magnetically permeable particles, fillings, strips, inclusions, or filaments are uniformly or substantially uniformly spaced throughout the copper structure and aligned radially.

14. The dynamoelectric machine according to claim 6, wherein magnetically permeable particles, fillings, strips, inclusions, or filaments include at least one of mu metals, iron, permalloy, silicon steel, or supermalloy.

15. The dynamoelectric machine according to claim 12, wherein a thin film silver layer is provided on external surfaces of the rotor.

16. The dynamoelectric machine according to claim 1, wherein the gradient magnetic field strength areas have uniform levels of magnetic flux in both radial and circumferential directions without salient poles.

17. The dynamoelectric machine according to claim 1, wherein
the first stator includes a pair or more of inner stators opposed to one another in the axial direction;
the second stator includes a pair or more of outer stators opposed to one another in the axial direction; and
the rotor includes a pair or more of rotors opposed to one another in the axial direction.

18. The dynamoelectric machine according to claim 17, wherein the pair or more of rotors are rotatingly connected to one another through a common rotor shaft axially between the pair or more of rotors.

19. The dynamoelectric machine according to claim 18, further comprising:
electrical collection circuitry including input leads and output leads; wherein
the common rotor shaft includes a non-conductive insulating shaft insert; and
at least some of the input leads are connected to portions of the common rotor shaft on opposing sides of the non-conductive insulating shaft insert.

20. The dynamoelectric machine according to claim 1, wherein
at least one of the rotor, the first stator, or the second stator includes multiple frustrum segments which have radially inner or outer surfaces which gradually change in distance from a central axis of the dynamoelectric machine as the radially inner or outer surfaces extend axially along the central axis of the dynamoelectric machine.

\* \* \* \* \*